US011831670B1

(12) United States Patent
Molls et al.

(10) Patent No.: US 11,831,670 B1
(45) Date of Patent: Nov. 28, 2023

(54) SYSTEM AND METHOD FOR PRIORITIZING DISTRIBUTED SYSTEM RISK REMEDIATIONS

(71) Applicant: Tanium Inc., Emeryville, CA (US)

(72) Inventors: Stefan Horst-Guenter Molls, Nuremberg (DE); Joshua M. Bryant, Pecatonica, IL (US); Keith A. Robertson, Wasilla, AK (US); John E. Foscue, Huntington Beach, CA (US)

(73) Assignee: TANIUM INC., Kirkland, WA (US)

( * ) Notice: Subject to any disclaimer, the term of this patent is extended or adjusted under 35 U.S.C. 154(b) by 65 days.

(21) Appl. No.: 16/952,009

(22) Filed: Nov. 18, 2020

Related U.S. Application Data

(60) Provisional application No. 62/937,125, filed on Nov. 18, 2019.

(51) Int. Cl.
*H04L 29/00* (2006.01)
*H04L 9/40* (2022.01)
*G06F 8/65* (2018.01)

(52) U.S. Cl.
CPC ........... *H04L 63/1433* (2013.01); *G06F 8/65* (2013.01); *H04L 63/102* (2013.01); *H04L 63/104* (2013.01); *H04L 63/1441* (2013.01)

(58) Field of Classification Search
CPC . H04L 63/1433; H04L 63/102; H04L 63/104; H04L 63/1441; G06F 8/65
See application file for complete search history.

(56) References Cited

U.S. PATENT DOCUMENTS

| | | |
|---|---|---|
| 5,220,596 A | 6/1993 | Patel |
| 5,842,202 A | 11/1998 | Kon |
| 5,949,755 A | 9/1999 | Uphadya et al. |
| 6,049,828 A | 4/2000 | Dev et al. |
| 6,615,213 B1 | 9/2003 | Johnson |

(Continued)

OTHER PUBLICATIONS

Hoscheit,Office Action, U.S. Appl. No. 17/001,586, dated Jun. 9, 2022, 6 pgs.

(Continued)

*Primary Examiner* — Don G Zhao
(74) *Attorney, Agent, or Firm* — Morgan, Lewis & Bockius LLP

(57) ABSTRACT

A server system obtains, for machines in a distributed system, system risk information, such as information identifying open sessions between respective users and respective machines, information identifying vulnerabilities in respective machines; and administrative rights information identifying groups of users having administrative rights to respective machines. The server system determines security risk factors, including risk factors related to lateral movement between logically coupled machines, and generates machine risk assessment values for at least a subset of the machines, based on a weighted combination of the risk factors. A user interface that includes a list of machines, sorted in accordance with the machine risk assessment values is presented to a user. The user interface also includes, for respective machines, links for accessing additional information about risk factors associated with the machine, and for accessing one or more remediation tools for remediating one or more security risks associated with the respective machine.

48 Claims, 15 Drawing Sheets

(56) References Cited

U.S. PATENT DOCUMENTS

| | | |
|---|---|---|
| 6,879,979 B2 | 4/2005 | Hindawi et al. |
| 6,885,644 B1 | 4/2005 | Knop et al. |
| 6,959,000 B1 | 10/2005 | Lee et al. |
| 7,043,550 B2 | 5/2006 | Knop et al. |
| 7,096,503 B1 | 8/2006 | Magdych et al. |
| 7,120,693 B2 | 10/2006 | Chang et al. |
| 7,225,243 B1 | 5/2007 | Wilson |
| 7,240,044 B2 | 7/2007 | Chaudhuri et al. |
| 7,299,047 B2 | 11/2007 | Dolan et al. |
| 7,483,430 B1 | 1/2009 | Yuan et al. |
| 7,555,545 B2 | 6/2009 | McCasland |
| 7,600,018 B2 | 10/2009 | Maekawa et al. |
| 7,698,453 B2 | 4/2010 | Samuels et al. |
| 7,720,641 B2 | 5/2010 | Alagappan et al. |
| 7,761,557 B2 | 7/2010 | Fellenstein et al. |
| 7,769,848 B2 | 8/2010 | Choy et al. |
| 7,844,687 B1 | 11/2010 | Gelvin et al. |
| 8,078,668 B2 | 12/2011 | Moreau |
| 8,086,729 B1 | 12/2011 | Hindawi et al. |
| 8,139,508 B1 | 3/2012 | Roskind |
| 8,185,612 B1 | 5/2012 | Arolovitch et al. |
| 8,185,615 B1 | 5/2012 | McDysan et al. |
| 8,271,522 B2 | 9/2012 | Mehul et al. |
| 8,392,530 B1 | 3/2013 | Manapragada et al. |
| 8,477,660 B2 | 7/2013 | Lee et al. |
| 8,504,879 B2 | 8/2013 | Poletto et al. |
| 8,510,562 B2 | 8/2013 | Ramakrishnan et al. |
| 8,677,448 B1* | 3/2014 | Kauffman ............ G06F 16/122 726/1 |
| 8,813,228 B2 | 8/2014 | Magee et al. |
| 8,819,769 B1 | 8/2014 | Van Dijk et al. |
| 8,885,521 B2 | 11/2014 | Wang et al. |
| 8,903,973 B1 | 12/2014 | Hindawi et al. |
| 8,904,039 B1 | 12/2014 | Hindawi et al. |
| 9,009,827 B1 | 4/2015 | Albertson et al. |
| 9,059,961 B2 | 6/2015 | Hindawi et al. |
| 9,246,977 B2 | 1/2016 | Hindawi et al. |
| 9,576,131 B2 | 2/2017 | Tuvell et al. |
| 9,609,007 B1 | 3/2017 | Rivlin et al. |
| 9,667,738 B2 | 5/2017 | Hindawi et al. |
| 9,716,649 B2 | 7/2017 | Bent et al. |
| 9,769,037 B2 | 9/2017 | Hindawi et al. |
| 9,769,275 B2 | 9/2017 | Hindawi et al. |
| 9,800,603 B1 | 10/2017 | Sidagni et al. |
| 9,973,525 B1* | 5/2018 | Roturier ............ H04L 63/1433 |
| 9,985,982 B1 | 5/2018 | Bartos et al. |
| 10,015,185 B1* | 7/2018 | Koi ................ H04L 63/1425 |
| 10,095,864 B2 | 10/2018 | Hunt et al. |
| 10,136,415 B2 | 11/2018 | Hindawi et al. |
| 10,261,770 B2 | 4/2019 | Devagupthapu et al. |
| 10,482,242 B2 | 11/2019 | Hunt et al. |
| 10,484,429 B1 | 11/2019 | Fawcett et al. |
| 10,498,744 B2 | 12/2019 | Hunt et al. |
| 10,795,906 B1 | 10/2020 | Teubner |
| 10,824,729 B2 | 11/2020 | Hoscheit et al. |
| 10,929,345 B2 | 2/2021 | Stoddard et al. |
| 11,032,298 B1 | 6/2021 | Robbins et al. |
| 11,151,246 B2* | 10/2021 | Davis ................ H04L 9/0643 |
| 11,153,383 B2 | 10/2021 | Richards et al. |
| 11,301,568 B1* | 4/2022 | Dargude ............ H04L 63/101 |
| 2001/0056461 A1 | 12/2001 | Kampe et al. |
| 2002/0007404 A1 | 1/2002 | Vange et al. |
| 2002/0042693 A1 | 4/2002 | Kampe et al. |
| 2002/0073086 A1 | 6/2002 | Thompson et al. |
| 2002/0198867 A1 | 12/2002 | Lohman et al. |
| 2003/0101253 A1 | 5/2003 | Saito et al. |
| 2003/0131044 A1 | 7/2003 | Nagendra et al. |
| 2003/0212676 A1 | 11/2003 | Bruce et al. |
| 2003/0212821 A1 | 11/2003 | Gillies et al. |
| 2004/0037374 A1 | 2/2004 | Gonikberg |
| 2004/0044727 A1 | 3/2004 | Abdelaziz |
| 2004/0044790 A1 | 3/2004 | Loach |
| 2004/0054723 A1 | 3/2004 | Dayal |
| 2004/0054889 A1 | 3/2004 | Pitsos |
| 2004/0064522 A1 | 4/2004 | Zhang |
| 2004/0076164 A1 | 4/2004 | Vanderveen et al. |
| 2004/0190085 A1 | 9/2004 | Silverbrook et al. |
| 2005/0004907 A1 | 1/2005 | Bruno et al. |
| 2005/0053000 A1 | 3/2005 | Oliver et al. |
| 2005/0108356 A1 | 5/2005 | Rosu et al. |
| 2005/0108389 A1 | 5/2005 | Kempin et al. |
| 2005/0195755 A1 | 9/2005 | Senta et al. |
| 2006/0039371 A1 | 2/2006 | Castro et al. |
| 2006/0128406 A1 | 6/2006 | Macartney |
| 2006/0282505 A1 | 12/2006 | Hasha et al. |
| 2007/0005738 A1 | 1/2007 | Alexion-Tiernan et al. |
| 2007/0171844 A1 | 7/2007 | Loyd et al. |
| 2007/0211651 A1 | 9/2007 | Ahmed et al. |
| 2007/0230482 A1 | 10/2007 | Shim et al. |
| 2008/0082628 A1 | 4/2008 | Rowstron et al. |
| 2008/0133582 A1 | 6/2008 | Andersch et al. |
| 2008/0258880 A1 | 10/2008 | Smith et al. |
| 2008/0263031 A1 | 10/2008 | George et al. |
| 2008/0288646 A1 | 11/2008 | Hasha et al. |
| 2009/0125639 A1 | 5/2009 | Dam et al. |
| 2009/0271360 A1 | 10/2009 | Bestgen et al. |
| 2009/0285204 A1 | 11/2009 | Gallant et al. |
| 2009/0319503 A1 | 12/2009 | Mehul et al. |
| 2009/0328115 A1 | 12/2009 | Malik |
| 2010/0011060 A1 | 1/2010 | Hilterbrand et al. |
| 2010/0070570 A1 | 3/2010 | Lepeska |
| 2010/0085948 A1 | 4/2010 | Yu et al. |
| 2010/0094862 A1 | 4/2010 | Bent et al. |
| 2010/0296416 A1 | 11/2010 | Lee et al. |
| 2010/0306252 A1 | 12/2010 | Jarvis et al. |
| 2011/0231431 A1 | 9/2011 | Kamiwada et al. |
| 2011/0271319 A1 | 11/2011 | Venable, Sr. |
| 2012/0053957 A1 | 3/2012 | Atkins et al. |
| 2012/0110183 A1 | 5/2012 | Miranda et al. |
| 2012/0221692 A1 | 8/2012 | Steiner et al. |
| 2012/0269096 A1 | 10/2012 | Roskind |
| 2013/0110931 A1 | 5/2013 | Kim et al. |
| 2013/0170336 A1 | 7/2013 | Chen et al. |
| 2013/0212296 A1 | 8/2013 | Goel et al. |
| 2013/0276053 A1 | 10/2013 | Hugard, IV et al. |
| 2013/0326494 A1 | 12/2013 | Nunez et al. |
| 2014/0075505 A1 | 3/2014 | Subramanian |
| 2014/0101133 A1 | 4/2014 | Carston et al. |
| 2014/0149557 A1 | 5/2014 | Lohmar et al. |
| 2014/0164290 A1* | 6/2014 | Salter ................ G06Q 40/06 705/36 R |
| 2014/0164552 A1 | 6/2014 | Kim et al. |
| 2014/0181247 A1 | 6/2014 | Hindawi et al. |
| 2014/0181295 A1 | 6/2014 | Hindawi et al. |
| 2014/0244727 A1 | 8/2014 | Kang et al. |
| 2014/0279044 A1 | 9/2014 | Summers |
| 2014/0280280 A1 | 9/2014 | Singh |
| 2014/0282586 A1 | 9/2014 | Shear |
| 2014/0375528 A1 | 12/2014 | Ling |
| 2015/0080039 A1 | 3/2015 | Ling et al. |
| 2015/0149624 A1 | 5/2015 | Hindawi et al. |
| 2015/0163121 A1 | 6/2015 | Mahaffey et al. |
| 2015/0172228 A1 | 6/2015 | Zalepa et al. |
| 2015/0199511 A1* | 7/2015 | Faile, Jr. ................ G06F 21/55 726/25 |
| 2015/0199629 A1* | 7/2015 | Faile, Jr. ............ G06Q 50/265 705/7.28 |
| 2015/0256575 A1 | 9/2015 | Scott |
| 2015/0302458 A1 | 10/2015 | Dides |
| 2015/0312335 A1 | 10/2015 | Ying |
| 2015/0372911 A1 | 12/2015 | Yabusaki et al. |
| 2015/0373043 A1 | 12/2015 | Wang et al. |
| 2016/0034692 A1 | 2/2016 | Singler |
| 2016/0080408 A1 | 3/2016 | Coleman et al. |
| 2016/0119251 A1 | 4/2016 | Solis et al. |
| 2016/0255142 A1 | 9/2016 | Hunt et al. |
| 2016/0255143 A1 | 9/2016 | Hunt et al. |
| 2016/0269434 A1 | 9/2016 | DiValentin et al. |
| 2016/0286540 A1 | 9/2016 | Hindawi et al. |
| 2016/0352588 A1 | 12/2016 | Subbarayan et al. |
| 2016/0360006 A1 | 12/2016 | Hopkins et al. |
| 2017/0118074 A1 | 4/2017 | Feinstein et al. |
| 2017/0286690 A1 | 10/2017 | Chari et al. |
| 2017/0346824 A1 | 11/2017 | Mahabir et al. |

(56) References Cited

U.S. PATENT DOCUMENTS

| | | |
|---|---|---|
| 2018/0013768 A1 | 1/2018 | Hunt et al. |
| 2018/0039486 A1 | 2/2018 | Kulkami et al. |
| 2018/0074483 A1* | 3/2018 | Cruz ................. G05B 23/0283 |
| 2018/0074796 A1 | 3/2018 | Alabes et al. |
| 2018/0191747 A1 | 7/2018 | Nachenberg et al. |
| 2018/0191766 A1* | 7/2018 | Holeman ................ H04L 63/20 |
| 2018/0267794 A1 | 9/2018 | Atchison et al. |
| 2018/0351792 A1 | 12/2018 | Hunter et al. |
| 2018/0351793 A1 | 12/2018 | Hunter et al. |
| 2018/0375892 A1* | 12/2018 | Ganor .................... H04L 63/20 |
| 2019/0081981 A1 | 3/2019 | Bansal |
| 2019/0096217 A1* | 3/2019 | Pourmohammad .... G08B 25/10 |
| 2019/0138512 A1* | 5/2019 | Pourmohammad .... G05B 15/02 |
| 2019/0260638 A1 | 8/2019 | Yocam et al. |
| 2019/0280867 A1 | 9/2019 | Kurian |
| 2019/0319987 A1 | 10/2019 | Levy et al. |
| 2020/0028890 A1 | 1/2020 | White et al. |
| 2020/0053072 A1 | 2/2020 | Glozman et al. |
| 2020/0195693 A1 | 6/2020 | Price et al. |
| 2020/0198867 A1 | 6/2020 | Nakamichi |
| 2020/0202007 A1* | 6/2020 | Nagaraja ................... G06F 8/71 |
| 2020/0304536 A1 | 9/2020 | Mahabir et al. |

OTHER PUBLICATIONS

Hoscheit, Notice of Allowance, U.S. Appl. No. 17/001,586, dated Sep. 8, 2022, 8 pgs.
Hoscheit et al., Notice of Allowance, U.S. Appl. No. 18/099,854, dated May 26, 2023, 13 pgs.
Hoscheit et al., Corrected Notice of Allowability, U.S. Appl. No. 18/099,854, dated Jun. 5, 2023, 7 pgs.

\* cited by examiner

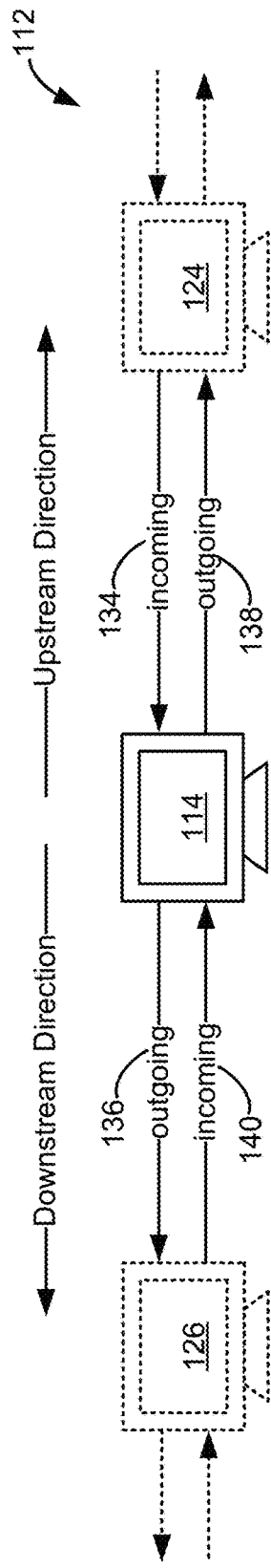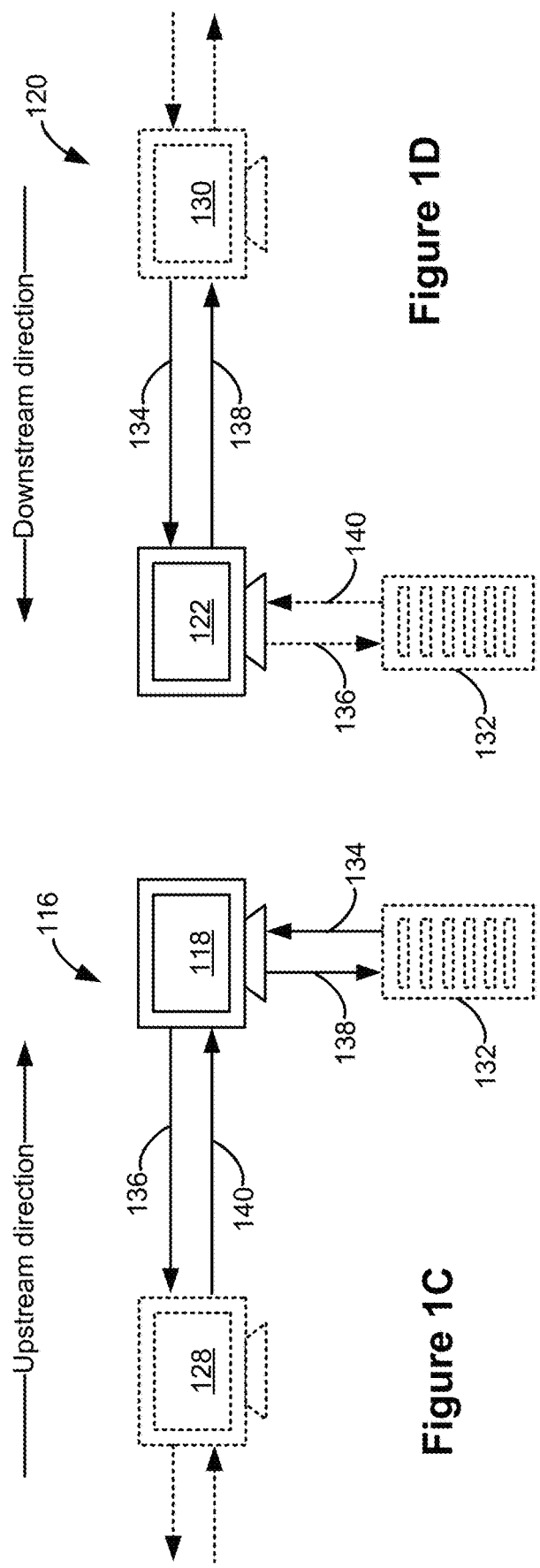

Figure 9

User Risk Assessment User interface 901

| | User 1 | User 2 |
|---|---|---|
| (Du) Number of systems with an unknown rating that the user has direct admin rights to — 914 | 1 | 1 |
| (Dl) Number of systems with a low rating that the user has direct admin rights to — 916 | 1 | 1 |
| (Dm) Number of systems with a medium rating that the user has direct admin rights to — 918 | 1 | 1 |
| (Dh) Number of systems with a high rating that the user has direct admin rights to — 920 | 0 | 0 |
| (Iu) Number of systems with an unknown rating that the user has indirect admin rights to — 922 | 0 | 0 |
| (Il) Number of systems with a low rating that the user has indirect admin rights to — 924 | 0 | 0 |
| (Im) Number of systems with a medium rating that the user has indirect admin rights to — 926 | 1 | 1 |
| (Ih) Number of systems with a high rating that the user has indirect admin rights to — 928 | 0 | 0 |
| (S) Number of Sessions — 930 | 8 | 1 |
| (Lu) Number of systems with an unknown rating reached via lateral movement — 932 | 1 | 1 |
| (Ll) Number of systems with a low rating reached via lateral movement — 934 | 0 | 0 |
| (Lm) Number of systems with a medium rating reached via lateral movement — 936 | 1 | 1 |
| (Lh) Number of systems with a high rating reached via lateral movement — 938 | 0 | 0 |
| Direct User Risk Rating — 910 | 104 | 13 |
| Derivative User Risk Rating — 912 | 110 | 19 |
| Remedial actions — 940 | 942 | 944 |

910-1 — Direct User Risk Rating = $((Du*1+Dl*2+Dm*5+Dh*10)+(Iu*1+Il*2+Im*5+Ih*10))*S$ 912-1 — Derivative User Risk Rating = $((Du*1+Dl*2+Dm*5+Dh*10)+(Iu*1+Il*2+Im*5+Ih*10))*S + (Lu*1+Ll*2+Lm*5+Lh*10)$

SYSTEM AND METHOD FOR PRIORITIZING DISTRIBUTED SYSTEM RISK REMEDIATIONS

RELATED APPLICATIONS

This application claims priority to U.S. Provisional Patent Application No. 62/937,125, filed Nov. 18, 2019, which is hereby incorporated by reference in its entirety.

This application is also related to U.S. patent application Ser. No. 13/797,946, filed Mar. 12, 2013, now U.S. Pat. No. 9,246,977; U.S. patent application Ser. No. 14/554,711, filed Nov. 26, 2014, now U.S. Pat. No. 9,667,738; and U.S. Patent application Ser. No. 14/554,739, filed Nov. 26, 2014, now U.S. Pat. No. 9,769,275, all of which are hereby incorporated by reference in their entireties.

TECHNICAL FIELD

The disclosed embodiments relate generally to systems and methods for assessing and remediating security risks in large distributed systems having many computers or machines interconnected by one or more communication networks.

BACKGROUND

In large corporate networks, and the networks of machines/computers used by large organizations, the numbers of managed machines can number in the tens or hundreds of thousands, or even more, making security assessment and management very challenging. Administrators (e.g., "users" having the authority to identify and mitigate (or remediate) security risks in a network of machines/computers) are typically presented with an ever expanding list of alerts about suspicious behavior and security risks to mitigate. Conventional methods typically only show how many systems are affected by a respective vulnerability, alert or security risk, or show the severity of a vulnerability (e.g., using a score produced using a Common Vulnerability Scoring System (CVSS)). With this information, users (e.g., system administrators, security analysts) typically will address the security risk or vulnerability that affects the most machines, or address a vulnerability that has a high CVSS score first. However, these traditional approaches lead to issues where vulnerabilities with lower CVSS scores and security risks that affect only a small number of machines aren't brought to the user's attention, even if the vulnerability in combination with indirect administrative rights and/or lateral movement through the network presents a significant security risk to the distributed system.

Mitigating security risks in such a manner may not be the most effective way of protecting the distributed system, because there may be an incident where only one machine has a particular low CVSS vulnerability, but when compromised could allow an attacker to gain access to other machines via lateral movement (e.g., making use of administrative rights information to compromise other machines in the distributed system) that contain sensitive information (e.g., social security information; confidential financial or banking information; confidential organizational, personal or technical information; etc.). Alternatively, there can be situations where a respective vulnerability affects a large number of systems, but is less critical than other vulnerabilities because the respective vulnerability, even if leveraged by an attacker, would not lead to sensitive information or important services being compromised. Therefore, under traditional approaches, security risks that require the most attention may not be brought to the system administrator's, or their criticality may not be accurately indicated in the information presented to the system administrator(s).

SUMMARY

Accordingly there is a need to prioritize security risks not by the number of machines they affect, but rather based on the potential damage to the distributed system presented by those security risks, and to present the system administrator with easy access to tools for obtaining additional information about the prioritized security risks and to tools for remediating those risks. To that end, in one aspect, a server system includes: one or more communications interfaces for coupling the server system to N machines in a collection of machines via one or more communication networks, where N is an integer greater than 10, one or more processors, memory storing one or more programs, wherein the one or more programs include instructions for performing a set of operations.

Those operations, performed by the server system, include obtaining, at least in part from the N machines, system risk information that includes administrative rights information, identifying users and groups of users having administrative rights to respective machines of the N machines, and at least two of the following categories of information: open session information identifying open sessions between respective users and respective machines in the N machines; vulnerability information for vulnerabilities, in a set of predefined vulnerabilities, present at respective machines in the N machines; and missing patch information identifying missing software patches at respective machines in the N machines.

The operations performed by the server system further include identifying, for each respective machine in a first subset of the N machines, logically coupled machines, comprising machines of the N machines logically coupled to the respective machine via lateral movement, wherein lateral movement comprises access to the respective machine via one or more other machines using said administrative rights; and determining, for each respective machine in a second subset of the N machines, machine risk factors including one or more machine risk factors determined in accordance with the system risk information, and one or more lateral movement values, each lateral movement value corresponding to a number of logically coupled machines, logically coupled via lateral movement to the respective machine.

The operations performed by the server system further include generating, for each machine in at least a third subset of the N machines, a machine risk assessment value, wherein the machine risk assessment value is determined for each machine in the third subset based, at least in part, on a combination of the one or more machine risk factors and the one or more lateral movement values; presenting in a first user interface a sorted list of a least a fourth subset of the N machines, sorted in accordance with the machine risk assessment values generated for the machines in the third subset of the N machines, wherein the first user interface includes, for each respective machine in at least a subset of the machines listed in the first user interface, a link for accessing additional information about risk factors associated with the machine and for accessing one or more remediation tools for remediating one or more security risks associated with the respective machine; and performing a respective security risk remediation action in accordance with user selection of a respective remediation tools of the one or more remediation tools.

BRIEF DESCRIPTION OF THE DRAWINGS

FIGS. 1B-1D illustrate respective local segments of a linear communication orbit for data caching and distribution in a managed network in accordance with some embodiments.

FIG. 8 also displays an example user interface for displaying additional information for selected patches.

FIG. 9 illustrates a block diagram of an example user interface that user's machines based on weighted user risk assessment values.

Like reference numerals refer to corresponding parts throughout the drawings.

DESCRIPTION OF EMBODIMENTS

Figure 1A:
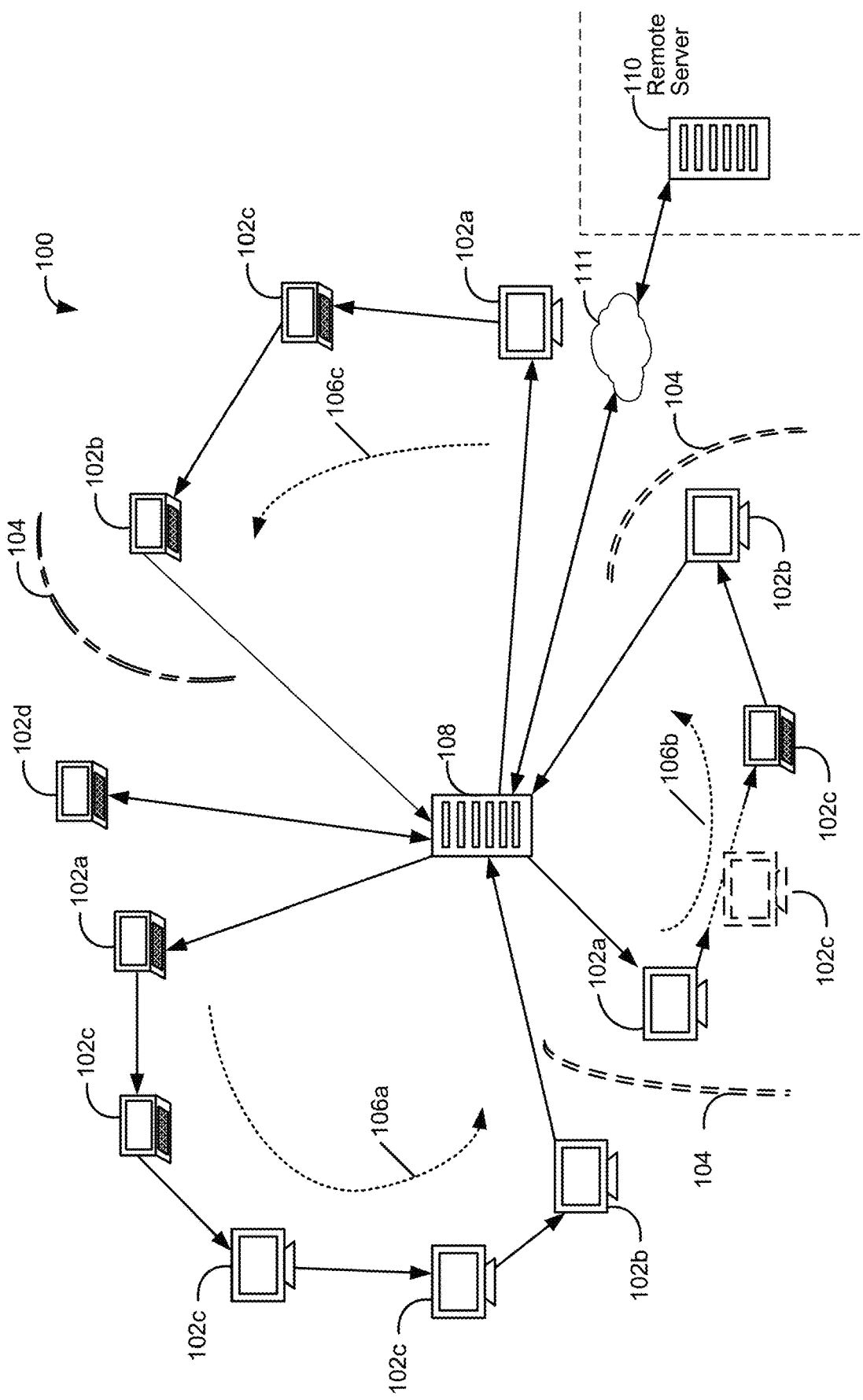
FIG. 1A illustrates a managed network comprising a plurality of interconnected machines, e.g., computers, servers, mobile devices, and other networked devices.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phrase reads on a single instance of A alone, a single instance of B alone, or a single instance of C alone, while also encompassing combinations of the listed items such as "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Networks Using Linear Communication Orbits

In some embodiments, the machines in a distributed system communicate using communication networks not organized as linear communication orbits, and instead communicate using one or more local area networks and wide area networks. However, since some embodiments of the security risk assessment and remediation systems described herein utilize linear communication orbits, networks of machines that utilize linear communication orbits are described herein with reference to FIGS. 1A-1D. Additional features of linear communication orbits are described in U.S. Pat. Nos. 9,246,977; 9,667,738; and 9,769,275, all of which are hereby incorporated by reference in their entireties.

FIG. 1A illustrates a managed network 100 comprising a plurality of interconnected machines 102 (including 102a-d), e.g., computers, servers, mobile devices, and other networked devices. Examples of the managed network 100 include an enterprise network or another network under common management. The managed network 100, sometimes called a distributed set of machines or computers, includes a plurality of sub-networks (e.g., contiguous segments 106), and optionally includes one or more singleton machines (e.g., singleton 102d). Each singleton or sub-network is coupled to a server 108 that facilitates creation, maintenance and operation of the respective singleton and sub-network. This server 108 may be elected automatically from among all or a subset of machines 102 according to various predetermined election rules implemented on machines 102. Each sub-network in the managed network 100 further includes at least two interconnected machines and adopts a certain network topology to organize these machines. Each singleton machine, if any, is a stand-alone node except that it is coupled to server 108. In some embodiments, each singleton or sub-network is further separated from the rest of the managed network 100 by one or more firewalls 104.

Optionally, machines 102 in managed network 100 are distributed across different geographical areas. Alternatively, machines 102 are located at the same physical location. A respective machine 102 communicates with another machine 102 or the server 108 using one or more communication networks. Such communications include communications during normal operations (e.g., user-level operations, such as emailing, Internet browsing, VoIP, database accessing, etc.). The communication network(s) used can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like. In some embodiments, two or more machines 102 in a sub-network are coupled via a wired connection, while at least some of machines in the same sub-network are coupled via a Bluetooth PAN.

Machines 102 in managed network 100 are organized into one or more contiguous segments 106 (including 106a-c), each of which becomes a sub-network in the managed network 100. In some embodiments, each contiguous segment 106 is a respective linear communication orbit that supports system, security and network management communications within the managed network 100. Furthermore, each contiguous segment 106 includes one head node (e.g., head node 102a), one tail node (e.g., tail node 102b), and a sequence of zero or more intermediate client nodes (e.g., intermediate node(s) 102c) in between the head node and the tail node. In some embodiments, both the head node and tail node of a contiguous segment 106a are coupled to server 108, while the intermediate nodes of the contiguous segment 106a are not coupled to server 108. In some embodiments, only the head node of a contiguous segment 106b is coupled to the server 108, while the intermediate nodes and tail node are not coupled to the server 108.

In some embodiments, server 108 is coupled to a remote a remote server (e.g., remote server 110) that is not part of managed network 100 and is optionally separated from managed network 100 a wide area network 111, such as the internet. For example, server 108 may receive from remote server 110 files or other information that it then distributes to computational machines 102 in managed network 100.

In some embodiments, all machines 102 coupled to a linear communication orbit 106 in network 100 are sorted into an ordered sequence according to a respective unique identifier associated with each machine 102. For example, respective IP addresses of machines 102 are used to sort the machines into an ordered sequence in the linear communication orbit. Each machine is provided with a predetermined set of rules for identifying its own predecessor and/or successor nodes given the unique identifiers of its potential neighbor machines. When a machine joins or leaves the linear communication orbit, it determines its ordinal position relative to one or more other machines in the linear communication orbit according to the unique identifiers and the aforementioned rules. More details on how a linear communication orbit is organized and how each intermediate node, head node or end node enters and leaves the linear communication orbit are provided in the Applicants' prior application, U.S. patent application Ser. No. 13/797,962, filed Mar. 12, 2013, entitled "Creation and Maintenance of Self-Organizing Communication Orbits in Distributed Networks," which is hereby incorporated by reference in its entirety.

Linear communication orbits, such as exemplary linear communication orbits 106a-106c, are established and maintained to facilitate system, security and/or network management operations ascribed to manual and programmed administration of network 100. Examples of system, security and network management operations include: (1) collecting status information (e.g., bandwidth, load, availability, resource inventory, application status, machine type, date of last update, security breach, errors, etc.) from individual machines of the managed network; (2) issuance of system, security and network management commands (e.g., commands related to shutdown, restart, failover, release of resources, change access authorizations, backup, deployment, quarantine, load balancing, etc.) for individual resources and/or machines on the managed network; (3) file distribution, including software installations and updates; (4) detecting presence of particular malicious programs (e.g., viruses, malware, security holes, etc.) on individual machines on the managed network; (5) removal of or disabling particular malicious programs (e.g., viruses, malware, security holes, etc.) on individual machines on the managed network; (6) disabling or suspending suspicious or high-risk operations and activities (e.g., Internet or operating system activities of suspected virus, malware, etc.) on particular machines on the managed network; (7) detecting unmanaged machines coupled to the managed network; (8) detecting data leakage (e.g., transmission of classified information) from machines on the managed network to locations or machines outside of the managed network; (9) detecting connection or data transfer to/from removable data storage devices (e.g., memory stick, or other removable storage devices) from/to particular ports (e.g., a USB drive) of particular machines on the managed network. Other system, security and network management operations are possible, as will be apparent to those of ordinary skills in the art.

In some implementations, a system management message is initially issued by the server (e.g., server 108) in the managed network, and includes a command (e.g., a command to obtain and install a specific object, such as a data file or software application, or software update) and a rule. In some embodiments, the system management message is initially received at a head node of an established linear communication orbit, as is then passed along the linear communication orbit to each node in the linear communication orbit until it reaches the tail node of the linear communication orbit. Each node of the linear communication orbit is sometimes called a computational machine; alternatively, each node of the linear communication orbit includes a computational machine.

The rule in the system management message is interpreted by each computational machine in the orbit, which determines whether that machine should execute the command. Alternately stated, the rule, when interpreted by each computational machine in the orbit, determines whether that machine needs a specific object, such as a data file, an application, an update, or the like. If the particular machine 102 determines that it satisfies the rule, and thus needs the object, it generates a plurality of data requests to request a plurality of shards, as described in more detail below. Each of the data requests is a request for respective specific data, herein called a shard. Together the shards form, or can be combined to form, an object, such as a file, an application, or an update.

Each data request propagates along a predetermined data request path that tracks the linear communication orbit until the requested respective specific data are identified at a respective machine that stores a cached copy of the requested respective specific. The respective specific data are thereafter returned, along a data return path, to the computational machine 102 that made the request. Moreover, the requested specific data are selectively cached at the other computational machines located on the path to facilitate potential future installations and updates at other machines on the linear communication orbit. During the entire course of data caching and distribution, each individual computational machine on the linear communication orbit follows a predetermined routine to independently process system management messages, respond to any incoming data request and cache specific data that passes through.

Data distribution in the linear communication orbit(s) 106 shown in FIG. 1A is preferably controlled locally within the linear communication orbit, and many data management functions are distributed to each individual machine. For example, machines located on a data return path independently determine whether to retain a cached copy of data being returned to another machine on the linear communication orbit. Further, each machine located on a data request path independently determines if it has a cached copy of the specific data requested by another machine on the linear communication orbit, and if so, returns the specific data requested from its local cache. The server 108 need not separately manage these functions. Machines located on the data request path determine successively and independently whether each of them retains a cached copy and thereby should return the specific data.

In accordance with many embodiments of the present invention, data caching and distribution is performed using local resources of a linear communication orbit, except when none of the machines on the linear communication orbit have the specific data requested by a machine on the linear communication orbit. Bandwidth on the local area network, which interconnects the machines on the linear communication orbit, is typically very low cost compared with bandwidth on the wide area network that connects a server to one or more machines on the linear communication orbit. In many implementations, the local area network also provides higher data communication rates than the wide area network. Distributed, automatic local caching minimizes or reduces the use of a wide area communication network to retrieve data from a server, particularly when multiple machines on the same linear communication orbit make requests for the same data. As a result, overall performance of a large-scale managed network is improved compared with systems in which each managed machine obtains requested data via requests directed to a server via a wide area network. Due to local caching of content, and locally made caching decisions, far fewer file servers are needed in systems implementing the methods described herein, compared with conventional, large-scale managed networks of computational machines.

FIG. 1B-1D illustrate respective local segments of an exemplary linear communication orbit for data caching and distribution in a managed network in accordance with some embodiments. FIG. 1B illustrates a local segment 112 that is centered about an intermediate client node 114. Intermediate client node 114 is coupled between two immediately adjacent nodes, i.e., predecessor node 124 and successor node 126. Each machine 102 other than a head node and a tail node in a linear communication orbit is such an intermediate node. In some embodiments, an intermediate node is persistently connected only to its predecessor and successor nodes, and not to the server or other nodes in the network.

FIG. 1C illustrates a local segment (e.g., local segment 116) that includes a head node 118 of the linear communication orbit. FIG. 1D illustrates a local segment 120 that includes a tail node 122 of the linear communication orbit in accordance with some embodiments. Head node 118 and tail node 122 are each coupled to an immediately adjacent node, successor node 128 and predecessor node 130, respectively, on the linear communication orbit. In addition, head node 118 is coupled to server 132 that serves as a pseudo-predecessor node for head node 118. In some embodiments, tail node 122 is also coupled to server 132 that serves as a pseudo-successor node for tail node 122; however, in some embodiments, the linear communication orbit terminates at tail node 122. Each node shown in FIGS. 1B-1D is implemented by a respective machine 102 coupled to one of the linear communication orbits (e.g., linear communication orbits 106a-106c) of network 100 in FIG. 1A.

Each machine on the linear communication orbit is coupled to an immediate neighbor machine or a server via a bidirectional communication link that includes a data incoming channel and a data outgoing channel. Intermediate machine 114 has four communication channels (e.g., channels 134-140) that form two bidirectional communication links to couple itself to two respective neighbor machines (e.g., predecessor node 124 and successor node 126). Head node 118 and tail node 122 are similarly coupled to a respective neighbor machine, and in some embodiments to a server, via bidirectional communication links. The bidirectional communication links allow each machine to simultaneously receive information from and provide information to its adjacent machine upstream or downstream in the linear communication orbit. The upstream direction, relative to a machine other than the head node, is the direction of communication or message flow toward the head node. For the head node, the upstream direction is toward the server to which the head node is coupled. The downstream direction, relative to a machine other than the head node, is the direction of communication or message flow toward the tail node. In some embodiments, for the tail node, the downstream direction is undefined. In some other embodiments, for the tail node, the downstream direction is toward the server to which the tail node is coupled.

As shown in FIG. 1B, for intermediate node 114, data incoming channel 134 on an upstream side and data outgoing channel 136 on a downstream side together constitute a part of a forward communication channel that is established to pass information along a downstream direction. Similarly, data incoming channel 140 and data outgoing channel 138 together constitute a part of a backward communication channel along an upstream direction. The forward and backward communication channels further pass other successor and predecessor nodes, and extend downstream and upstream across the entire linear communication orbit. Specific information may be communicated successively from node to node along the forward communication channel, the backward communication channel, or both. In some embodiments, the start of the forward communication channel and the end of the backward communication channel further extends to server 132, because head node 118 is also coupled to serve 132 via a bidirectional communication link.

In various embodiments of the present invention, specific information communicated along the forward or backward communication channel may originate from a server, a head node, a tail node or an intermediate machine (e.g., machine 114 in FIG. 1B) of the linear communication orbit. As it is transferred along the forward or backward communication channel, the specific information may be modified at a certain intermediate machine and continue to be communicated to its immediate neighbor machine on the respective communication channel. In some embodiments, an intermediate machine may determine to retain a copy (e.g., locally cache) of the specific information, independently of whether the information needs to be communicated to the neighboring machine. In addition, in some implementations, each machine in the communication orbit may choose to reverse the direction of communication, when the specific information is received at the respective client node. In some implementations, however, such a reversal of direction occurs only at the tail node.

In accordance with some embodiments of the present invention, specific information that may be communicated in the forward and backward communication channels includes, but is not limited to, system management messages, data requests, specific data (e.g., data requested by the data requests) and status messages. In one example, a system management message is an installation or update message issued by the server, and transferred along the forward communication channel to various client nodes on the linear communication orbit. At a respective client node that receives the installation or update message, the message is parsed into a plurality of data requests each of which may be circulated within the linear communication orbit to request respective specific data. The requested respective specific data are returned to the client node, and distributed to other client nodes along the forward or backward communication channel as well. More details will be presented below concerning specific data caching and distribution processes, such as for installations and updates of applications, databases and the like.

Security Risk Assessment and Remediation

Having user interfaces that organize data based on security risk assessments allows an administrator (e.g., a "user" having the authority to identify and mitigate (or remediate) security risks in a network of machines/computers) to better remediate the vulnerabilities that are currently or potentially causing the largest amount of comprise to the systems within a distributed system, sometimes herein called "a collection of machines," "a network" or "a network of systems." Traditional vulnerability ranking systems, have typically been either based on the number of systems, sometimes herein called machines, with the same vulnerability, or the severity of the vulnerability (e.g., a CVSS Common Vulnerability Scoring System (CVSS)). However, these two criteria do not paint an accurate enough picture of how the vulnerabilities can affect a network of systems. For example, an administrator may identify a first vulnerability that has a high CVSS and affects a large number of machines, but if those systems do not contain any sensitive information (e.g., social security numbers; confidential financial or banking information; confidential organizational, personal or technical information; etc.), then the security risk associated with the identified vulnerability may be low or modest. On the other hand, there may be a single system having a second vulnerability with a medium CVSS, but if compromised could allow an attacker to gain access to sensitive information, either in that machine or in one or more other machines that can be accessed indirectly (through lateral movement, discussed in more detail below) due to the vulnerability. At this time, there are no security risk assessment tools that help an administrator to assess or identify such a scenario, and as a result an administrator would likely choose to correct the vulnerability (e.g., by applying a patch, and/or killing a session) that affect the most systems in the network first, instead of correcting the vulnerabilities that could potentially lead to the most devastating compromise.

In some embodiments, the security risk assessments, the generation or presentation of user interfaces, and the performance of remedial actions, are performed by a server system coupled to N machines in a collection of machines via one or more communication networks, where N is an integer greater than 10, 100, or 1000. The server system includes one or more communications interfaces for coupling the server system to the N machines in the collection of machines via the one or more communication network; one or more processors; and memory storing one or more programs, wherein the one or more programs include instructions for performing the operations described below.

In some embodiments, the operations performed by the server system include obtaining, at least in part from the N machines, system risk information that includes administrative rights information, identifying users and groups of users having administrative rights to respective machines of the N machines, and at least two of the following categories of information: open session information identifying open sessions between respective users and respective machines in the N machines; vulnerability information for vulnerabilities, in a set of predefined vulnerabilities, present at respective machines in the N machines; and missing patch information identifying missing software patches at respective machines in the N machines.

In some embodiments, the operations performed by the server system further include identifying, for each respective machine in a first subset of the N machines, logically coupled machines, comprising machines of the N machines logically coupled to the respective machine via lateral movement, wherein lateral movement comprises access to the respective machine via one or more other machines using said administrative rights.

In some embodiments, the operations performed by the server system further include operations specific to generating the risk assessment values, user interfaces, and links to remedial actions describe below with reference to FIGS. 2 to 10.

Vulnerability Risk Assessment and Remediation

Figure 2:
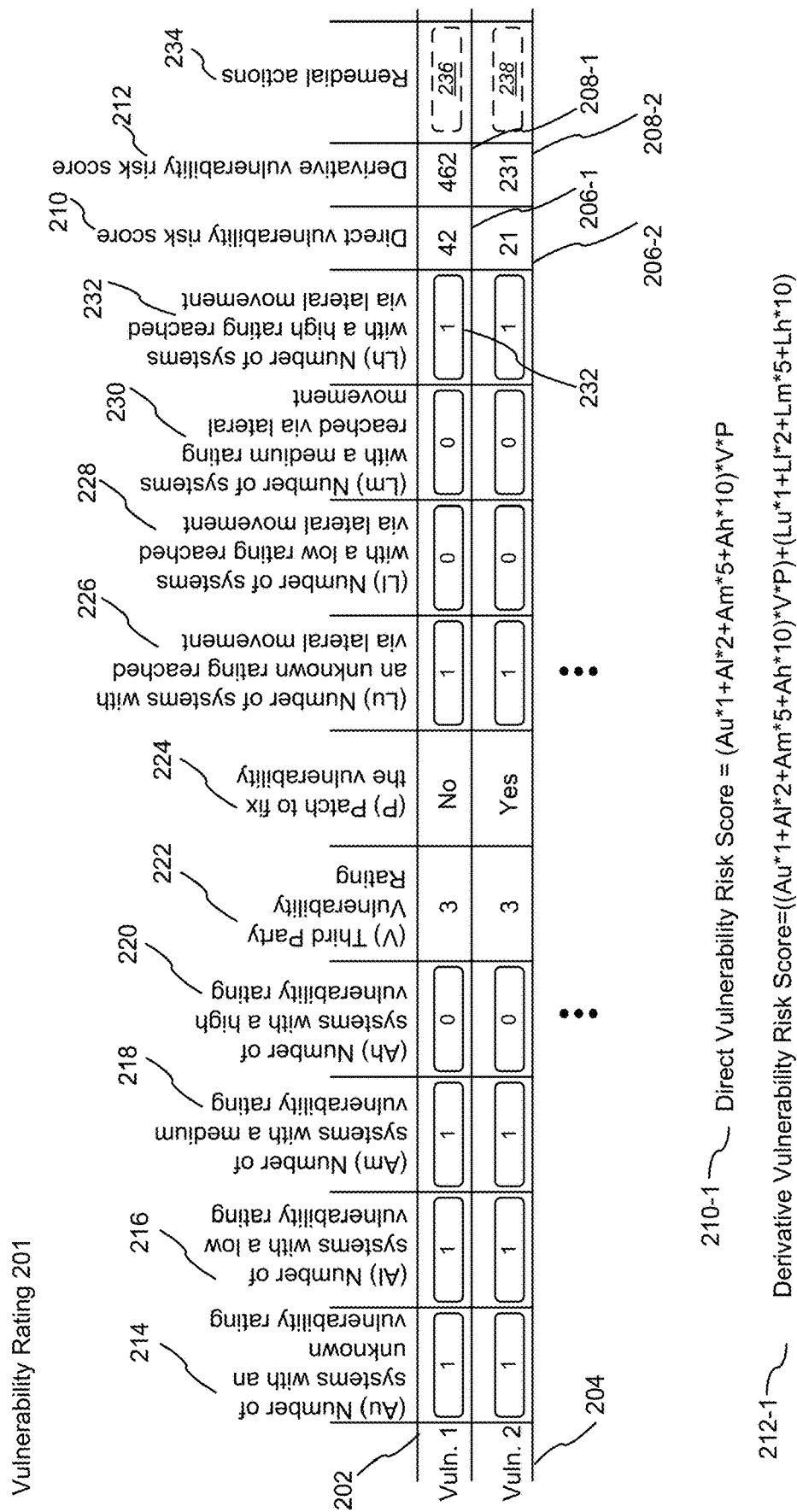
FIG. 2 illustrates a block diagram of an example user interface that displays vulnerabilities based on weighted vulnerability risk assessment values.
Figure 13:
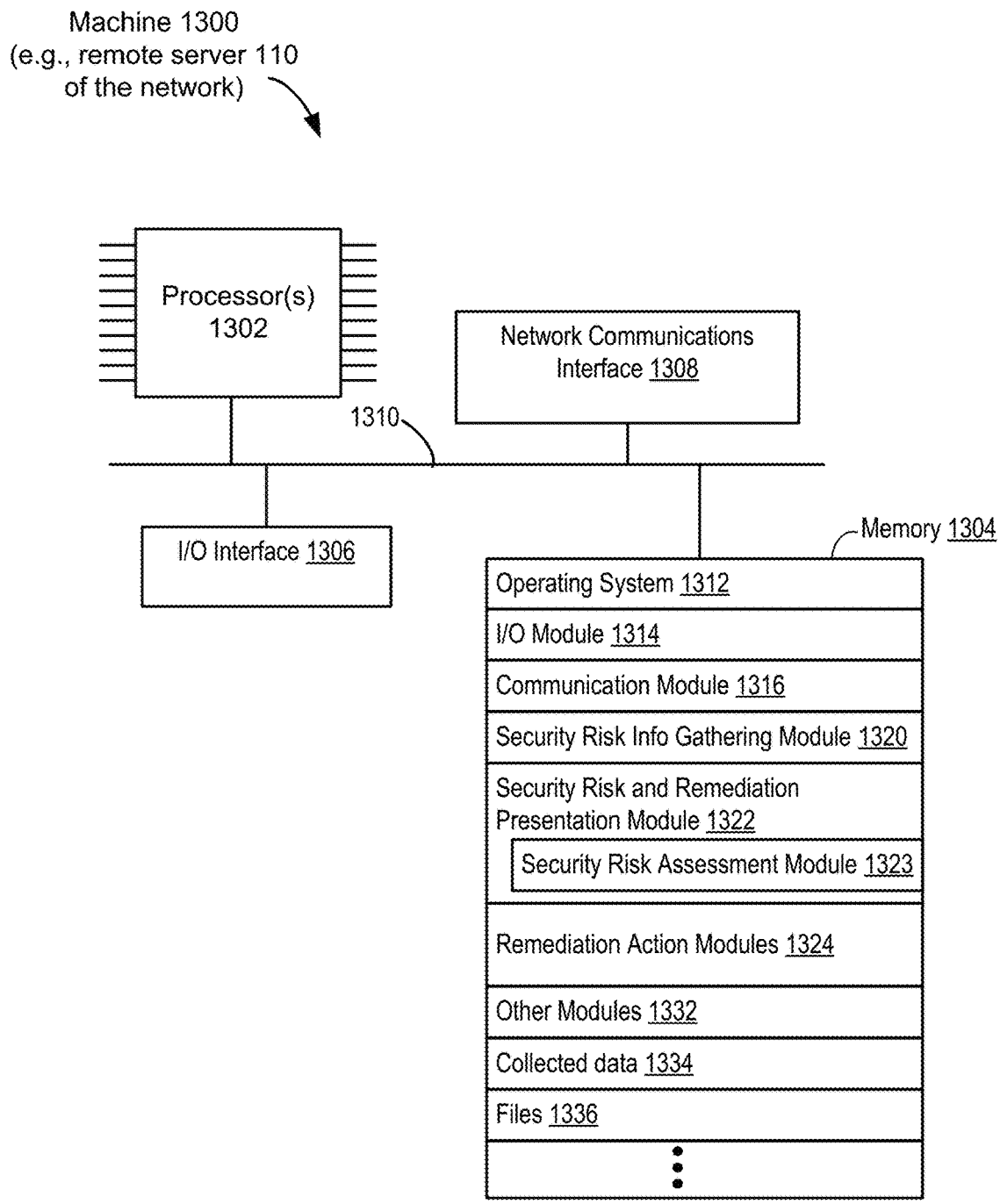
FIG. 13 is a block diagram of a server system having security risk assessment and remediation modules in accordance with some embodiments.

With the above scenario in mind, FIG. 2 shows a vulnerability rating user interface 201 that includes a scoring system (e.g., where the scoring is determined via a security risk assessment module 1323, FIG. 13) to present to the administrator with information concerning how each vulnerability in a set of predefined vulnerabilities can affect the network.

While FIG. 2 shows a specific set of fields or columns, these should be considered examples of the types of information that may be presented in a vulnerability rating user interface. For example, in other implementations, the user vulnerability rating user interface may include fewer fields or columns, such a single field per vulnerability indicating a total number of systems with the vulnerability, instead of the more detailed presentation in FIG. 2. In other example, the user vulnerability rating user interface may a single lateral movement field per vulnerability, indicating a total number of systems reachable from systems having the vulnerability, instead of the more detailed presentation in FIG. 2. In yet another example, instead of numeric values, some of the fields, such as the risk scores may indicate a risk category (e.g., critical, high, medium, low, or none) for each listed vulnerability. In the latter example, the vulnerabilities may still be ordered in the vulnerability rating user interface based on numerical risk scores, even though the risk scores themselves are presented as risk categories.

While FIG. 2 shows two vulnerabilities sorted by their vulnerability risk scores, the number (V) of distinct vulnerabilities for which risk scores are generated is typically an integer greater than 2, 5, 10, 20 or 100, and thus in other examples the user interface would show a larger list of vulnerabilities sorted by their vulnerability risk scores. In the example shown in FIG. 2, the two vulnerabilities are specified as, "vulnerability 1" 202, and "vulnerability 2" 204. These two vulnerabilities each have a direct vulnerability risk score 206-1 and 206-2 based upon certain vulnerability information, which is described in detail below. The vulnerabilities also have derivative vulnerability risk scores 208-1 and 208-2 based upon certain vulnerability information, which is described in detail below.

Each machine/system in the distributed system can be assigned (e.g., by the server system) a system rating that is assigned either automatically or by an administrator. In some embodiments, a machine's rating reflects or is assigned in accordance with the machine's importance within the network. For example, a low system rating may be assigned to a front-desk system that does not contain any sensitive information. A medium rating may be assigned to a system that is used by a user in the accounting department. A high risk rating may be assigned to a central server that contains an administrative rights store (also sometimes called an identity, authentication and authorization store, user accounts credentials store, or active directory information store), banking information, an important project, or social security information. It is worth noting that these categorizations can be subjective, and can be changed based on the needs of the owners or administrators of the distributed system. From another viewpoint, a system rating can be assigned to a respective system based on vulnerability severity of the system, where the vulnerability severity of the system can be determined based on whether the system contains (or has access to) sensitive information and/or provides important services that might be compromised by the system's vulnerabilities.

As briefly discussed earlier, for the vulnerabilities in a set of predefined vulnerabilities, both a direct vulnerability risk score, and a derivative vulnerability risk score can be determined. A direct vulnerability risk score is a score based on how many systems are directly affected by the vulnerability (e.g., how many systems have a recognized vulnerability that is not network dependent). A derivative vulnerability risk score, is a score that is based on how many systems could be compromised, using the vulnerability associated with the risk score, if an attacker were to compromise a single system and exploit all lateral movement possibilities through the network to access further systems. In one example, as shown in FIG. 2, there are two equations, which are for determining a direct vulnerability risk score 210, and for determining a derivative vulnerability risk score 212. Direct vulnerability risk scores and/or derivative vulnerability risk scores are sometimes herein called vulnerability risk assessment values. These equations (i.e., a direct vulnerability risk score equation 210-1 and a derivative vulnerability risk score equation 212-1), shown below, are used to generate direct vulnerability and derivative vulnerability risk scores, and are based on combinations (e.g., weighted combinations) of risk factors, each of which is discussed below. While specific equations are shown below in in FIG. 2, other equations based on the same or similar risk factors, or a subset or superset of such risk factors, may be used instead in other embodiments. For example, in other examples, different values for the weights applied to the risk factors can be used instead, and those weights may be specified by the administrator depending on their specific needs.

$$\text{Direct Vulnerability Risk Score} = (Au*1 + Al*2 + Am*5 + Ah*10)*V*P$$

$$\text{Derivative Vulnerability Risk Score} = ((Au*1 + Al*2 + Am*5 + Ah*10)*V*P) + (Lu*1 + Ll*2 + Lm*5 + Lh*10)$$

The risk factors (sometimes called variables) in these example equations are discussed below. Since, the derivative vulnerability risk score equation 212-1 overlaps with the direct vulnerability risk score equation 210-1, the direct vulnerability risk score equation 210-1 will be discussed first. The risk factors included within the brackets of the direct vulnerability risk score equation 210-1 are weighted based on the importance of each system having the vulnerability for which a risk score is being generated. Below is a list of risk factors and information on how these risk factors are determined and what weighting is associated with them:

(Au) "Au" 214, which is the number of systems having (A) the vulnerability for which a risk score is being generated, and (B) the vulnerability at those systems has unknown severity, or alternatively the systems have unknown importance, meaning that those systems have not been assigned an importance rating. Vulnerabilities with unknown severity have not been assigned a severity rating. Categorizing each system within a large corporation may not be productive use of the administrator's time, but omitting these systems from the risk assessment would give an inaccurate risk assessment, and are thus included in the generated risk score. As such, in this example, the contribution of these systems to the direct vulnerability risk score, in equation 210-1, is weighted with a multiplicative weight of one.

(Al) "Al" 216, which is the number of systems having (A) the vulnerability for which a risk score is being generated, and (B) the vulnerability at those systems has a low severity rating, or alternatively the systems have a low importance rating. Vulnerabilities with a low severity rating have either been determined by an administrator to have a low severity (e.g., low severity from the viewpoint of overall security of the distributed system), or have had a low severity rating automatically assigned to them based on one or more characteristics of those systems. Systems with a low importance rating have either been determined by an administrator to have low importance (e.g., low importance from the viewpoint of overall security of the distributed system), or have had a low importance rating automatically assigned to them based on one or more characteristics of those systems. As such, in this example, the contribution of these systems to the direct vulnerability risk score, in equation 210-1, is weighted with a multiplicative weight of two.

(Am) "Am" 218, which is the number of systems having (A) the vulnerability for which a risk score is being generated, and (B) the vulnerability at those systems has a medium severity rating, or alternatively the systems have a medium importance rating. Vulnerabilities with a medium severity rating have either been determined by an administrator to have a medium severity (e.g., medium severity from the viewpoint of overall security of the distributed system) or have had a medium severity rating assigned to them based on one or more characteristics of those systems. Systems with a medium importance rating have either been determined by an administrator to have medium importance (e.g., medium importance from the viewpoint of overall security of the distributed system), or have had a medium importance rating automatically assigned to them based on one or more characteristics of those systems. As such, in this example, the contribution of these systems to the direct vulnerability risk score, in equation 210-1, is weighted by a multiplicative weight of five.

(Ah) "Ah" 220, which is the number of systems having (A) the vulnerability for which a risk score is being generated, and (B) a high (or critical) severity rating, or alternatively the systems have a high (or critical) importance rating. Vulnerabilities with a high or critical severity rating have either been determined by an administrator to have a high or critical severity (e.g., high or critical severity from the viewpoint of overall security of the distributed system) or have had a high severity rating assigned to them based on one or more characteristics of those systems. Systems with a high (or critical) importance rating have either been determined by an administrator to have high (or critical) importance (e.g., high (or critical) importance from the viewpoint of overall security of the distributed system), or have had a high (or critical) importance rating automatically assigned to them based on one or more characteristics of those systems. As such, in this example, the contribution of these systems to the direct vulnerability risk score, in equation 210-1, is weighted by a multiplicative weight of ten.

In some embodiments, the computer system severity rating or computer system importance rating is based on whether (or the extent to which) the computer system stores or has access to sensitive information or provides important services. Thus, in some embodiments, computer systems that provide certain predefined services, or that store or have access to particular predefined types of sensitive information are automatically (e.g., through the use of a rule) as having a severity rating or importance rating no lower than a corresponding value. The use of such rules to categorize computer systems with respect to importance or vulnerability severity can substantially reduce the burden on administrators to categorize the machines or computer systems in their networks.

In some embodiments, the values of vulnerability risk factors described above, for any respective vulnerability, are determined through queries to the endpoint machines capable of having the vulnerability, sent via the linear communication orbits, thereby enabling efficient collection of information identifying the endpoint machines having the respective vulnerability. In some embodiments, the severity rating of the vulnerability at each machine is also obtained using the same queries, and the resulting collected data is used to determine or generate the values of vulnerability risk factors described above.

In addition, in this example, the weighted summation of the risk factors (e.g., Au, Al, Am and Ah) representing counts of systems having the vulnerability for which a risk score is being generated (i.e., what is contained within the brackets of the direct vulnerability risk score equation 210-1) is multiplied by at least one of the following two factors:

(V) Third Party Vulnerability Rating 222. A third party vulnerability rating, sometimes called a vulnerability score for the vulnerability for which a risk score is being generated, may be a number on a scale of one to ten that rates how damaging the vulnerability is (e.g., a CVSS score, or CVSS v3.0 rating, which is optionally mapped into one of several predefined numerical ranges, such as ranges for vulnerability severities of: none, low, medium, high and critical). Thus, the summation of what was calculated in the brackets in the direct vulnerability risk score equation 210-1 is multiplied by a number corresponding to a vulnerability rating for the vulnerability for which a risk score is being generated.

(P) Patch to fix the vulnerability 224. This multiplicative factor, which is optional (e.g., has a value of 1 if not used), indicates whether or not a patch for remediating the vulnerability is available. In this example, when a patch is available to remediate the vulnerability for which a risk score is being generated, the Patch (P) factor in the direct vulnerability risk score equation 210-1 has a value of one, and when no patch is available to remediate the vulnerability for which a risk score is being generated, the Patch (P) factor in the direct vulnerability risk score equation 210-1 has a value of two. This doubling of the value of risk score when no patch is available to remediate the vulnerability causes vulnerabilities with no applicable patch to be assigned a higher risk score than the risk score they would be assigned if an applicable patch were available. As a result, such vulnerabilities are more likely to be positioned higher in the ranked listing of vulnerabilities shown in FIG. 2 and thereby brought to the attention of the system administrator.

After direct vulnerability risk scores 206-1 and 206-2 are determined for multiple vulnerabilities, the vulnerabilities are (or can be, in response to a user command) sorted in the user interface shown in FIG. 2 based on their direct vulnerability risk scores, thereby making it easy for an administrator to identify the vulnerabilities presenting highest risk to the security of the overall distributed system. Higher values of the direct vulnerability risk score indicate that the corresponding vulnerabilities are more critical and are accordingly brought to the attention of an administrator using the user interface of FIG. 2.

Turning to the Derivative Vulnerability Risk Score equation 212-1, the derivative vulnerability risk scores are calculated by taking the direct vulnerability risk score equation 210-1 and adding to that score a weighted summation of additional items, sometimes called derivative vulnerability risk factors. The values of the additional items are each multiplied by a respective predetermined or assigned weight in order to weight their importance or contribution to the derivative vulnerability risk score for each vulnerability for which a derivative vulnerability risk score is being generated. In this example, the additional risk factors are:

(Lu) "Lu" 226, which is the number of systems having an unknown importance rating that can be reached, via lateral movement, from any system having the vulnerability for which a risk score is being generated. The identification or counting of systems with an unknown importance rating is discussed above. In this example, the contribution of these systems to the derivative vulnerability risk score, in equation 212-1, is weighted by a multiplicative weight of one.

(Ll) "Ll" 228, which is the number of systems having a low importance rating that can reached, via lateral movement, from any system having the vulnerability for which a risk score is being generated. The identification or counting of systems with a low importance rating is discussed above. In this example, the contribution of these systems to the derivative vulnerability risk score, in equation 212-1, is weighted by a multiplicative weight of two.

(Lm) "Lm" 230, which is the number of systems with a medium importance rating that can be reached via lateral movement from any system having the vulnerability for which a risk score is being generated. The identification or counting of systems with a medium importance rating is discussed above. In this example, the contribution of these systems to the derivative vulnerability risk score, in equation 212-1, is weighted by a multiplicative weight of five.

(Lh) "Lh" 232, which is the number of systems with a high (or critical) importance rating that can be reached, via lateral movement, from any system having the vulnerability for which a risk score is being generated. The identification or counting of systems with a high (or critical) importance rating is discussed above. In this example, the contribution of these systems to the derivative vulnerability risk score, in equation 212-1, is weighted by a multiplicative weight of ten.

In some embodiments, the plurality of vulnerability risk factors includes one or more lateral movement values (e.g., derivative vulnerability risk factors, examples of which are provided above), each lateral movement value corresponding to a number of logically coupled machines, logically coupled via lateral movement to any of the machines affected by the respective vulnerability, and having a corresponding predefined importance rating or corresponding vulnerability severity rating. Methods and structures for generating lateral movement values, also sometimes herein called derivative risk factors, are discussed below.

In some embodiments, the plurality of vulnerability risk factors includes a combination (e.g., a linear combination, an example of which is provided above) of two or more lateral movement values, each lateral movement value corresponding to a number of logically coupled machines, logically coupled via lateral movement to any of the machines affected by the respective vulnerability, and having a corresponding predefined importance rating or corresponding vulnerability severity rating.

Using the vulnerability risk factors, risk scores (i.e., direct and derivative risk scores) are determined for each vulnerability in a set of predefined vulnerabilities. As shown in FIG. 2, in this example "vulnerability 1" 202 has a direct vulnerability risk score 206-1 of 42, and "vulnerability 2" 204 has a direct vulnerability risk score 206-2 of 21. In some embodiments, or in accordance with a user command, the vulnerabilities are sorted based on the direct vulnerability risk scores generated using equation 210-1, with those vulnerabilities having the highest values (i.e., direct vulnerability risk scores) being positioned at the top (or bottom) of the listed vulnerabilities.

As shown in FIG. 2, "vulnerability 1" 202 has a derivative risk score 208-1 of 462, and "vulnerability 2" 204 has a derivative risk score 208-2 of 231. In some embodiments, or in accordance with a user command, the vulnerabilities are sorted based on the derivative risk score generated using equation 212-1, with those vulnerabilities having the highest values (i.e., derivative vulnerability risk scores) being positioned at the top (or bottom) of the listed vulnerabilities. In the example in FIG. 2, "vulnerability 1" has both the highest value for the direct vulnerability risk score 210, and the derivative risk score 212. However, there may be instances where one vulnerability has the highest derivative risk score 212 of all the vulnerabilities listed in the user interface, but a direct vulnerability risk score 210 that is not the highest of all the vulnerabilities listed in the user interface. In some embodiments, the administrator may choose to sort the list of vulnerabilities by either direct vulnerability risk scores 210 or derivative risk scores 212.

After the server system (e.g., in response to a command from the administrator, or by default) sorts the vulnerabilities based on the direct vulnerability risk score 210 or the derivative risk score 212, the user interface of FIG. 2 presents the administrator with at least two options with respect to any respective vulnerability of the listed vulnerabilities, including an option (e.g., a link for accessing one or more remediation tools) for performing a remedial action (e.g., where the remedial actions are performed by remedial action module 1324 (see FIG. 13)) to remediate or reduce the impact of the respective vulnerability in at least a subset of the machines affected by the respective vulnerability, and an option (e.g., a link) for accessing additional information associated with the respective vulnerability (e.g., by clicking on one of the vulnerability factors to determine which machines are affected by the respective vulnerability, or which machines can be used to reach, via lateral movement, machines having the respective vulnerability).

The remedial action 234 region (e.g., column) included in the user interface 201 includes one or more remedial action buttons for each vulnerability (e.g., a remedial action button for vulnerability 1 236 and a remedial action button for vulnerability 2 238). While the remedial actions applicable to any respective vulnerability are usually vulnerability specific, the same types of remedial measures are applicable to many vulnerabilities. There are many types of vulnerabilities, and corresponding types of remedial measures, and thus the following list of types of remedial measures is not exhaustive. Examples of types of remedial measures are:

End one or more open sessions of one or more respective users, so as to reduce opportunities for lateral movement between systems;

Restart one or more respective systems in order to clear all active sessions on the one or more systems;

Remove a user from an administrative group, or a subgroup (e.g., a group of users) from an administrative group, so as to reduce opportunities for lateral movement between systems;

Quarantine one or more respective systems, to give the administrator time to further inspect the one or more respective systems and apply remediation measures to the one or more respective systems;

Initiate installation of a software patch to one or more systems having the vulnerability so as to mitigate or remove the vulnerability from those systems;

Stop a service, for example a service hosted by one or more particular systems, to prevent a respective vulnerability from being exploited using the service; and Change a configuration of one or more respective systems.

To give the administrator a better understanding of how lateral movement occurs, and where a respective remedial action could be performed, a graph can be displayed in the user interface. The graph can be accessed in numerous ways, but for the sake of this example, the administrator can select any one of the following risk factors (Au, Al, Am, Ah, Lu, Ll, Lm, or Lh) for any one of the vulnerabilities to bring up a corresponding graph. Depending on the risk factor the administrator has selected, a different graph or portion of a graph may be displayed in the user interface, or the manner of presentation of the graph or the information shown in the graph may differ.

Figure 3:
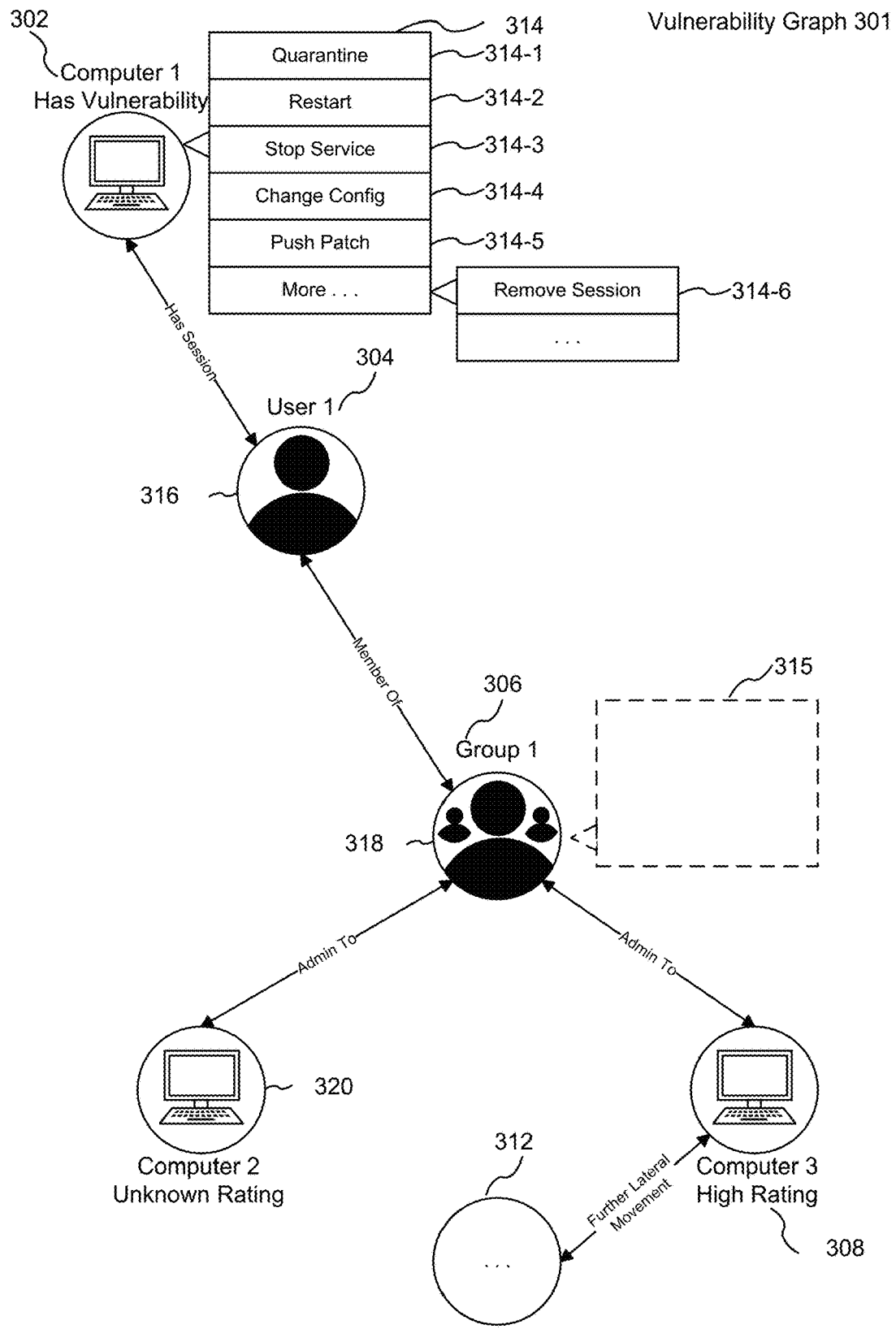
FIG. 3 illustrates a block diagram of an example user interface that displays how critical information can be accessed via lateral movement between systems within the distributed system.

FIG. 3 shows a user interface that includes graph 301, which is displayed in response to selecting a lateral movement user interface element 232-1, corresponding to a risk factor for systems with a high (or critical) importance rating, and associated with vulnerability 1 in FIG. 2. Within the graph 301, a path that a potential attacker could use to gain access to system(s) with a high (or critical) importance rating is shown. In the example shown in FIG. 3, an identified computer that has a vulnerability is "Computer 1" 302. "Computer 1" 302 also has an active session with "User 1" 304. If an attacker were to compromise "Computer 1" 302, then the attacker would be able to leverage any of User 1's administrative rights. Since "User 1" 304 is member of "Group 1" 306, and members of "Group 1" have administrative rights to both "Computer 2" 308 and "Computer 3" 310, then the attacker would be able to get access to both "Computer 2" 308 and "Computer 3" 310. "Computer 2" 308 is classified as a computer with an unknown importance rating, and "Computer 3" 310 is classified with a high (or critical) importance rating. Thus, an attacker would be able to use the compromised "Computer 1" 302 to get access to "Computer 3" 310, which has a high (or critical) importance rating. Stemming from "Computer 3" 310 is hypothetical further lateral movement 312 that could occur if an attacker gained access to that system.

Using the user interface of FIGS. 3, the administrator is able to select and apply remedial actions to specific systems or to update privileges of specific administrators (e.g., users) and groups of administrators. For example, a list or set of remedial actions 314 applicable to "Computer 1" is shown in FIG. 3. The list or set of remedial actions 314 includes remedial actions such as:

Quarantine the system 314-1, to give the administrator time to further inspect the system and apply remediation measures to the system;

Restart the system in order to clear all active sessions on the system 314-2;

Stop a service hosted by, or used by, Computer 1 314-3;

Change a configuration of the system (i.e., Computer 1) 314-4;

Apply a software patch (or initiate application of a software patch) to remove or mitigate the vulnerability 314-5; and End one or more open (e.g., active) sessions of one or more respective users 314-6.

An additional optional listing or set of remedial actions 315 can be placed near or next to either the "User 1" symbol 316 associated with "User 1" 304, the Group 1 symbol 318 associated with the "Group 1" 306, or the Computer 3 symbol 320 associated with "Computer 3" 310. For illustrative purposes this optional listing or set of remedial actions 315 is placed next Group 1 symbol 318, associated with the "Group 1" 306. An example of a remedial action in the optional listing or set of remedial actions 315 is removing a user or a subgroup of users from an administrative group, so as to reduce opportunities for lateral movement between systems. Another example would be to adjust the administrative rights of the users in an administrative group, for example, reducing the administrative rights granted to the users in that administrative group.

Lateral Movement Values Determination

In some embodiments, the lateral movement values (sometimes herein called derivative risk factors), used in determining some of the risk scores discussed in this document, are determined (e.g., by a respective server system, such as remote server 110, FIGS. 1A, 13) by generating one or more graphs representing the relationships between users, groups of users, and machines, and then using the one or more graphs to determine the lateral movement values. For the purposes of this discussion, users, groups of users and machines are all considered to be "assets," albeit of three different types, and each asset corresponds to a node in the graph or graphs generated by the server system. Relationships between the assets in the system are represented by a set of data structures, and correspond to edges or connections between assets in the graph or graphs.

For example, in some embodiments a node data structure, or a set of node data structures, is used to store data representing each known asset in the system. In another example, relationship data structures are used to represent (e.g., store information representing) the relationship of each asset (corresponding to a node in the graph or graphs) to every other asset to which it has a direct or indirect relationship. The assets to which a respective asset has a direct or indirect relationship are sometimes called reachable assets, as they are reachable from the respective assets. For a respective user, the relationship data structures store information denoting each group to which the respective user belongs, each machine to which the respective user has an open session, each machine to which the respective user has access, and the nature of that access.

Figure 14:
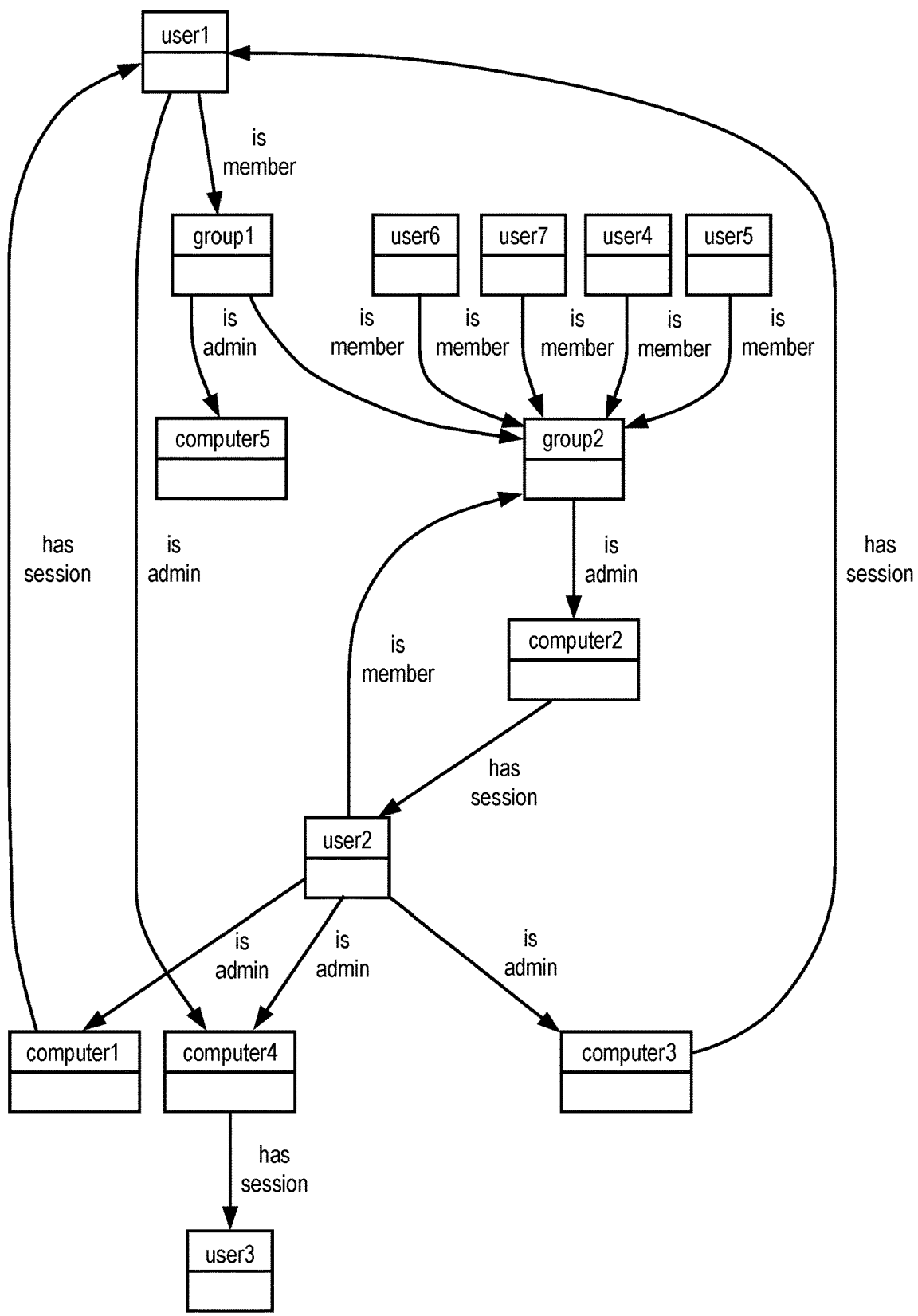
FIG. 14 illustrates a node map of a system having a plurality of interconnected machines, users and groups of users in accordance with some embodiments.

In the graph or graphs, there is a path between each pair of assets that have a relationship, and that path may have one or more path segments. FIG. 14 shows an example of such a graph, albeit a very small graph having just 14 assets, whereas the graph or graphs in the computer system for a large organization may have tens of thousands, hundreds of thousands or millions of assets. As shown in FIG. 14, each path segment in the graph or graphs has a type, such as "is member" indicating that the path segment is between a user and group of users; "is admin" indicating that the path segment represents administrative rights of a user or a group of users to a machine; "has session" indicating that the path segment is between a user and a machine as the result of an open session between the user and the machine.

In some embodiments, with respect to each respective asset (e.g., each known user, group of users and machine in the system), each relationship with another asset in the system (e.g., any asset reachable from the respective asset) is represented (e.g., in a respective relationship data structure for each such node) by an identifier of the other node and relationship descriptor, which includes a set of flags that indicate the nature of the relationship, which in turn is based on the types of path segments connecting the two assets in the graph. For example, the flags can be include some of all of the following:

(A) a first flag (e.g., "isAdminFlag"), indicating whether any administrative rights are used to establish the relationship between the two assets;

(B) a second flag (e.g., "hasSessionFlag"), indicating whether there is a computer with a user session in the path between the two assets;

(C) a third flag (e.g., "isMemberFlag"), indicating whether, in the path between the two assets, there is path segment connecting a user to group of users to which that user belongs;

(D) a fourth flag (e.g., "multipleSessionFlag"), indicating whether, in the path between the two assets, there is more than one machine having an open session with a user;

(E) a fifth flag (e.g., "elevateToComputerServiceAccountFlag"), indicating whether, in the path between the two assets, there is a computer that has administrative rights to another computer, or a computer that is a member of a group in the path; and/or (F) a sixth flag (e.g., "pastLevelZeroFlag") if the two assets are not directly connected in the graph (e.g., there are one or more nodes in the shortest path in the graph between the two assets).

In the process of generating the data structures representing the portion of the graph between a respective asset and all other assets reachable from the respective asset, when adding the information for a "new" asset, that is reachable (from the respective asset) via one or more assets for which a relationship descriptor has already been generated, the relationship descriptor the new asset can be determined, at least in part, by combing the relationship descriptors for the assets in the path between the respective asset and the new asset.

Once the relationship data structures used to represent the relationships between an initial asset of set of assets and every other each asset to which the initial asset of set of assets has a direct or indirect relationship have been generated, the lateral movement values needed for any of the derivative risk scores described in this document can be computed using the information in the node data structures and relationship data structures, both to identify the reachable assets and to count the numbers of reachable assets that meet the requirements for each lateral movement value.

It is noted that storing the full path from every asset to every other asset in a large distributed system would typically require considerably more memory than is practical, and would make determining lateral movement values expensive for large scale systems (e.g., system having tens or hundreds of thousands of machines). For this reason, in some embodiments the relationship descriptors are each represented as a set of bit values, one for each flag in the relationship descriptor. In this way, the relationship descriptors for a reachable asset can be stored in just one or two bytes of storage.

To prevent the graphing computation process from getting caught in lookup loops, a reachable asset is added to the set of known reachable assets for a given respective asset only when either (A) the reachable asset is not already represented in the data structures as a reachable assets, or (B) a shorter path to that reachable asset than the paths already represented in the data structures, has been found, in which case the relationship descriptor for the reachable asset is updated based on the shorter (more direct) path.

In some embodiments, the determination of reachable assets, and the determination of the more direct path to each of those reachable assets, is performed for every known asset in the system. This can lead to a large amount of duplicate work, as many paths (e.g., portions of paths) are traversed repeatedly in making those determinations. Furthermore, simultaneously storing information representing all reachable assets for all known assets in a large system is not practical. As a result, once all the needed counts of assets have been determined, for determining the lateral movement values needed to generate risk scores for a group of assets or a set of vulnerabilities, the data structures representing the reachable assets is typically discarded to make room for the data structures representing the reachable assets of another group of assets. However, to make this process more efficient, in some embodiments, the data structures representing the reachable assets for the largest groups of users are cached (e.g., stored in a fixed amount memory and retained), until the lateral movement values and/or risk scores have all been computed, or other cache eviction criteria are satisfied.

During graph traversal, for generating data representing all the reachable assets for a given asset or group of assets, whenever a cached group is encountered, the stored reachable assets are copied to (or used temporarily as) the data structures representing the reachable assets for the given asset or group of assets.

In some embodiments, data structures representing all reachable assets of the groups with the largest numbers of direct members are added to a fixed size cache (e.g., a cache having a configurable size, but that remains at the configured size unless and until an administrator changes the configured size), starting with the largest groups, and progressing to smaller groups, until the cache is full. In some embodiments, the computation of reachable assets, and the corresponding relationship descriptors, for the largest groups in the system is performed first, making that information available during the computation of reachable assets and lateral movement values for the entire system. The reachable assets from a group are the same for all members of the group, so maintaining a cache of the reachable assets for large groups improves the efficiency of determining reachable assets and lateral movement values derived from the data representing the reachable assets.

In some embodiments, many assets' only connection to reachable assets is through a single large group or a small number of large groups. In some embodiments, for each such asset that is a direct member of one or more cached groups, to further reduce the amount of work required to generate counts of various types of reachable assets (which, in turn are used to generate lateral movement values), counts of reachable assets are initialized to the values (e.g., counts of various types of reachable assets) for the largest cached group of which it is a direct member.

Group Risk Assessment and Remediation

Figure 4:
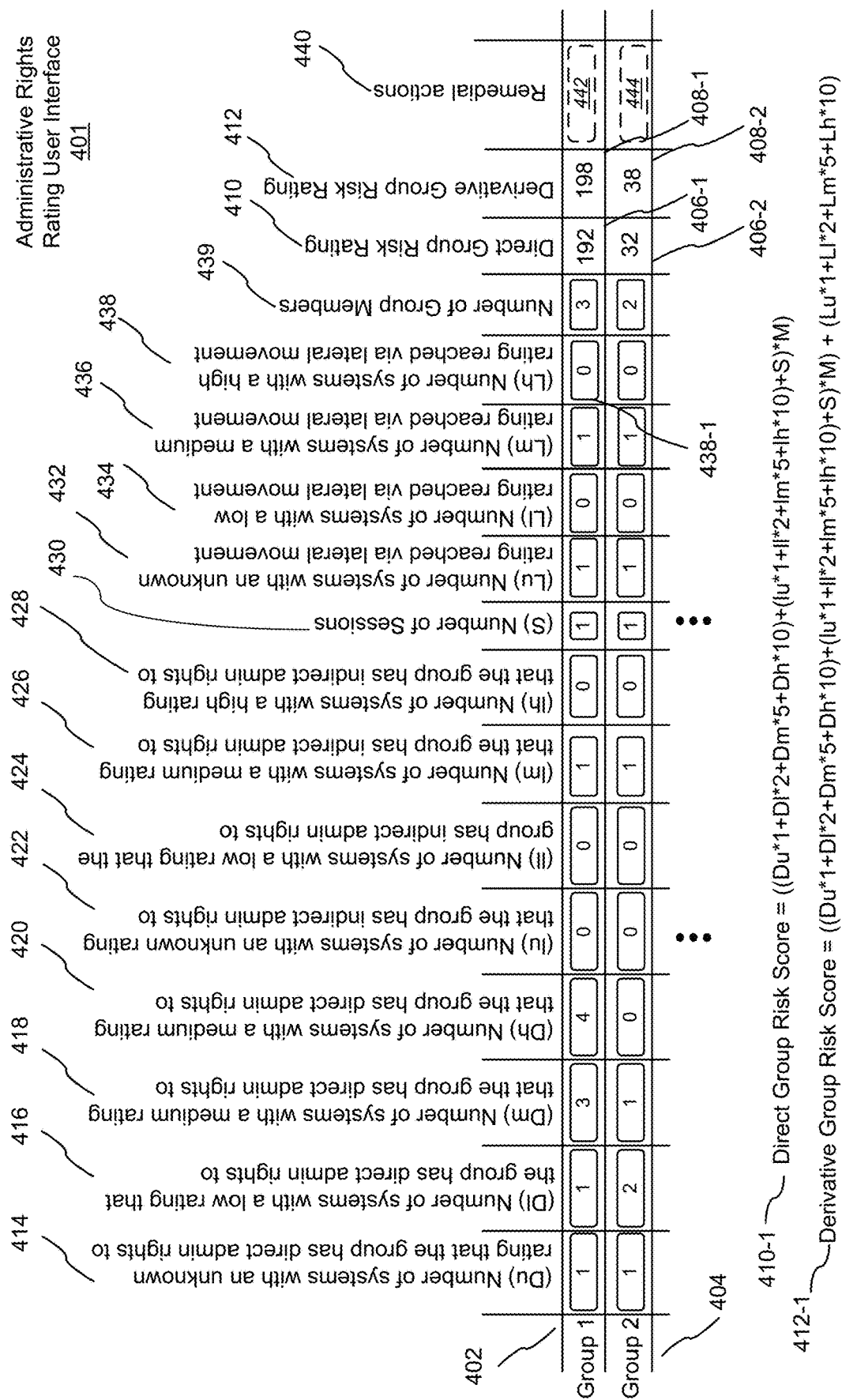
FIG. 4 illustrates a block diagram of an example user interface that displays groups based on weighted group (e.g., user group) risk assessment values.

Allowing an administrator (or other user with the authority to identify and remediate security risks) to have different perspectives (i.e., viewpoints) of how a security risk could affect the network, allows the administrator to better remediate the security risks that are currently or potentially causing the largest amount of comprise to the systems within a distributed system. While the user interface of FIG. 2 presents rated vulnerabilities affecting the network, the user interface of FIG. 4 presents a different perspective to help the administrator protect the server system (e.g., a network) from security risks. The following perspective, seeks to mitigate one possible example scenario where an administrative group, or more accurately the set of users in an administrative group, has access to too many machines within the distributed system. Using traditional approaches, an administrator may not be able to identify this group or realize that the group has more access to the distributed system than was intended. For example, some groups may be nested within each other, which can hide the true breadth of administrative control by the members of the group. Therefore, this additional perspective, which may be called the administrative rights perspective, provides an administrator with information regarding how many systems a group of users has administrative rights to. Based on administrative rights information, an administrative rights scoring system can be used (e.g., by determining group risk assessment values for identified groups of users), which identifies how many machines groups of users have administrative rights to. Using the administrative rights information, and creating a sorted list of groups of users based on how many machines they have access to, can prevent the above scenario from occurring.

While the sorted list based on administrative rights information is discussed in a general way, additional details regarding the sorted list will be discussed below and in reference to both FIGS. 4 and 5. FIG. 4 shows an administrative rights rating user interface 401 that presents to the administrator information concerning how various groups of users having administrative rights to respective machines can affect the security of the network. The presented information includes scores or security assessment values determined at least in part by a security risk assessment value module (e.g., module 1323, FIG. 13) of a server system (e.g., server system 1300, FIG. 13) used by the administrator.

While FIG. 4 shows a specific set of fields or columns, these should be considered examples of the types of information that may be presented in an administrative rights rating user interface. For example, in other implementations, the administrative rights rating user interface may include fewer fields or columns, such a single field per user group indicating a total number of systems to which the user group has direct administrative rights, and/or a field indicating a total number of systems to which the user group has indirect administrative rights directly with the vulnerability, instead of the more detailed presentation in FIG. 4. In other example, the administrative rights rating user interface may include a single lateral movement field per user group, indicating a total number of systems reachable by users of the user group, instead of the more detailed presentation in FIG. 4. In yet another example, instead of numeric values, some of the fields, such as the risk scores may indicate a risk category (e.g., critical, high, medium, low, or none) for each listed user group. In the latter example, the user groups may still be ordered in the administrative rights rating user interface based on numerical risk scores, even though the risk scores themselves are presented as risk categories. Furthermore, the administrative rights rating user interface may include additional fields for each user group, beyond or different from those shown in FIG. 4. Examples are: the number of users who are direct members of the user group; the number of user who are indirect members of the user group; the number of inbound relationships (path segments) that the user group has with other assets in the system; and/or the number of outbound relationships (path segments) that the user group has with other assets in the system.

While FIG. 4 shows a user interface 401 with two user groups sorted by their group risk assessment values (also herein called user group risk assessment values), in other examples the number (G) of user groups for which risk scores are generated is typically an integer greater than 2, 5, 10, or 20, and thus the user interface 401 would show a larger list of groups sorted by their group risk assessment values. In the example shown in FIG. 4, the two groups are specified as, "Group 1" 402, and "Group 2" 404. These two groups each have a direct group risk assessment value 406-1 and 406-2 based upon certain administrative rights information, which is described in detail below. The groups also have derivative group risk assessment values 408-1 and 408-2 based upon certain administrative rights information, which is described in detail below.

As discussed above, each system in the network can be assigned, either automatically or by an administrator, a system rating.

As briefly discussed earlier, for the user groups identified in the administrative rights information, both a direct group risk assessment value, and a derivative group risk assessment value can be determined. It is noted that in some implementations, the administrative rights information is obtained from the Active Directory (trademark of Microsoft) service that runs on Windows Server (trademark of Microsoft), but in other implementations is obtained from an identity, authentication and authorization store that enables administrators to manage permissions and access to network resources.

A direct group risk assessment value (also sometimes called a direct user group assessment value) is based on a count of machines to which the group has direct administrative rights (i.e., access). A derivative group risk assessment value (also sometimes called a derivative user group assessment value), is a value (i.e., score) that is based in part on how many systems can be indirectly accessed by users in the group, using lateral movement; this value is useful in that it indicates how many systems could reached, or the aggregate importance of systems that could be reached, and compromised by an attacker who gains access to the credentials of any user in the group. In one example, as shown in FIG. 4, there are two equations 410-1 and 412-1, which are for determining a direct group risk assessment value 410, and a derivative group risk assessment value 412. Direct group risk assessment values and/or derivative group risk assessment values are sometimes herein called user group risk scores or group risk scores. These equations (i.e., a direct group risk assessment equation 410-1 and a derivative group risk assessment equation 412-1), shown below, are used to generate direct group risk assessment values and derivative group risk assessment values, and are based on weighted combinations of risk factors, each of which is discussed below. While these specific equations are shown, other equations based on the same or similar risk factors may be used instead in other embodiments. For example, in other examples, different values for the weights applied to the risk factors can be used instead, and those weights may be specified by the administrator depending on their specific needs.

$$\text{Direct Group Risk Score} = ((Du*1 + Dl*2 + Dm*5 + Dh*10) + (lu*1 + ll*2 + lm*5 + lh*10) + S)*M)$$

$$\text{Derivative Group Risk Score} = ((Du*1 + Dl*2 + Dm*5 + Dh*10) + (lu*1 + ll*2 + lm*5 + lh*10) + S)*M + (Lu*1 + Ll*2 + Lm*5 + Lh*10)$$

The risk factors (sometimes called variables) in these example equations are discussed below. Since, the derivative group risk assessment equation 412-1 overlaps with the direct group risk assessment equation 410-1, the direct group risk assessment equation 410-1 will be discussed first. The risk factors included within the first interior brackets (i.e., the leftmost interior bracket) of the direct user group risk assessment equation 410-1 are weighted based on the importance of each system to which the group (for which a group risk assessment value is being generated) has direct administrative rights. Below is a list of direct risk factors and information on how these direct risk factors are determined and what weighting is associated with them:

(Du) "Du" 414, which is the number of systems (A) to which the group (for which the group risk assessment value is being generated) has direct administrative rights, and (B) have unknown importance. The determination of system importance ratings is discussed above. As noted above, systems with an unknown importance have not been assigned an importance rating. In this example, the contribution of these systems to the direct group risk assessment value, in equation 410-1, is weighted with a multiplicative weight of one.

(Dl) "Dl" 416, which is the number of systems (A) to which the group (for which the group risk assessment value is being generated) has direct administrative rights, and (B) have a low importance rating. The determination of system importance ratings is discussed above. In this example, the contribution of these systems to the direct group risk assessment value, in equation 410-1, is weighted with a multiplicative weight of two.

(Dm) "Dm" 418, which is the number of systems (A) to which the group (for which the group risk assessment value is being generated) has direct administrative rights, and (B) have a medium importance rating. In this example, the contribution of these systems to the direct group risk assessment value, in equation 410-1, is weighted by a multiplicative weight of five.

(Dh) "Dh" 420, which is the number of systems (A) to which the group (for which the group risk assessment value is being generated) has direct administrative rights, and (B) have a high importance rating. In this example, the contribution of these systems to the direct group risk assessment value, in equation 410-1, is weighted by a multiplicative weight of ten.

In addition, in this example, the weighted summation of the direct risk factors (e.g., Du, Dl, Dm, and Dh) representing counts of systems to which that the group has administrative rights (i.e., what is contained within the leftmost interior bracket of the direct group risk assessment equation 410-1) is added to a weighted summation of indirect risk factors (e.g., lu, ll, lm, and lh) representing counts of systems to which the group has indirect administrative rights (i.e., what is contained within the rightmost interior brackets of the direct group risk assessment equation 410-1). Indirect administrative rights are administrative rights are the administrative rights of other users that the user can exploit through membership in one or more administrative groups.

(lu) "lu" 422, which is the number of systems (A) to which the group (for which the group risk assessment value is being generated) has indirect administrative rights to for which group risk assessment value is being generated, and (B) have unknown importance. The determination of system importance ratings is discussed above. As noted above, systems with an unknown importance have not been assigned an importance rating. In this example, the contribution of these systems to the direct user group risk assessment value, in equation 410-1, is weighted with a multiplicative weight of one.

(ll) "ll" 424, which is the number of systems (A) to which the group (for which the group risk assessment value is being generated) has indirect administrative rights to for which group risk assessment value is being generated, and (B) have a low importance rating. The determination of system importance ratings is discussed above. In this example, the contribution of these systems to the direct group risk assessment value, in equation 410-1, is weighted with a multiplicative weight of two.

(lm) "lm" 426 which is the number of systems (A) to which the group (for which the group risk assessment value is being generated) has indirect administrative rights to for which group risk assessment value is being generated, and (B) has a medium importance rating. In this example, the contribution of these systems to the direct group risk assessment value, in equation 410-1, is weighted by a multiplicative weight of five.

(lh) "lh" 428, which is the number of systems (A) to which the group (for which the group risk assessment value is being generated) has indirect administrative rights to for which group risk assessment value is being generated, and (B) a high importance rating. In this example, the contribution of these systems to the direct group risk assessment value, in equation 410-1, is weighted by a multiplicative weight of ten.

In addition to the summation of the direct and indirect risk factors, the number of open sessions is also added to the summation of the direct and indirect risk factors. The number of open sessions 430 are the number of sessions that the users of the group currently have running. In some instances, a single user within the group may have one or more sessions running at the same time (e.g., signed into multiple devices). In some embodiments, a weighted summation of the direct risk factors (e.g., Du, Dl, Dm, and Dh), the indirect risk factors (e.g., lu, ll, lm, and lh), and the number of sessions 430, is multiplied by the number of group members 439 that are a part of the respective group for which the group risk assessment value is being generated. The resulting value is the direct group risk assessment value 410.

After direct group risk assessment values 410 (e.g., 406-1 and 406-2) are determined for multiple user groups, the user groups are (or can be, in response to a user command) sorted in the user interface shown in FIG. 4 based on their group risk assessment values, thereby making it easy for an administrator to identify the groups presenting highest risk to the security of the overall distributed system. Higher values of the direct group risk score indicates that the corresponding user groups are more critical and are accordingly brought to the attention of an administrator using the user interface of FIG. 4.

Turning to the derivative group risk assessment equation 412-1, the derivative group risk assessment values are calculated by taking the direct group risk assessment equation 410-1 and adding to that score a weighted summation of the additional items, sometimes called derivative group risk factors, derivative risk factors, or lateral movement values. The determination of such values is discussed some detail elsewhere in this document. The values of the additional items are each multiplied by a respective predetermined or assigned weight in order to weight their importance or contribution to the derivative group risk assessment value for each group for which the derivative group risk assessment value is being generated. It is noted that the additional items listed here are distinct from the additional items shown in FIG. 2 and included in equation 212-1, even though the same variable names (e.g., Lu, Ll, Lm, and Lh) are used equations 212-1 and 412-1, because the starting points for the counts of systems accessible via lateral movement are different for vulnerability risk assessment and group risk assessment. In this example, the additional risk factors are:

(Lu) "Lu" 432, which is the number of systems having an unknown importance rating that can be reached, via lateral movement, from any system to which a member of the group has administrative rights (and/or access). The identification or counting of systems with an unknown importance rating is discussed above. In this example, the contribution of these systems to the derivative group risk assessment value, in equation 412-1, is weighted by a multiplicative weight of one.

(Ll) "Ll" 434, which is the number of systems having a low importance rating that can be reached, via lateral movement, from any system to which a member of the group has administrative rights (and/or access). The identification or counting of systems with a low importance rating is discussed above. In this example, the contribution of these systems to the derivative group risk assessment value, in equation 412-1, is weighted by a multiplicative weight of two.

(Lm) "Lm" 436, which is the number of systems having a medium importance rating that can be reached, via lateral movement, from any system to which a member of the group has administrative rights (and/or access). The identification or counting of systems with a medium importance rating is discussed above. In this example, the contribution of these systems to the derivative group risk assessment value, in equation 412-1, is weighted by a multiplicative weight of five.

(Lh) "Lh" 438, which is the number of systems having a high importance rating that can be reached, via lateral movement, from any system to which a member of the group has administrative rights (and/or access). The identification or counting of systems with a high importance rating is discussed above. In this example, the contribution of these systems to the derivative group risk assessment value, in equation 412-1, is weighted by a multiplicative weight of ten.

Using the derivative group risk assessment factors (e.g., direct risk factors, indirect risk factors, number of sessions, number of members in the group, and derivative risk factors), group risk assessment values (e.g., direct and derivative risk scores) are determined for each group in a set of predefined groups. As shown in FIG. 4, in this example "Group 1" 402 has a direct group risk assessment value 406-1 of 192, and "Group 2" 404 has a direct group risk assessment value 406-2 of 32. In some embodiments, or in accordance with a user command, the groups are sorted based on the direct group risk assessment values 410 generated using equation 410-1, with those groups having the highest values (i.e., direct group risk assessment values) being positioned at the top (or bottom) of the listed groups.

As shown in FIG. 4, "Group 1" 402 has a derivative group risk assessment value 408-1 of 198, and "Group 2" 404 has a derivative group risk assessment value 408-2 of 38. In some embodiments, or in accordance with a user command, the groups are sorted based on the derivative group risk assessment values 412 generated using equation 412-1, with those user groups having the highest values (i.e., derivative group risk assessment value) being positioned at the top (or bottom) of the listed user groups. In the example in FIG. 4, "Group 1" has both the highest value for the direct group risk assessment value 410, and the derivative group risk assessment value 412. However, there may be instances where one group has the highest derivative group risk assessment value 412 of all the groups listed in the user interface, but a direct group risk assessment value 410 that is not the highest of all the groups listed in the user interface. In some embodiments, the administrator may choose to sort the list of groups by either direct group risk assessment value 410 or derivative group risk assessment value 412.

After the server system (e.g., in response to a command from the administrator, or by default) sorts the groups either based on the direct group risk assessment values 410 or the derivative group risk assessment values 412, the user interface of FIG. 4 presents the administrator with at least two options with respect to any respective group of the listed groups, including an option (e.g., a link for accessing one or more remediation tools) for performing a remedial action (e.g., where the remedial actions are performed by a remedial action module 1324 (see FIG. 13)) to remediate or reduce the impact of the respective security risk in at least a subset of the machines affected by the respective security risk, and an option (e.g., a link) for accessing additional information associated with the respective group (e.g., by clicking on one of the risk factors to determine which machines are directly or indirectly (e.g., using lateral movement) accessible to members of the respective group).

The remedial action 440 region (e.g., column) included in the user interface 401 includes one or more remedial action buttons for each group (e.g., a remedial action button for Group 1 442 and a remedial action button for Group 2 444). While the remedial actions applicable to any respective group are usually group specific, the same types of remedial measures are applicable to many groups. There are many types of security risks affecting user groups that share administrative rights, and corresponding types of remedial measures, and thus the following list of types of remedial measures is not exhaustive. Examples of types of remedial measures are:

End an open session (or sessions) of one or more respective users, so as to reduce opportunities for lateral movement between systems;

Restart one or more respective systems in order to clear all active sessions on the one or more systems;

Remove a user from an administrative group, or a subgroup (e.g., a group of users) from an administrative group, so as to reduce opportunities for lateral movement between systems;

Quarantine one or more respective systems, to give the administrator time to further inspect the respective one or more systems and apply remediation measures to the one or more respective systems;

Apply a patch to one or more systems so as to mitigate or remove a vulnerability from those systems;

Stop a service, for example a service hosted by one or more particular systems, to prevent a respective vulnerability from being exploited using the service; and Change a configuration of a respective system.

To give the administrator a better understanding of how lateral movement occurs, and where a respective remedial action could be performed, a graph can be displayed in the user interface. The graph can be accessed in numerous ways, but for the sake of this example, the administrator can select any one of the following risk factors (Au, Al, Am, Ah, lu, ll, lm, lh, Lu, Ll, Lm, or Lh) for any one of the user groups to bring up a corresponding graph. Depending on the risk factor the administrator has selected, a different graph or portion of a graph may be displayed in the user interface, or the manner of presentation of the graph or the information shown in the graph may differ.

Figure 5:
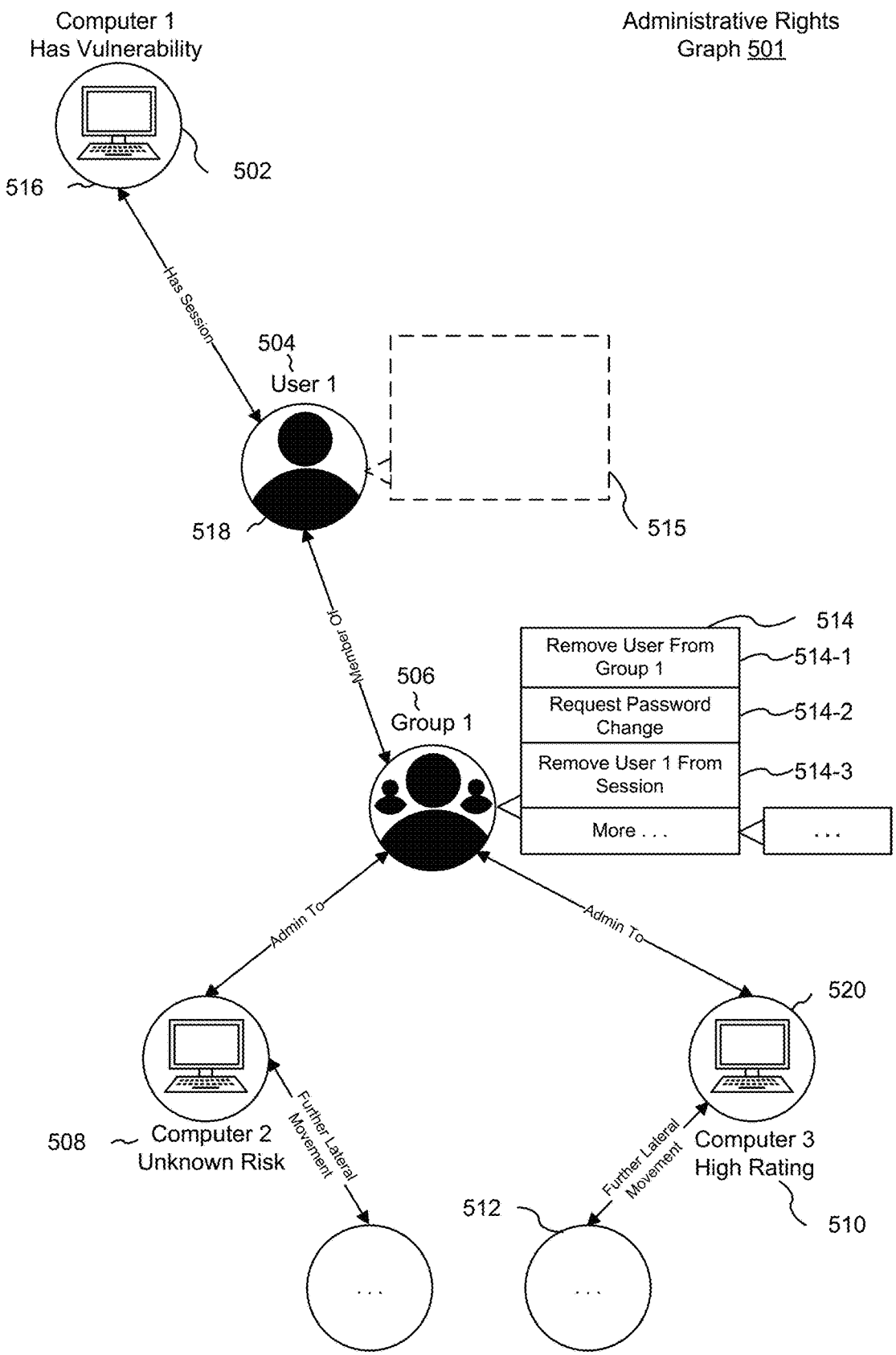
FIG. 5 illustrates a block diagram of an example user interface that displays how critical information can be accessed via lateral movement between systems within the distributed system.

FIG. 5 shows a user interface that includes graph 501, also herein called an administrative rights graph, which is displayed in response to selecting a lateral movement user interface element 438-1, corresponding to a risk factor for systems with a high importance rating, and associated with Group 1 in FIG. 4. Within the graph 501, a path that a potential attacker could use to gain access to system(s) with a high importance rating is shown. In the example shown in FIG. 5, an identified computer that has a vulnerability is "Computer 1" 502. "Computer 1" 502 also has an active session with "User 1" 504. If an attacker were to compromise "Computer 1" 502, then the attacker would be able to leverage any of User 1's administrative rights. Since "User 1" 504 is member of "Group 1" 506, and members of "Group 1" have administrative rights to both "Computer 2" 508 and "Computer 3" 510, then the attacker would be able to get access to both "Computer 2" 508 and "Computer 3" 510. "Computer 2" 508 is classified as a computer with an unknown importance rating, and "Computer 3" 510 is classified with a high importance rating. Thus, an attacker would be able to use the compromised "Computer 1" 502 to get access to "Computer 3" 510, which has a high importance rating. Stemming from "Computer 3" 510 is hypothetical further lateral movement 512 that could occur if an attacker gained access to that system.

Using the user interface of FIGS. 5, the administrator is able to select and apply remedial actions to specific systems or to update privileges of specific users and groups. For example, a list or set of remedial actions 514 applicable to "Group 1" is shown in FIG. 5. The list or set of remedial actions 514 includes remedial actions such as:

Remove User 1 From Group 1, to prevent a compromised user from affecting the rest of Group 1 514-1;
Request User 1 to change their password to protect the group from a potential security risk 514-2; and
Remove active sessions of one or more respective users from one or more computers to reduce opportunities for lateral movement by bad actors 514-4.

An additional optional listing or set of remedial actions 515 can be placed near or next to either the "Computer 1" symbol 516 associated with "Computer 1" 502, the User 1 symbol 518 associated with the "User 1" 504, or the Computer 3 symbol 520 associated with "Computer 3" 510. For illustrative purposes this optional listing or set of remedial actions 515 is placed next the User 1 symbol 518, associated with "User 1" 504.

Machine Risk Assessment and Remediation

Figure 6:
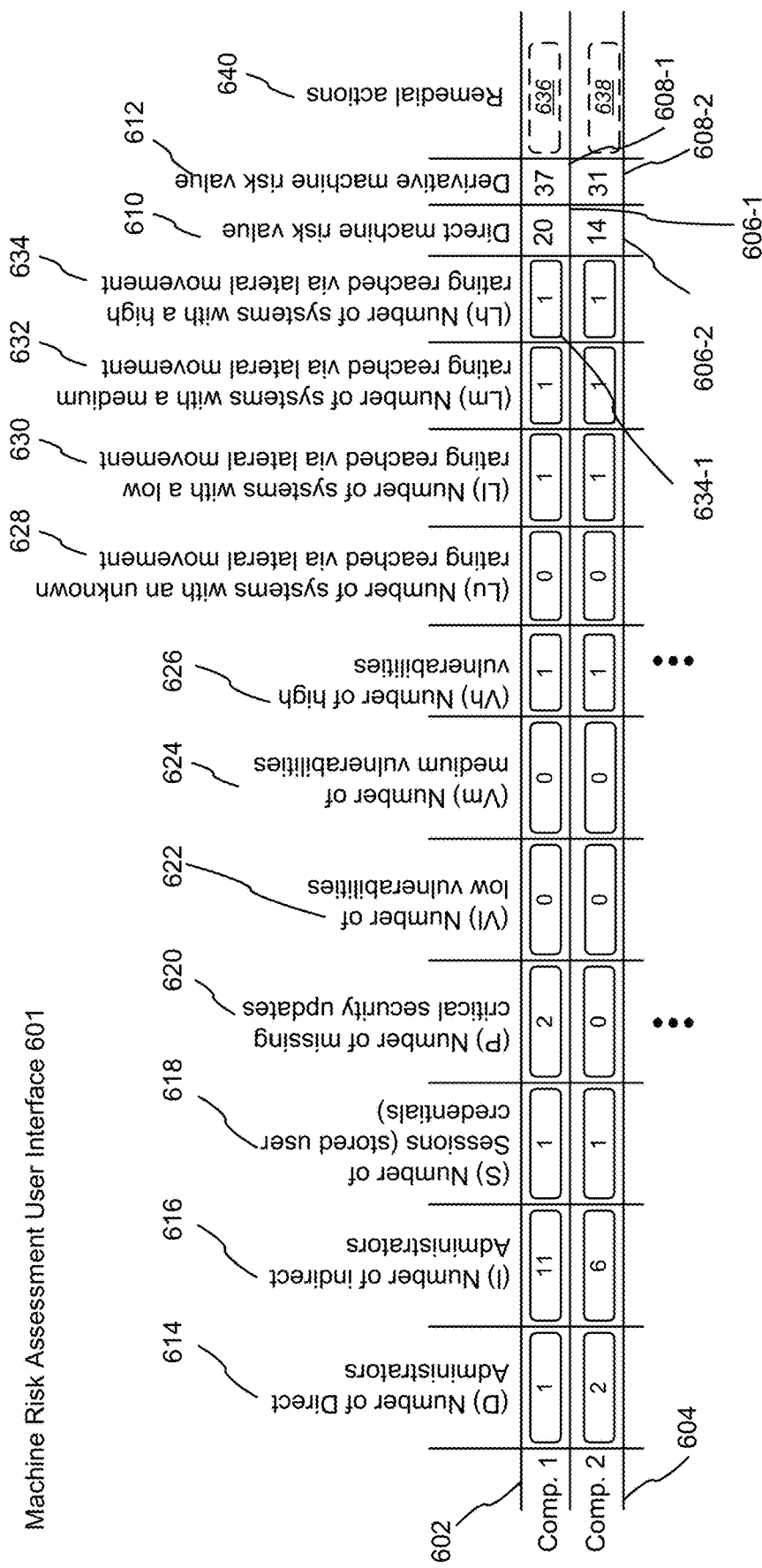
FIG. 6 illustrates a block diagram of an example user interface that displays machines based on weighted machine risk assessment values.

Allowing an administrator to have different perspectives (i.e., viewpoints) of how a security risk could affect the network, allows the administrator to better remediate the security risks that are currently or potentially causing the largest amount of comprise to the systems within a distributed system. While the user interface of FIG. 2 presents prioritized information regarding vulnerabilities affecting the network, and the user interface of FIG. 4 presents prioritized information regarding user groups based on potential security risks of groups, the user interface of FIG. 6 presents a different perspective on security risks to help the administrator protect the distributed system (e.g., a network) from security risks. In particular, the user interface of FIG. 6 seeks to provide the administrator with information regarding which specific machines (herein also referred to as computers or systems) have the highest machine risk assessment value (herein also referred to as a machine risk score). A machine risk assessment value is generated for each machine based on risk factors associated with the respective machine (herein also referred to as system risk information). The server system generates one or more machine risk assessment values (e.g., values 610, 612) for each machine in at least a subset of the machines in the distributed system, and presents in a user interface, such as user interface 601 of FIG. 6, a list of machines. The list of machines is optionally sorted, by default, based on a particular one the machine risk assessment values for each listed machine, or is sorted based on a machine risk assessment value selected by the administrator (e.g., by selecting a column of the user interface 601). Providing the administrator with such tools allows for the administrator to quickly identify machines that present security risks that should be given high priority for review and/or remediation.

While the sorted list based on system risk information has been discussed in a general way, additional details regarding the sorted list in user interface 601 will be discussed below, with reference to FIGS. 6 and 7. FIG. 6 shows a machine risk assessment user interface 601 that includes risk assessment scores (e.g., determined via security risk assessment value module 1323, FIG. 13) and optionally includes information about security risk factors corresponding to the listed machines.

While FIG. 6 shows a specific set of fields or columns, these should be considered examples of the types of information that may be presented in a machine risk assessment user interface. For example, in other implementations, the machine risk assessment user interface may include fewer fields or columns, such a single field per machine indicating a total number of vulnerabilities for the machine, instead of the more detailed presentation in FIG. 6. In other example, the machine risk assessment user interface may include a single lateral movement field per user group, indicating a total number of systems reachable by users of the user group, instead of the more detailed presentation in FIG. 6. In yet another example, instead of numeric values, some of the fields, such as the risk scores may indicate a risk category (e.g., critical, high, medium, low, or none) for each listed machine. In the latter example, the listed machines may still be ordered in the machine risk assessment user interface based on numerical risk scores, even though the risk scores themselves are presented as risk categories. Furthermore, the machine risk assessment may include additional fields for each machine, beyond or different from those shown in FIG. 6. Examples are: the number of inbound relationships (path segments) that the machine has with other assets in the system; and the number of outbound relationships (path segments) that the machine has with other assets in the system.

While FIG. 6 shows two machines sorted by their machine risk assessment values, in other examples the user interface would show a larger list of machines sorted by their machine risk assessment values. In the example shown in FIG. 6, the two machines are specified as, "Comp. 1" 602, and "Comp. 2" 604. These two machines each have a direct machine risk assessment value 606-1 and 606-2 based upon certain machine risk information, also called machine risk factors, described in detail below. The machines also have derivative machine risk assessment values 608-1 and 608-2 based at least in part upon additional machine risk information, described in detail below.

As discussed above, each system in the network can be assigned either automatically or by an administrator, a system rating. These system ratings are then later used as one or more factors in determining the derivative machine risk assessment values.

As briefly discussed earlier, both a direct machine risk assessment value, and a derivative machine risk assessment value can be determined for each machine in at least a subset of the machines in the distributed system. A direct machine risk assessment value for a respective machine is a value (e.g., a score) based on one or more security risks that are present on that respective machine. A derivative machine risk assessment value for a respective machine is a value (e.g., a score) that is in part based on the number of systems that can be used to indirectly access the respective machine, using lateral movement; alternatively, the derivative machine risk assessment value for the respective machine is a value (e.g., a score) that indicates the number of systems that could be compromised, via lateral movement, if the respective machine's security is breached. This value is useful in that it indicates how many systems could be used, or the aggregate importance of systems that could be reached, and compromised by an attacker who gains access to the credentials for the respective machine. In one example, as shown in FIG. 6, there are two equations, which are for determining a direct machine risk assessment value 610, and for determining a derivative machine risk assessment value 612. Direct machine risk assessment values and/or derivative machine risk assessment values are sometimes herein called machine risk scores. These equations (i.e., a direct machine risk assessment equation 610-1 and a derivative machine risk assessment equation 612-1), shown below, are examples of equations used to generate direct machine risk assessment values and derivative machine risk assessment values, and are based on weighted combinations of machine risk factors, each of which is discussed below. While specific equations are shown, other equations based on the same or similar machine risk factors may be used in other embodiments. For example, in other examples, different values for the weights applied to the machine risk factors can be used, and those weights may be specified by the administrator depending on their specific needs.

$$\text{Direct Machine Risk Score} = D + I + S + P + Vl*1 + Vm*2 + Vh*5$$

$$\text{Derivative Machine Risk Score} = (D + I + S + P + Vl*1 + Vm*2 + Vh*5) + (Lu*1 + Ll*2 + Lm*5 + Lh*10)$$

The machine risk factors (sometimes called variables) in these example equations are discussed below. Since, the derivative machine risk assessment equation 612-1 overlaps with the direct machine risk assessment equation 610-1, the direct machine risk assessment equation 610-1 will be discussed first. The factors below are summed together to generate the direct machine assessment value (sometimes herein called the direct machine risk score). Below is a list of how these direct machine risk factors are determined and what weighting is associated with them:

(D) "D" 614, which is the number of users or administrators (sometimes called direct administrators) who have direct administrative rights to this respective machine (for which the direct machine risk assessment value is being generated). In some embodiments this factor can be weighted with a multiplicative weight to signify its importance relative to other machine risk factors. In this example equation, there is no multiplicative weight assigned to this direct machine risk factor.

(I) "D" 616, which is the number of user or administrators (sometimes called indirect administrators) that have indirect administrative rights to this respective machine (for which the direct machine risk assessment value is being generated). In some embodiments this factor can be weighted with a multiplicative weight to signify its importance relative to other machine risk factors. In this example equation, there is no multiplicative weight assigned to this direct machine risk factor.

(S) "S" 618, which is the number of open sessions that are currently running on the respective machine for which the direct machine risk assessment value is being generated.

(P) "P" 620, which is the number of available patches (sometimes called the number of missing patches) available to fix a vulnerability on the respective computer for which the direct machine risk assessment value is being generated.

(Vl) "Vl" 622, which is the number of vulnerabilities that (A) are currently affecting the machine (for which a machine risk score is being generated), and (B) have a low vulnerability rating (e.g., vulnerabilities having vulnerability scores in a first score value range). The number of vulnerabilities that are currently affecting a machine is sometimes called the number of vulnerabilities present in the machine. In some embodiments, a third party vulnerability score can be used (e.g., CVSS) to determine whether the vulnerability has a low rating. In some embodiments, the third party vulnerability rating (e.g., a CVSS) is a number on a scale of one to ten that rates how damaging the vulnerability is. For example, vulnerabilities with a CVSS ranging from 1-3 may be classified as having a low vulnerability rating, vulnerabilities with a CVSS ranging from 4-7 may be classified as having a medium vulnerability rating, and vulnerabilities with a CVSS ranging from 8-10 may be classified as having a high vulnerability rating. As such, in this example, the contribution of the number of vulnerabilities with a low rating to the direct machine risk assessment value, in equation 610-1, is weighted by a multiplicative weight of one.

(Vm) "Vm" 624, which is the number of vulnerabilities that (A) are currently affecting the machine (for which a machine risk score is being generated), and (B) have a medium vulnerability rating (e.g., vulnerabilities having vulnerability scores in a second score value range, distinct from the first score value range). As discussed above a classification based on a CVSS may be used. As such, in this example, the contribution of the number of vulnerabilities with a medium rating to the direct machine risk assessment value, in equation 610-1, is weighted by a multiplicative weight of 2.

(Vh) "Vh" 626, which is the number of vulnerabilities that (A) are currently affecting the machine for which a machine risk score is being generated, and (B) have a high vulnerability rating (e.g., vulnerabilities having vulnerability scores in a third score value range, distinct from the first score value range and second score value range). As discussed above a classification based on a CVSS may be used. As such, in this example, the contribution of the number of vulnerabilities with a high rating to the direct machine risk assessment value, in equation 610-1, is weighted by a multiplicative weight of 5.

After direct machine risk assessment values 606-1 and 606-2 are determined for multiple machines, the machines are (or can be, in response to a user command) sorted in the user interface shown in FIG. 6 based on their direct machine risk assessment values, thereby making it easy for an administrator to identify the machines presenting highest risk to the security of the overall distributed system. Higher values of the direct machine risk assessment value indicates that the corresponding machines are more critical and are accordingly brought to the attention of an administrator using the user interface of FIG. 6.

Turning to the derivative machine risk assessment equation 612-1, the derivative machine risk assessment values (also herein called derivative machine risk scores) are calculated by taking the direct machine risk assessment equation 610-1 and adding to that score a weighted summation of additional items, sometimes called derivative machine risk factors, derivative risk factors, or lateral movement values. The determination of such values is discussed some detail elsewhere in this document. The values of the additional items are each multiplied by a respective predetermined or assigned weight in order to weight their importance or contribution to the derivative machine risk assessment value for each machine for which a derivative vulnerability risk score is being generated. It is noted that the additional items listed here are distinct from the additional items shown in FIG. 2 and included in equation 212-1, even though the same variable names (e.g., Lu, Ll, Lm, and Lh) are used equations 212-1 and 412-1, because the starting points for the counts of systems accessible via lateral movement are different for vulnerability risk assessment and group risk assessment. In this example, the additional risk factors are:

- (Lu) "Lu" 628, which is the number of systems having an unknown importance rating that can be reached, via lateral movement, from the respective machine for which the derivative machine risk assessment value is being generated. The identification or counting of systems with an unknown importance rating is discussed above. In this example, the contribution of these systems to the derivative machine assessment value, in equation 612-1, is weighted by a multiplicative weight of one.
- (Ll) "Ll" 630, which is the number of systems having a low importance rating that can reached, via lateral movement, from the respective machine for which the derivative machine risk assessment value is being generated. The identification or counting of systems with a low importance rating is discussed above. In this example, the contribution of these systems to the derivative machine assessment value, in equation 612-1, is weighted by a multiplicative weight of two.
- (Lm) "Lm" 632, which is the number of systems with a medium importance rating that can be reached via lateral movement, from the respective machine for which the derivative machine risk assessment value is being generated. The identification or counting of systems with a medium importance rating is discussed above. In this example, the contribution of these systems to the derivative machine assessment value, in equation 612-1, is weighted by a multiplicative weight of five.
- (Lh) "Lh" 634, which is the number of systems with a high importance rating that reached, via lateral movement, from the respective machine for which the derivative machine risk assessment value is being generated. The identification or counting of systems with a high importance rating is discussed above. In this example, the contribution of these systems to the derivative machine assessment value, in equation 612-1, is weighted by a multiplicative weight of ten.

Using the machine risk assessment factors (e.g., direct machine risk factors and the derivative machine risk factors), machine risk assessment values (i.e., direct and derivative risk scores) are determined for each machine in a set of machines (e.g., a subset of the machines in the distributed system). As shown in FIG. 6, in this example "Comp. 1" 602 has a direct machine risk assessment value 606-1 of 20, and "Comp. 2" 604 has a direct group risk assessment value 606-2 of 37. In some embodiments, or in accordance with a user command, the machines are sorted based on the direct machine risk assessment values 606 generated using equation 610-1, with those machines having the highest values (i.e., direct machine risk assessment values) being positioned at the top (or bottom) of the listed machines.

As shown in FIG. 6, "Comp. 1" 602 has a derivative machine risk assessment value 608-1 of 37, and "Comp. 2" 604 has a derivative machine risk assessment value 608-2 of 31. In some embodiments, or in accordance with a user command, the machines are sorted based on the derivative machine risk assessment values 612 generated using equation 612-1, with those machines having the highest values (i.e., derivative machine risk assessment value) being positioned at the top (or bottom) of the listed machines. In the example in FIG. 6, "Comp. 1" has both the highest value for the direct machine risk assessment value 610, and the derivative machine risk assessment value 612. However, there may be instances where one machine has the highest derivative machine risk assessment value 612 of all the machines listed in the user interface, but a direct machine risk assessment value 610 that is not the highest of all the groups listed in the user interface. In some embodiments, the administrator may choose to sort the list of groups by either direct machine risk assessment value 610 or derivative machine risk assessment value 612.

After the server system (e.g., in response to a command from the administrator, or by default) sorts the machines either based on the direct machine risk assessment values 610 or the derivative machine risk assessment values 612, the user interface of FIG. 6 presents the administrator with at least two options with respect to any respective machine of the listed machines, including an option (e.g., a link for accessing one or more remediation tools) for performing a remedial action (e.g., where the remedial actions are performed by a remedial action module 1324 (see FIG. 13)) to remediate or reduce the impact of the respective security risk in at least a subset of the machines affected by the respective security risk, and an option (e.g., a link) for accessing additional information associated with the respective machine (e.g., by clicking on one of the risk factors) to whether access to the machine can result in directly or indirectly (e.g., using lateral movement) accessing other machines.

The remedial action 640 region (e.g., column) included in the user interface 601 includes one or more remedial action buttons for each machine (e.g., a remedial action button for Comp. 1 636 and a remedial action button for Comp. 2 638) for presenting remedial actions that the administrator may apply to that machine, or that may be used to reduce security risk with respect to that machine. While the remedial actions applicable to any respective machine may be (and typically are) specific that that machine, the same types of remedial measures are applicable to many machines. There are many types of security risks affecting machines (e.g., servers, laptops, wireless devices, and other connected devices, etc.), and corresponding types of remedial measures, and thus the following list of types of remedial measures is not exhaustive. Examples of types of remedial measures are:

- End one or more open sessions of one or more respective users of the respective machine, so as to reduce opportunities for lateral movement between systems;
- Restart the respective system in order to clear all active sessions on the system;
- Remove a user from an administrative group, or a subgroup (e.g., a group of users) from an administrative group, so as to reduce opportunities for lateral movement between systems, or adjust (e.g., reduce) the administrative rights of a respective user or group of users, with respect to either to the respective machine or a machine logically coupled to the respective machine via lateral movement; in some embodiments, this type of remedial action option is presented only for removing users or subgroups having direct or indirect administrative rights to the respective machine for which available remedial actions are being presented;

Quarantine the respective system, to give the administrator time to further inspect the respective system and apply remediation measures to the respective system;

Initiate installation of a software patch to the respective system so as to mitigate or remove a vulnerability from that systems;

Stop a service, for example a service hosted by the respective system, to prevent a respective vulnerability from being exploited using the service; and Change a configuration of the respective system.

In some embodiments, to give the administrator a better understanding of how lateral movement could be used to move between the respective machine and other machines, and where a respective remedial action could be performed, a graph can be displayed in the user interface. The graph can be accessed in numerous ways, but for the sake of this example, the administrator can select any one of the following risk factors (D, I, S, P, Vl, Vm, Vh, Lu, Ll, Lm, and Lh) for any one of the machines to bring up a corresponding graph. Depending on the risk factor the administrator has selected, a different graph or portion of a graph may be displayed in the user interface, or the manner of presentation of the graph or the information shown in the graph may differ.

Figure 7:
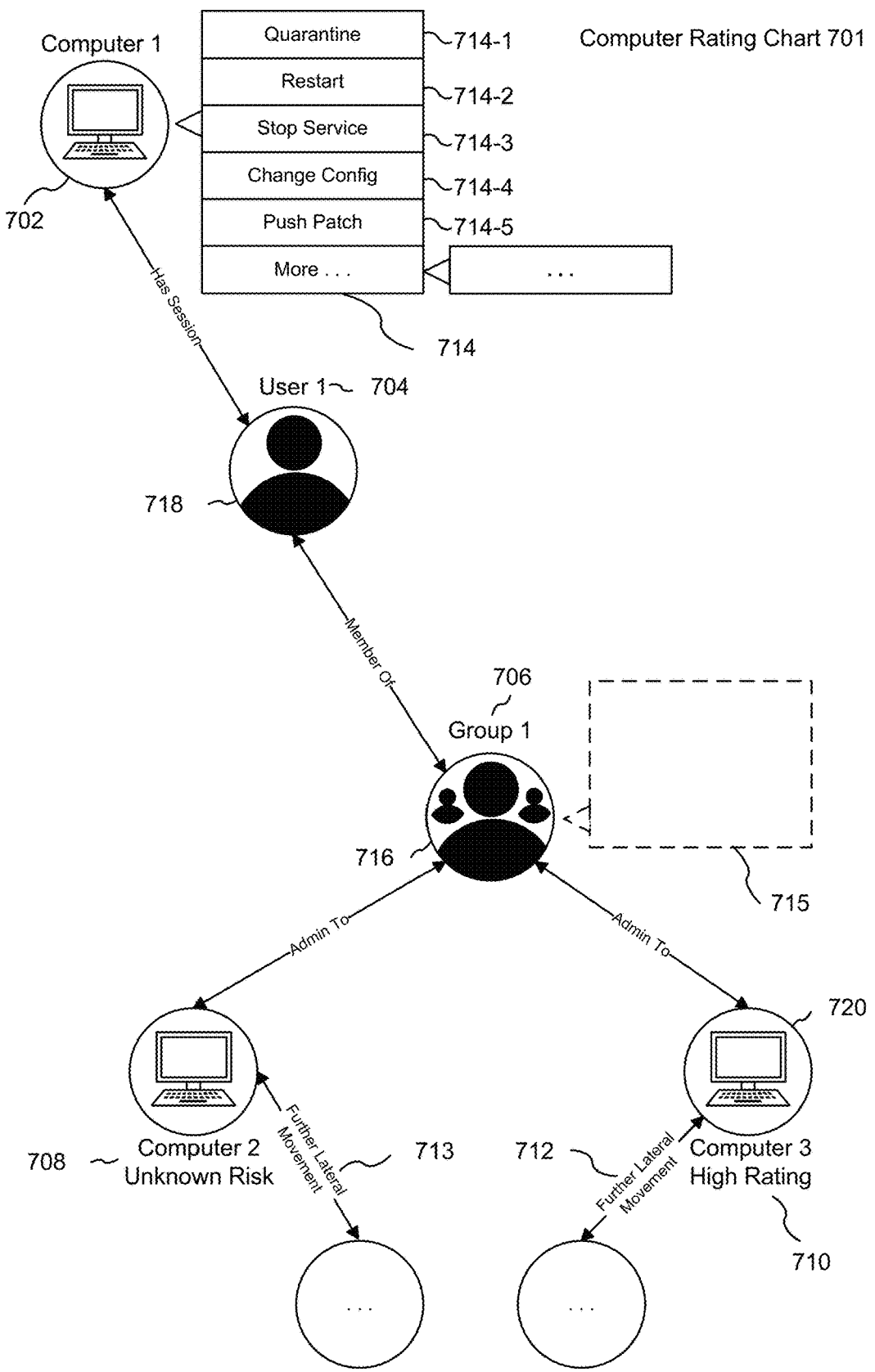
FIG. 7 illustrates a block diagram of an example user interface that displays how critical information can be accessed via lateral movement between systems within the distributed system.

FIG. 7 shows a user interface that includes graph 701, which is displayed in response to selecting a lateral movement user interface element 634-1, corresponding to a risk factor for systems with a high importance rating, and associated with Comp. 1 in FIG. 6. Within the graph 701, a path that a potential attacker could use to gain access to system(s) with a high importance rating is shown. In the example shown in FIG. 7, an identified computer that has a vulnerability is "Computer 1" 702. "Computer 1" 702 also has an active session with "User 1" 704. If an attacker were to compromise "Computer 1" 702, then the attacker would be able to leverage any of User 1's administrative rights. Since "User 1" 704 is member of "Group 1" 706, and members of "Group 1" have administrative rights to both "Computer 2" 708 and "Computer 3" 710, then the attacker would be able to get access to both "Computer 2" 708 and "Computer 3" 710. "Computer 2" 708 is classified as a computer with an unknown importance rating, and "Computer 3" 710 is classified with a high importance rating. Thus, an attacker would be able to use the compromised "Computer 1" 702 to get access to "Computer 3" 710, which has a high importance rating. Stemming from "Computer 3" 710 is hypothetical further lateral movement 712 that could occur if an attacker gained access to that system. Additionally, stemming from "Computer 2" 708 is hypothetical further lateral movement 713 that could occur if an attacker gained access to that system.

Using the user interface of FIGS. 7, the administrator is able to select and apply remedial actions to specific systems or to update privileges of specific users or groups or users. For example, a list or set of remedial actions 714 applicable to "Computer 1" is shown in FIG. 7. The list or set of remedial actions 714 includes remedial actions such as:

Quarantine the system 714-1;

Restart the system in order to clear all active sessions on the system 714-2;

Stop a service hosted by, or used by, Computer 1 714-3;

Change a configuration of the system (i.e., Computer 1) 714-4;

Apply a patch to remove or mitigate a vulnerability 714-5; and

End the open (e.g., active) session of a respective user 714-6;

An additional optional listing or set of remedial actions 715 can be placed near or next to either the "Group 1" symbol 716 associated with "Group 1" 706, the User 1 symbol 718 associated with the "User 1" 704, or the "Computer 3" symbol 720 associated with "Computer 3" 710. For illustrative purposes this optional listing or set of remedial actions 715 is placed next to the Group 1 symbol 716, associated with "Group 1" 706. Examples of such remedial actions are removing a user from an administrative group, or a subgroup (e.g., a group of users) from an administrative group, so as to reduce opportunities for lateral movement between systems; and adjusting (e.g., reducing) the administrative rights of a respective user or group of users, with respect to either to the respective machine or a machine logically coupled to the respective machine via lateral movement.

Patch Risk Assessment and Remediation

Figure 8:
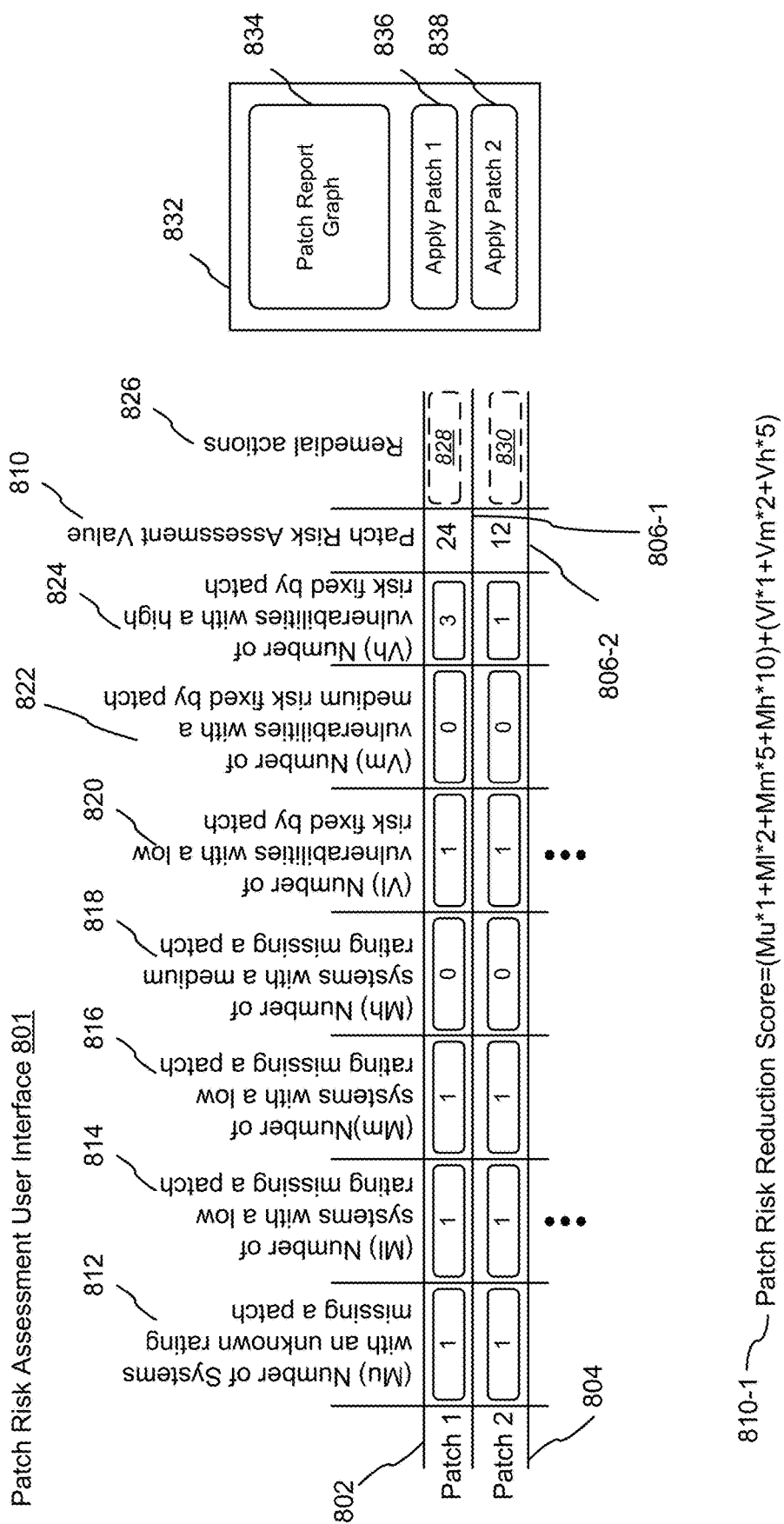
FIG. 8 illustrates a block diagram of an example user interface that displays patches based on weighted patch risk assessment values.

Allowing an administrator to have another different perspective (i.e., viewpoint) of how a security risk could affect the network, allows a user (e.g., an administrator) to better remediate the security risks that are currently or potentially causing the largest amount of comprise to the systems within a distributed system. While the user interface of FIG. 2 presents information regarding vulnerabilities affecting the security of a distributed system, the user interface of FIG. 4 presents information regarding user groups whose composition may adversely affect the security of a distributed system, and the user interface of FIG. 6 presents security risk information regarding particular machines, the user interface of FIG. 8 presents another perspective to help the administrator protect the distributed system (e.g., a network) from security risks. In particular, the user interface of FIG. 8 seeks to provide the administrator with information regarding which patches are missing from machines within the distributed system of machines, and which patches (also herein called software patches) have the highest patch risk assessment value (herein also referred to as a patch risk reduction score). A patch risk assessment value is generated for each available software patch based on factors associated with the patch (herein also referred to as patch risk information) or the vulnerabilities that are mitigated or removed when the patch is applied to one or more respective systems. The server system generates one or more patch risk assessment values for each of a plurality of software patches missing from one or more machines in the distributed system, and presents in a user interface, such as user interface 801 of FIG. 8, a list of patches. The list of patches is optionally sorted, by default, based on the patch risk assessment values for each listed patch, or is sorted based on a patch risk assessment value (or patch risk factor, e.g., of patch risk factors 812-824) selected by the administrator (e.g., by selecting a column of the user interface 801). Providing the administrator with such tools allows for the administrator to quickly identify patches that present security risks that should be given high priority for review and/or remediation.

While the sorted list based on patch risk information is discussed in a general way, additional details regarding the sorted list will be discussed below and in reference to FIG.

8. FIG. 8 shows a patch risk assessment user interface 801 that includes a scoring system (e.g., where the scoring is determined via security risk assessment module 1323, FIG. 13) to present to the administrator with information concerning how risk assessment information identifying patches can affect the security of the network.

While FIG. 8 shows two patches sorted by their patch risk assessment values, the number (P) of distinct patches for which risk scores are generated is typically an integer greater than 2, 5, or 10, and in other examples the user interface would show a larger list of patches sorted by their patch risk assessment values. In the example shown in FIG. 8, the two patches are specified as, "Patch 1" 802, and "Patch 2" 804. These two patches each have a patch risk assessment value 806-1 and 806-2 based upon certain patch risk information, which is described in detail below.

As briefly discussed earlier, for the patches identified in the patch risk information, a patch risk assessment value can be determined. In some embodiments, a respective patch risk assessment value is a value based on one or more security risks that are present as a result of the missing patch. In one example, as shown in FIG. 8, there is an equation, which is for determining a patch risk assessment value 810. Patch risk assessment values are sometimes herein called patch risk assessment scores, or patch risk scores. The patch risk assessment equation 810-1, shown below, is used to generate patch risk assessment value, and is based on weighted combinations of patch risk factors, each of which is discussed below. While this specific equation is shown, other equations based on the same or similar patch risk factors may be used instead in other embodiments. For example, in other examples, different values for the weights applied to the patch risk factors can be used instead, and those weights may be specified by the administrator depending on their specific needs.

$$\text{Patch Risk Reduction Score} = (Mu*1 + Ml*2 + Mm*5 + Mh*10) + (Vl*1 + Vm*2 + Vh*5)$$

The patch risk factors (sometimes called variables) in these example equations are discussed below. The factors below are contained within the leftmost set of brackets and are summed together to generate a component of the patch risk assessment value. Below is a list of how these patch risk factors are determined and what weighting is associated with them:

(Mu) "Mu" 812, which is the number of machines (herein also referred to as systems) that (A) are currently missing a patch (for which a patch risk score is being generated), and (B) have unknown importance. The identification or counting of systems with an unknown importance rating is discussed above. As such, in this example, the contribution of the number of machines with an unknown rating to the patch risk assessment value, in equation 810-1, is weighted by a multiplicative weight of 1.

(Ml) "Ml" 814, which is the number of machines (herein also referred to as systems) that (A) are currently missing a patch (for which a patch risk score is being generated), and (B) have a low importance rating. The identification or counting of systems with a low importance rating is discussed above. As such, in this example, the contribution of the number of machines with a low rating to the patch risk assessment value, in equation 810-1, is weighted by a multiplicative weight of 2.

(Mm) "Mm" 816, which is the number of machines (herein also referred to as systems) that (A) are currently missing a patch (for which a patch risk score is being generated), and (B) have an medium importance rating. The identification or counting of systems with a medium importance rating is discussed above. As such, in this example, the contribution of the number of machines with a medium rating to the patch risk assessment value, in equation 810-1, is weighted by a multiplicative weight of 5.

(Mh) "Mh" 818, which is the number of machines (herein also referred to as systems) that (A) are currently missing a patch (for which a patch risk score is being generated), and (B) have a high importance rating. The identification or counting of systems with a high importance rating is discussed above. As such, in this example, the contribution of the number of machines with a high rating to the patch risk assessment value, in equation 810-1, is weighted by a multiplicative weight of 10.

In addition to the patch risk factors presented above, the additional patch risk factors discussed below are contained within the rightmost set of brackets and are summed together to generate a component of the patch risk assessment value. This summation of additional patch risk factors in the rightmost set of brackets is then added to the summation of patch risk factors in the leftmost set of brackets. Below is a list of how these additional patch risk factors are determined and what weighting is associated with them:

(Vl) "Vl" 820, which is the number of vulnerabilities that (A) are currently affecting a machine that can be corrected by installing the missing patch (for which a patch risk score is being generated), and (B) have a low vulnerability rating. As discussed above a vulnerability classification based on a CVSS may be used to determine the vulnerability rating of respective vulnerabilities. As such, in this example, the contribution of the number of vulnerabilities with a low vulnerability rating to the patch risk assessment value, in equation 810-1, is weighted by a multiplicative weight of one.

(Vm) "Vm" 822, which is the number of vulnerabilities that (A) are currently affecting a machine that can be corrected by installing the missing patch (for which a patch risk score is being generated), and (B) have a medium vulnerability rating. As discussed above a vulnerability classification based on a CVSS may be used to determine the vulnerability rating of respective vulnerabilities. As such, in this example, the contribution of the number of vulnerabilities with a medium rating to the patch risk assessment value, in equation 810-1, is weighted by a multiplicative weight of two.

(Vh) "Vh" 824, which is the number of vulnerabilities that (A) are currently affecting a machine that can be corrected by installing the missing patch (for which a patch risk score is being generated), and (B) have a high vulnerability rating. As discussed above a vulnerability classification based on a CVSS may be used to determine the vulnerability rating of respective vulnerabilities. As such, in this example, the contribution of the number of vulnerabilities with a high rating to the patch risk assessment value, in equation 810-1, is weighted by a multiplicative weight of five.

In some embodiments, the risk path factors used to determine the patch risk assessment values 806 include one or more machine counts, each machine count comprising a number of machines of the N machines missing the respective patch and having a corresponding predefined importance rating; and one or more vulnerability factors, each vulnerability factor corresponding to a count of vulnerabilities, in the set of predefined vulnerabilities, having a corresponding vulnerability rating, and remediated by the respective patch. In some embodiments, the one or more machine counts includes a first machine count comprising a number of machines of the N machines missing the respective patch and having a first predefined machine importance rating, and a second machine count comprising a number of machines of the N machines missing the respective patch and having a second predefined machine importance rating different from the first predefined machine importance rating. In some embodiments, one or more vulnerability factors include a first vulnerability factor corresponding to a first count of vulnerabilities, in the set of predefined vulnerabilities, mitigated by the respective patch and having vulnerability scores in a first score value range, and a second vulnerability factor corresponding to a second count of vulnerabilities, in the set of predefined vulnerabilities, fixed by the respective patch and having vulnerability scores in a second score value range distinct from the first score value range.

After patch risk assessment values 806-1 and 806-2 are determined for multiple patches, the patches are (or can be, in response to a user command) sorted in the patch risk assessment user interface, e.g., shown in FIG. 8, based on their patch risk assessment values, thereby making it easy for an administrator to identify the missing patches presenting highest risk to the security of the overall distributed system. Higher values of the patch risk assessment value indicates that the corresponding patches are more critical and are accordingly brought to the attention of an administrator using the user interface of FIG. 8.

As shown in FIG. 8, "Patch 1" 802 has a patch risk assessment value 806-1 of 24, and "Patch 2" 804 has a patch risk assessment value 806-2 of 12. In some embodiments, or in accordance with a user command, the patches are sorted based on the patch risk assessment values 806 generated using equation 810, with those patches having the highest values being positioned at the top (or bottom) of the listed patches. In the example in FIG. 8, "Patch 1" has the highest value for the patch risk assessment value 806.

After the server system (e.g., in response to a command from the administrator, or by default) sorts the patches based on the patch risk assessment values 810, the patch risk assessment user interface, e.g., of FIG. 8, presents the administrator with at least two options with respect to any respective patch of the listed patches, including an option (e.g., a link for accessing one or more remediation tools) for performing a remedial action (e.g., where the remedial actions are performed by remedial action module 1324 (see FIG. 13)) to install the identified missing software patch on one or more machines, potentially including all machines in the distributed system missing the software patch (or, alternatively, all such machines missing the software patch and in a state in which the software patch can be installed), and an option (e.g., a link) for accessing additional information associated with the respective software patch (e.g., by clicking on one of the patch risk factors, such as patch risk factors 812-824).

The remedial action 826 region (e.g., column) included in the patch risk assessment user interface 801 includes one or more remedial action buttons for each patch (e.g., a remedial action button for Patch 1 828 and a remedial action button for Patch 2 830). While the remedial actions applicable to any respective patch are usually patch specific, the same types of remedial measures are applicable to many patches, and are typically the same types of remedial measures applicable to many vulnerabilities. Additional information associated with the respective patch (option 2, above) is optionally shown in another user interface, such as user interface 832, in response to a user command entered while user interface 801 is displayed. Within this optional user interface 832, a patch report graph 834 is shown that contains, in part, patch information (e.g., listing vulnerabilities corrected by the patch). The user interface 832 also contains one or more user-selectable buttons ("Apply Patch 1" 836 and "Apply Patch 2" 838) for applying corresponding patches to the one or more systems missing those patches.

User Risk Assessment and Remediation

As noted above, allowing an administrator to have different perspectives (i.e., viewpoints) of how a security risk could affect the network, allows a user (e.g., an administrator) to better remediate the security risks that are currently or potentially causing the largest amount of comprise to the systems within a distributed system. While the user interface of FIG. 2 presents prioritized information regarding vulnerabilities affecting the network, the user interface of FIG. 4 presents prioritized information regarding user groups based on potential security risks of groups, the user interface of FIG. 6 presents prioritized information regarding machine-specific security risks, and the user interface of FIG. 8 presents prioritized information regarding missing patches, the user interface of FIG. 9 presents a different perspective on security risks to help the administrator protect the distributed system (e.g., a network) from security risks. In particular, the user interface of FIG. 9 presents prioritized information regarding specific users. For example, the user interface of FIG. 9 can be used to mitigate risks associated with any particular user having administrative rights to multiple machines within the distributed system. Using traditional approaches, an administrator may not be able to identify this user or realize that the user has more access to machines in the distributed system than was intended. Therefore, this additional perspective, which may be called the user perspective, provides an administrator with information regarding the number of systems to which a user has administrative rights. This information is in part received from an administrative rights store, which contains information regarding the user groups of which the user is a member, directly or indirectly, and thus the user's administrative privileges to machines across the distributed system. Based on the aforementioned administrative rights information, a user risk scoring system can be used (herein also referred to as a user risk assessment value) to generate risk scores based on how many machines a user has administrative rights to, and optionally based on the importance of those machines. In some embodiments, using the administrative rights information, and optionally machine importance ratings, user risk ratings are generated, and a sorted list of users based on the user risk ratings is generated and used to identify users who present potential security risks.

While FIG. 9 shows a specific set of fields or columns, these should be considered examples of the types of information that may be presented in a user risk assessment user interface. For example, in other implementations, the user risk assessment user interface may include fewer fields or columns, such a single field per user indicating a total number of systems to which the user has direct administrative rights, and/or a field indicating a total number of systems to which the user has indirect administrative rights directly with the vulnerability, instead of the more detailed presentation in FIG. 9. In other example, the user risk assessment user interface may include a single lateral movement field per user group, indicating a total number of systems reachable by the user, instead of the more detailed presentation in FIG. 9. In yet another example, instead of numeric values, some of the fields, such as the risk scores may indicate a risk category (e.g., critical, high, medium, low, or none) for each listed user. In the latter example, the user groups may still be ordered in the administrative rights rating user interface based on numerical risk scores, even though the risk scores themselves are presented as risk categories. Furthermore, the user risk assessment user interface may include additional fields for each user, beyond or different from those shown in FIG. 9. Examples are: the number of inbound relationships (path segments) that the user has with other assets in the system; and/or the number of outbound relationships (path segments) that the user has with other assets in the system.

While the sorted list based on user administrative access information has been discussed in a general way, additional details regarding the sorted list of users will be discussed below and in reference to FIGS. 9 and 10. FIG. 9 shows an user risk rating user interface 901 that includes risk assessment scores (e.g., determined via security risk assessment value module 1323, FIG. 13) and optionally includes information about security risk factors corresponding to the listed users.

While FIG. 9 shows a user interface 901 with two users sorted by their user risk assessment values, in other examples the number (U) of users for which risk scores are generated is typically an integer greater than 2, 5, 10, 20 or 100, and thus the user interface 901 would show a larger list of users sorted by their user risk assessment values. In the example shown in FIG. 9, the two users are specified as, "User 1" 902, and "User 2" 904. These two users each have a direct user risk assessment value 906-1 and 906-2 based upon certain administrative rights information, which is described in detail below. The two users also have derivative user risk assessment values 908-1 and 908-2 based upon certain administrative rights information, which is described in detail below.

As discussed above, some or all of the machines/systems in the distributed system can be assigned an importance rating either automatically or by an administrator. In some embodiments, a machine's rating reflects or is assigned in accordance with the machine's importance within the distributed system. Details about how machines are classified is discussed above. It is worth noting that these categorizations can be subjective, and can be changed based on the needs of the owners or administrators of the distributed system.

As briefly discussed earlier, for the users identified in the administrative rights information, both a direct user risk assessment value, and a derivative user risk assessment value can be determined. A direct user risk assessment value is based on a count of machines to which the user has direct administrative rights to (i.e., access), and is optionally also based on the importance ratings of those machines. A derivative user risk assessment value, is a value (i.e., score) that is based on in part how many systems can be indirectly accessed by the user, using lateral movement, and is optionally also based on the importance ratings of those machines. The derivative user risk assessment value is useful in that it indicates how many systems could reached, or the aggregate importance of systems that could be reached, and compromised by an attacker who gains access to the credentials of a specific user. In one example, as shown in FIG. 9, there are two equations 910-1 and 912-1, which are for determining a direct user risk assessment value 910, and for determining a derivative user risk assessment value 912. Direct user risk assessment values and/or derivative user risk assessment values are sometimes herein called direct and indirect risk ratings. These equations (i.e., a direct user risk assessment equation 910-1 and a derivative user risk assessment equation 912-1), shown below, are used to generate direct user risk assessment values and derivative group risk assessment values, and are based on weighted combinations of risk factors, each of which is discussed below. While specific equations are shown below and in FIG. 9, other equations based on the same or similar risk factors may be used in other embodiments. For example, in other examples, different values for the weights applied to the risk factors can be used instead, and those weights may be specified by the administrator depending on their specific needs.

$$\text{Direct User Risk Rating} = ((Du*1 + Dl*2 + Dm*5 + Dh*10) + (lu*1 + ll*2 + lm*5 + 1h*10)) * S$$

$$\text{Derivative User Risk Rating} = ((Du*1 + Dl*2 + Dm*5 + Dh*10) + (lu*1 + ll*2 + lm*5 + lh*10)) * S + (Lu*1 + Ll*2 + Lm*5 + +Lh*10)$$

The risk factors (sometimes called variables) in these example equations are discussed below. Since, the derivative user risk assessment equation 912-1 overlaps with the direct user risk assessment equation 910-1, the direct user risk assessment equation 910-1 will be discussed first. The risk factors included within the first interior brackets (i.e., the leftmost interior bracket) of the direct user risk assessment equation 910-1 are weighted based on the importance of each system to which the user (for which a user risk assessment value is being generated) has direct administrative rights. Below is a list of direct risk factors and information regarding how these direct risk factors are determined and what weighting is associated with them:

(Du) "Du" 914, which is the number of systems (A) to which the user (for which the user risk assessment value is being generated) has direct administrative rights, and (B) have unknown importance. The determination of system importance ratings is discussed above. As noted above, systems with an unknown importance have not been assigned an importance rating. In this example, the contribution of these systems to the direct user risk assessment value, in equation 910-1, is weighted with a multiplicative weight of one.

(Dl) "Dl" 916, which is the number of systems (A) to which the user (for which the user risk assessment value is being generated) has direct administrative rights, and (B) have a low importance rating. The determination of system importance ratings is discussed above. In this example, the contribution of these systems to the direct user risk assessment value, in equation 910-1, is weighted with a multiplicative weight of two.

(Dm) "Dm" 918, which is the number of systems (A) to which the user (for which the user risk assessment value is being generated) has direct administrative rights, and (B) have a medium importance rating. In this example, the contribution of these systems to the direct user risk assessment value, in equation 910-1, is weighted by a multiplicative weight of five.

(Dh) "Dh" 920, which is the number of systems (A) to which the user (for which the user risk assessment value is being generated) has direct administrative rights, and (B) have a high (or critical) importance rating. In this example, the contribution of these systems to the direct user risk assessment value, in equation 910-1, is weighted by a multiplicative weight of ten.

In addition, in this example, the weighted summation of the direct risk factors (e.g., Du, Dl, Dm and Dh) representing counts of systems to which the user has direct administrative rights (i.e., what is contained within the leftmost interior bracket of the direct user risk assessment equation 910-1) is added to a weighted summation of indirect risk factors (e.g., lu, ll, lm and lh) representing counts of systems to which the user has indirect administrative rights (i.e., what is contained within the rightmost interior brackets of the direct user risk assessment equation 910-1). Indirect administrative rights are administrative rights are the administrative rights of other users that the user can exploit through membership in one or more administrative groups.

- (lu) "lu" 922, which is the number of systems (A) to which the user (for which the user risk assessment value is being generated) has indirect administrative rights, and (B) have unknown importance. The determination of system importance ratings is discussed above. In this example, the contribution of these systems to the direct user risk assessment value, in equation 910-1, is weighted with a multiplicative weight of one.
- (ll) "ll" 924, which is the number of systems (A) to which the user (for which the user risk assessment value is being generated) has indirect administrative rights, and (B) have a low importance rating. The determination of system importance ratings is discussed above. In this example, the contribution of these systems to the direct user risk assessment value, in equation 910-1, is weighted with a multiplicative weight of two.
- (lm) "lm" 926 which is the number of systems (A) to which the user (for which the user risk assessment value is being generated) has indirect administrative rights, and (B) have a medium importance rating. The determination of system importance ratings is discussed above. In this example, the contribution of these systems to the direct user risk assessment value, in equation 910-1, is weighted by a multiplicative weight of five.
- (lh) "lh" 928, which is the number of systems (A) to which the user (for which the user risk assessment value is being generated) has indirect administrative rights, and (B) have a high importance rating. The determination of system importance ratings is discussed above. In this example, the contribution of these systems to the direct user risk assessment value, in equation 910-1, is weighted by a multiplicative weight of ten.

In some embodiments, in addition to the summation of the direct and indirect risk factors, generating the user risk assessment value includes multiplying that summation by the number (S) of open sessions of the respective user. In some embodiments, the number of open sessions 930 are the number of sessions that the user currently has running. In some instances, a single user may have one or more sessions running at the same time (e.g., signed into multiple devices). The resulting value is the direct user risk assessment value 910.

After direct user risk assessment values 910 (e.g., 906-1 and 906-2) are determined for multiple users, the users are (or can be, in response to a user command) sorted in the user interface shown in FIG. 9 based on their user risk assessment values, thereby making it easy for an administrator to identify the users presenting highest risk to the security of the overall distributed system. Higher values of the direct user risk score indicates that the corresponding users are more critical and are accordingly brought to the attention of an administrator using the user interface of FIG. 9.

Turning to the derivative user risk assessment equation 912-1, the derivative user risk assessment values are calculated by taking the direct user risk assessment equation 910-1 and adding to that score a weighted summation of additional items, sometimes called derivative risk factors or lateral movement values. The determination of such values is discussed some detail elsewhere in this document. The values of the additional items are each multiplied by a respective predetermined or assigned weight in order to weight their importance or contribution to the derivative user risk assessment value for each user for which the derivative user risk assessment value is being generated. It is noted that the additional items listed here are distinct from the additional items shown in FIG. 2 and FIG. 4 and included in equation 212-1 and equation 412-1, even though the same variable names (e.g., Lu, Ll, Lm and Lh) are used in equations 212-1 and 412-1, because the starting points for the counts of systems accessible via lateral movement are different for vulnerability risk assessment and user risk assessment. In this example, the additional risk factors are:

- (Lu) "Lu" 932, which is the number of systems having an unknown importance rating that can be reached, via lateral movement, from any system to which the user (for which the derivative user risk assessment value is being generated) has administrative rights (and/or access). The identification or counting of systems with an unknown importance rating is discussed above. In this example, the contribution of these systems to the derivative user risk assessment value, in equation 912-1, is weighted by a multiplicative weight of one.
- (Ll) "Ll" 934, which is the number of systems having a low importance rating that can be reached, via lateral movement, from any system to which the user (for which the derivative user risk assessment value is being generated) has administrative rights (and/or access). The identification or counting of systems with a low importance rating is discussed above. In this example, the contribution of these systems to the derivative user risk assessment value, in equation 912-1, is weighted by a multiplicative weight of two.
- (Lm) "Lm" 936, which is the number of systems having a medium importance rating that can be reached, via lateral movement, from any system to which the user (for which the derivative user risk assessment value is being generated) has administrative rights (and/or access). The identification or counting of systems with a medium importance rating is discussed above. In this example, the contribution of these systems to the derivative user risk assessment value, in equation 912-1, is weighted by a multiplicative weight of five.
- (Lh) "Lh" 938, which is the number of systems having a high importance rating that can be reached, via lateral movement, from any system to which the user (for which the derivative user risk assessment value is being generated) has administrative rights (and/or access). The identification or counting of systems with a high importance rating is discussed above. In this example, the contribution of these systems to the derivative user risk assessment value, in equation 912-1, is weighted by a multiplicative weight of ten.

Using the derivative user risk assessment factors (e.g., direct risk factors, indirect risk factors, number of open sessions, and derivative risk factors), user risk assessment values (i.e., direct and derivative risk scores) are determined for each user in a set of users (e.g., which may be a subset of all the users having administrative rights to at least one machine in the distributed system). As shown in FIG. 9, in this example "User 1" 902 has a direct user risk assessment value 906-1 of 104, and "User 2" 904 has a direct user risk assessment value 906-2 of 13. In some embodiments, or in accordance with a user command, the listed users are sorted based on the direct user risk assessment values 910 generated using equation 910-1, with those users having the highest values (i.e., direct user risk assessment values) being positioned at the top (or bottom) of the listed users.

As shown in FIG. 9, "User 1" 902 has a derivative user risk assessment value 908-1 of 110, and "User 2" 904 has a derivative user risk assessment value 908-2 of 19. In some embodiments, or in accordance with a user command, the listed users are sorted based on the derivative user risk assessment values 912 generated using equation 912-1, with those users having the highest values (i.e., derivative user risk assessment value) being positioned at the top (or bottom) of the listed users. In the example in FIG. 9, "User 1" has both the highest value for the direct user risk assessment value 910, and the derivative user risk assessment value 912. However, there may be instances where one user has the highest derivative user risk assessment value 912 of all the users listed in the user interface, but a direct user risk assessment value 910 that is not the highest of all the users listed in the user interface. In some embodiments, the administrator may choose to sort the list of users by either direct user risk assessment value 910 or derivative user risk assessment value 912.

After the server system (e.g., in response to a command from the administrator, or by default) sorts the users either based on the direct user risk assessment values 910 or the derivative user risk assessment values 912, the user interface of FIG. 9 presents the administrator with at least two options with respect to any respective user of the listed users, including an option (e.g., a link for accessing one or more remediation tools) for performing a remedial action (e.g., where the remedial actions are performed by remedial action modules 1324 (see FIG. 13)) to remediate or reduce the impact of a respective security risk in at least a subset of the machines affected by the respective security risk, and an option (e.g., a link) for accessing additional information associated with the respective user (e.g., by clicking on one of the risk factors to determine which machines are directly or indirectly (e.g., using lateral movement) accessible to respective users).

The remedial action 940 region (e.g., column) included in the user interface 901 includes one or more remedial action buttons for each user (e.g., a remedial action button for User 1 942 and a remedial action button for User 2 944). While the remedial actions applicable to any respective user are usually user specific, the same types of remedial measures are applicable to many users. There are many types of security risks affecting users, and corresponding types of remedial measures, and thus the following list of types of remedial measures is not exhaustive. Examples of types of remedial measures are:

End an open session of a respective user, so as to reduce opportunities for lateral movement between systems;

Restart a respective system in order to clear all active sessions on the system;

Remove a user from an administrative group, or a subgroup (e.g., a subgroup that includes the user) from an administrative group, so as to reduce opportunities for lateral movement between systems;

Adjust the administrative rights (e.g., require the user to change a password, such as a weak password or a password used by other users or to accessing other systems) of the user, or a subgroup, with respect to one or more respective systems;

Quarantine a respective system, to give the administrator time to further inspect the respective system and apply remediation measures to that system;

Apply a patch to one or more systems having a particular vulnerability so as to remediate or remove the vulnerability from those systems;

Stop a service, for example a service hosted by one or more particular systems (e.g., one or more particular systems to which the user has direct or indirect administrative rights, to prevent a respective vulnerability from being exploited using the service; and Change a configuration of a respective system.

Figure 10:
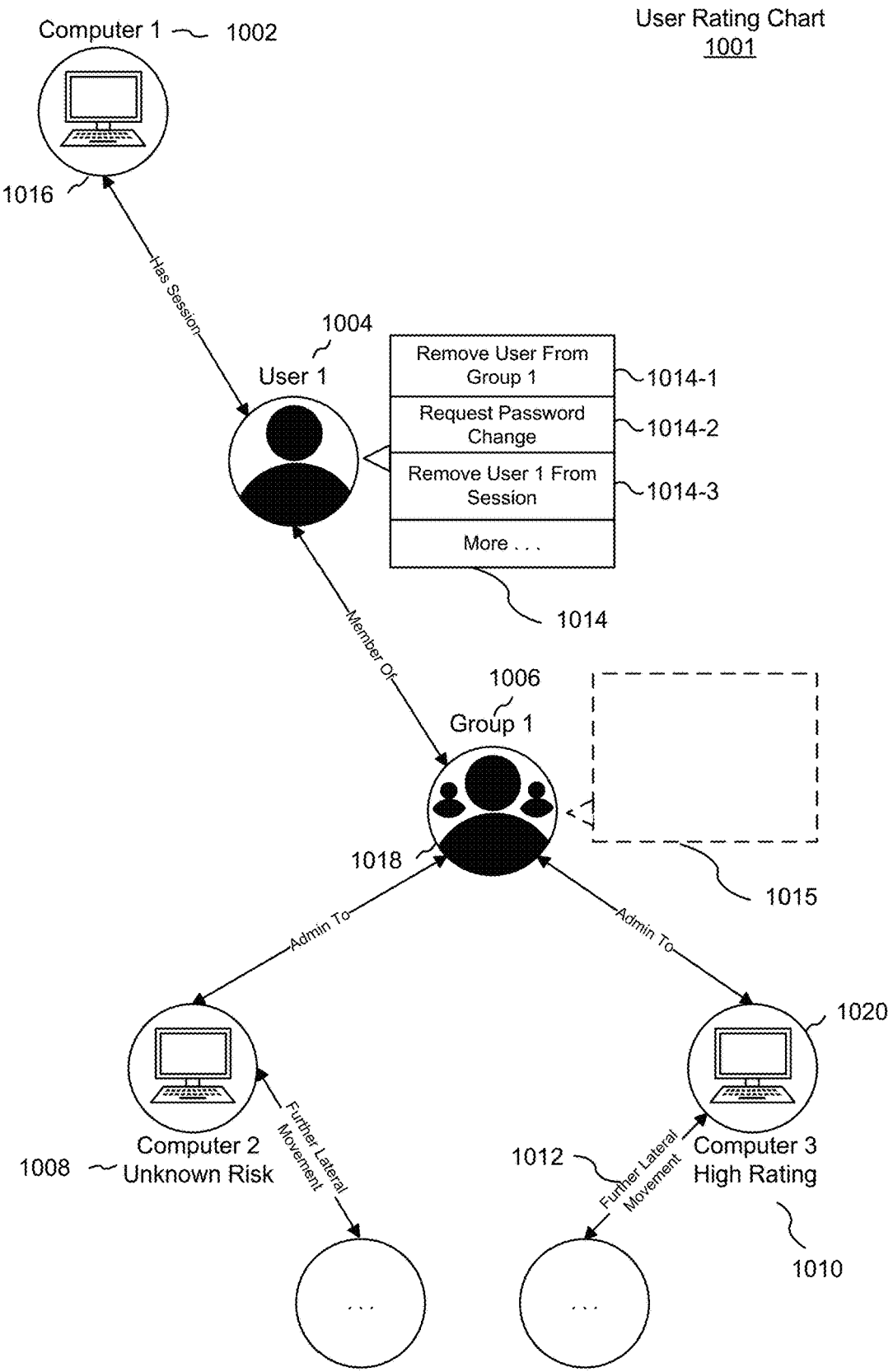
FIG. 10 illustrates a block diagram of an example user interface that displays how critical information can be accessed via lateral movement between systems within the distributed system.

To give the administrator a better understanding of how lateral movement could be used to increase the security risks associated with a particular user, and where a respective remedial action could be performed, a graph can be displayed in the user interface, for example as shown in FIG. 10. The graph can be accessed in numerous ways, but for the sake of this example, the administrator can select any one of the following risk factors (Au, Al, Am, Ah, lu, ll, lm, lh, Lu, Ll, Lm, and Lh) for any one of the users to bring up a corresponding graph. Depending on the risk factor the administrator has selected, a different graph or portion of a graph may be displayed in the user interface, or the manner of presentation of the graph or the information shown in the graph may differ.

FIG. 10 shows a user interface that includes graph 1001, which is displayed in response to selecting a lateral movement user interface element 938-1, corresponding to a risk factor for systems with a high importance rating, and associated with User 1 in FIG. 9. Within the graph 1001, a path that a potential attacker could use to gain access to system(s) with a high importance rating is shown. In the example shown in FIG. 10, an identified computer that has a vulnerability is "Computer 1" 902. "Computer 1" 902 also has an active session with "User 1" 1004. If an attacker were to compromise "Computer 1" 1002, then the attacker would be able to leverage any of User 1's administrative rights. Since "User 1" 1004 is member of "Group 1" 1006, and members of "Group 1" have administrative rights to both "Computer 2" 1008 and "Computer 3" 1010, then the attacker would be able to get access to both "Computer 2" 1008 and "Computer 3" 1010. "Computer 2" 1008 is classified as a computer with an unknown importance rating, and "Computer 3" 1010 is classified with a high importance rating. Thus, an attacker would be able to use the compromised "Computer 1" 1002 to get access to "Computer 3" 1010, which has a high importance rating. Stemming from "Computer 3" 1010 is hypothetical further lateral movement 1012 that could occur if an attacker gained access to that system.

Using the user interface of FIG. 10, the administrator is able to select and apply remedial actions to specific systems or to update privileges of specific users and groups. For example, a list or set of remedial actions 1014 applicable to "User 1" is shown in FIG. 10. The list or set of remedial actions 1014 includes remedial actions such as:

Remove User 1 From Group 1, to prevent a compromised user from affecting the rest of Group 1 1014-1;

Request User 1 to change their password to protect the group from a potential security risk 1014-2; and Remove active sessions (e.g., terminate one or more open sessions) of one or more respective users from one or more computers to reduce opportunities for lateral movement by bad actors 1014-3.

In the user interface 1001, an additional optional listing or set of remedial actions 1015 can be placed near or next to either the "Computer 1" symbol 1016 associated with "Computer 1" 1002, the Group 1 symbol 1018 associated with the "Group 1" 1006, or the Computer 3 symbol 1020 associated with "Computer 3" 1010. For illustrative purposes an optional listing or set of remedial actions 1015 is placed next the Group 1 symbol 1018, associated with "Group 1" 1006.

Examples of Computational Machines and Server System

Figure 11:
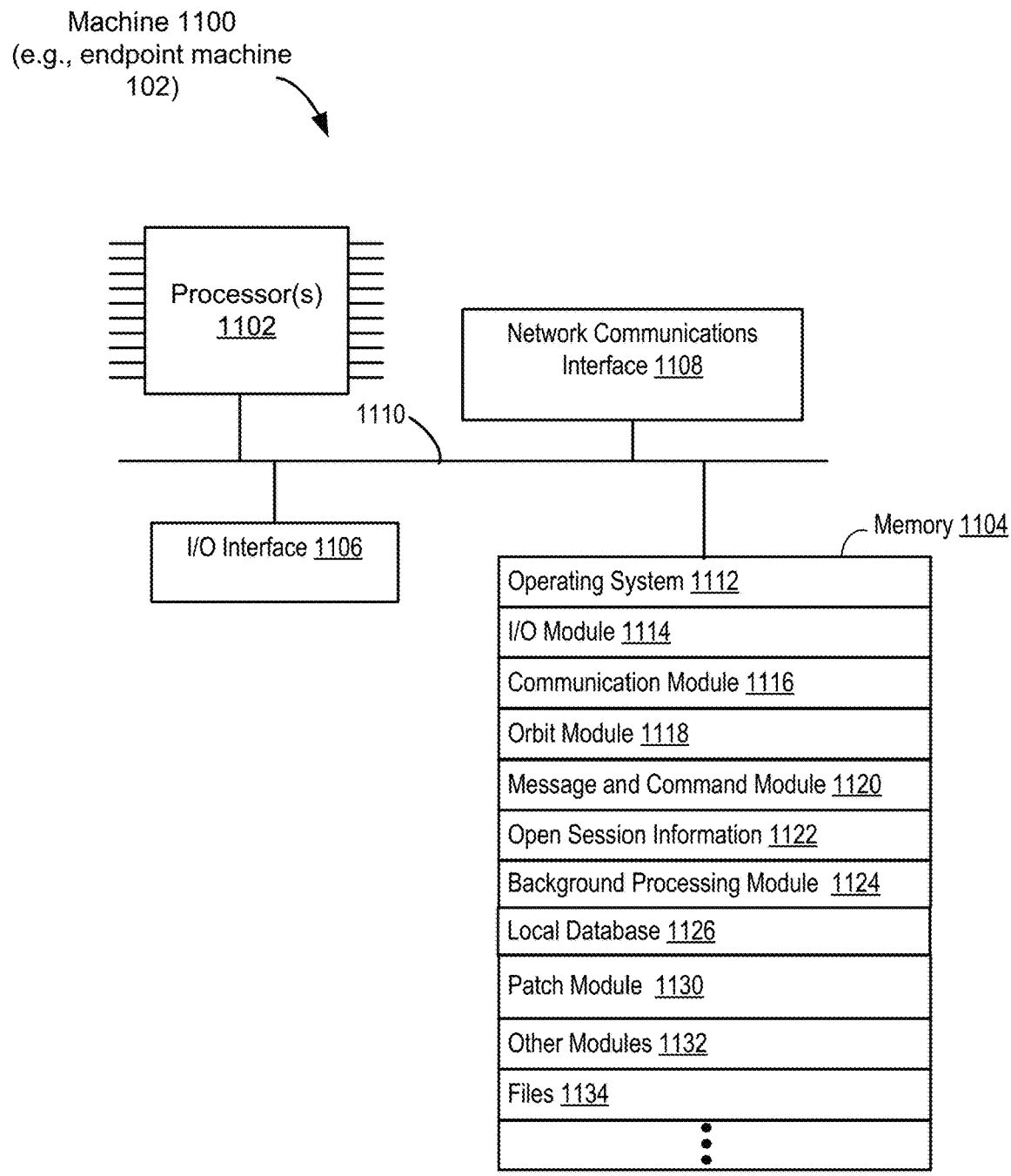
FIG. 11 is a block diagram of a client or endpoint machine in accordance with some embodiments.

FIG. 11 is a block diagram of a machine 1100, such as any of the machines 102 in the exemplary linear communication orbits 106 shown in FIGS. 1A-1D, or any of the machines in a distributed system, in accordance with some embodiments. In some implementations, machine 1100 (sometimes called a client or endpoint machine) includes one or more processors 1102, memory 1104 for storing programs and instructions for execution by one or more processors 1102, one or more communications interfaces such as input/output interface 1106 and network interface 1108, and one or more communications buses 1110 for interconnecting these components.

In some embodiments, input/output interface 1106 includes a display and input devices such as a keyboard, a mouse, the touch-sensitive surface of a touch-screen display, and/or a track-pad. In some embodiments, communication buses 1110 include circuitry (sometimes called a chipset) that interconnects and controls communications between system components. In some embodiments, memory 1104 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 1104 includes one or more storage devices remotely located from the one or more processors 1102. In some embodiments, memory 1104, or alternatively the non-volatile memory device(s) within memory 1104, includes a non-transitory computer readable storage medium.

In some embodiments, memory 1104 or alternatively the non-transitory computer readable storage medium of memory 1104 stores the following programs, modules and data structures, instructions, or a subset thereof:

- Operating System 1112 that includes procedures for handling various basic system services and for performing hardware dependent tasks.
- I/O module 1114 that includes procedures for handling various basic input and output functions through one or more input and output devices.
- Communication module 1116 that is used for connecting machine 1100 to (or, more generally, communicating with) other machines (e.g., other machines 1100 in network 100) or servers (e.g., server 108) via one or more network communication interfaces 1108 (wired or wireless) and one or more communication networks, such as the Internet, other wide area networks, local area networks, metropolitan area networks, and so on.
- Orbit module 1118 that includes instructions implementing a predetermined set of rules for creating, maintaining, and repairing a linear communication orbit that supports system, security and network management communications within the managed network 100, as discussed above with respect to FIGS. 1A-1D.
- Message and command module 1120, sometimes called a query response module, that includes instructions for handling receipt, processing, propagation, collecting and reporting of system, security and network management messages and commands.
- Open session information 1122 that includes information identifying open sessions between users and machine 1100.
- Background processing module 1124 that includes instructions for performing various system monitoring operations as a background task or process, and storing resulting information in a local database 1126. These background tasks or processes are executed while endpoint machine 102 continues to perform its primary functions (e.g., performed through the execution of other modules 1132).
- Local database 1126, for storing information (e.g., locally produced by background processing module 1124) that may be requested by a query sent by a respective server.
- Patch module 1130, optionally working in conjunction with other modules of machine 1100, determines software updates (herein called patches) applicable to this machine, and also receives and installs software update files (patches) when so commanded by a respective server system.
- Other modules 1132, configured for execution by machine 1100.
- Files 1134, which are files locally stored at machine 1100, optionally including files having executable programs, image files containing images, and/or data files containing data of various types.

In some embodiments, message and command module 1120, optionally working in conjunction with patch module 1130, obtains information needed by a respective server system, such as server 110, FIG. 1A, or server system 1300, FIG. 13, to assess security risks in a distributed system that includes machine 1100. In some embodiments, patch module 1130, and message and command module 1120, implement commands sent by the respective server system to remediate security risks identified by the respective server system, for example in response to remediation operations selected by a user (e.g., administrator) of the respective server system.

Figure 12:
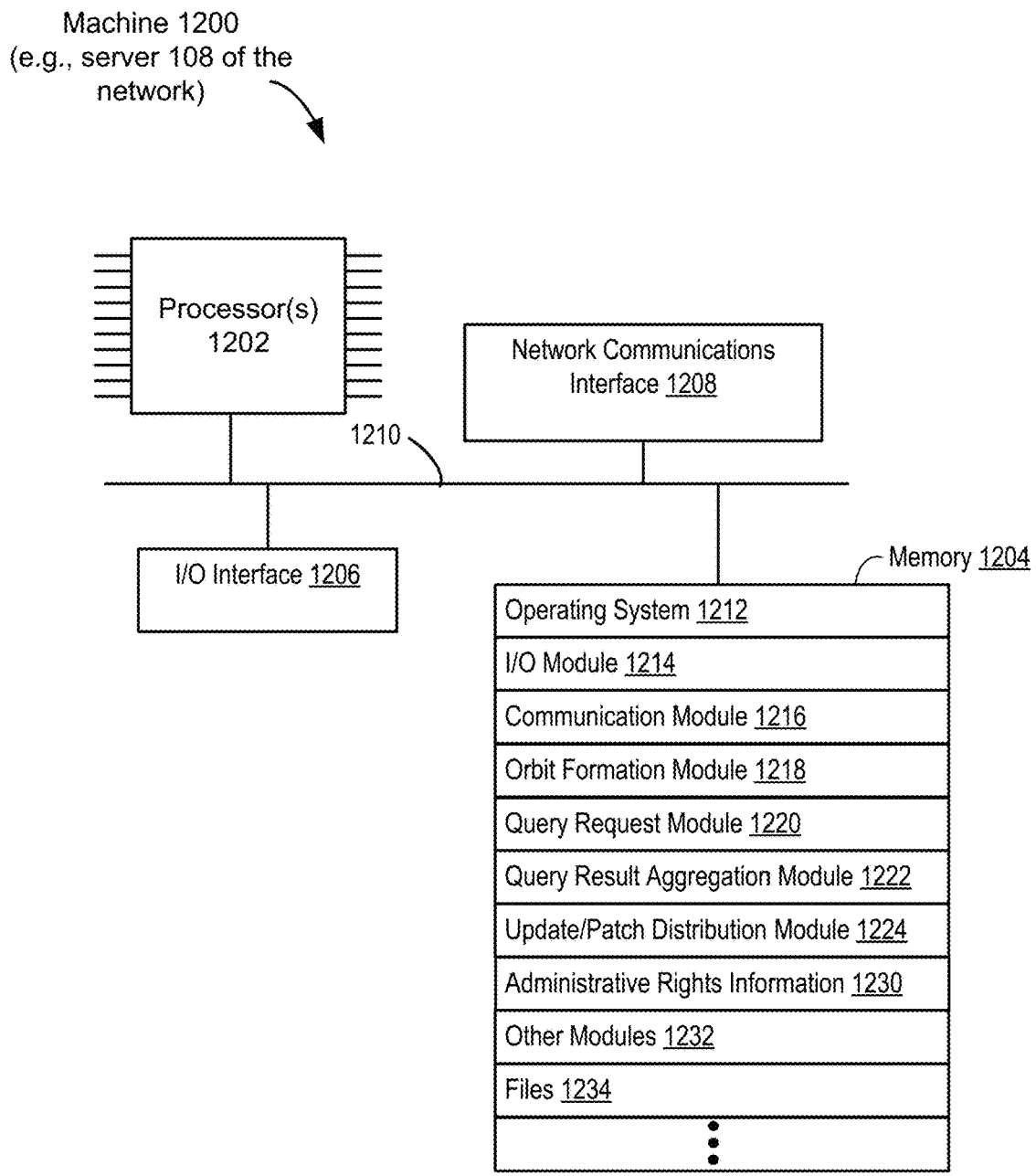
FIG. 12 is a block diagram of a network management server system in accordance with some embodiments.

FIG. 12 is a block diagram of an exemplary network server 1200, such as the network server 108 for the exemplary linear communication orbits 106 shown in FIGS. 1A-1D, in accordance with some embodiments. In some implementations, server 1200 or 108 includes one or more processors 1202, memory 1204 for storing programs and instructions for execution by the one or more processors 1202, one or more communications interfaces such as input/output interface 1206 and network interface 1208, and one or more communications buses 1210 for interconnecting these components.

In some embodiments, input/output interface 1206 includes a display and input devices such as a keyboard, a mouse, the touch-sensitive surface of a touch-screen display, and/or a track-pad. In some embodiments, communication buses 1210 include circuitry (sometimes called a chipset) that interconnects and controls communications between system components. In some embodiments, memory 1204 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 1204 includes one or more storage devices remotely located from the one or more processors 1202. In some embodiments, memory 1204, or alternatively the non-volatile memory device(s) within memory 1204, includes a non-transitory computer readable storage medium.

In some embodiments, memory 1204 or alternatively the non-transitory computer readable storage medium of memory 1204 stores the following programs, modules and data structures, instructions, or a subset thereof:

- Operating System 1212 that includes procedures for handling various basic system services and for performing hardware dependent tasks.
- I/O module 1214 that includes procedures for handling various basic input and output functions through one or more input and output devices.
- Communication module 1216 that is used for connecting server 1200 to (or, more generally, communicating with) machines 1200 coupled to network 100 via one or more network communication interfaces 1208 (wired or wireless) and one or more communication networks, such as the Internet, other wide area networks, local area networks, metropolitan area networks, and so on.
- Optionally, an orbit formation module 1218 that includes instructions to determine which machines 1200, of all machines 1200 currently known to be coupled to network 100, are coupled to the same local area network, and to communicate information to those machines to enable them to self-organize into a linear communication orbit. In some embodiments, orbit formation module also stores a list of singletons, and head nodes and/or tail nodes of the linear communication orbits in the network. However, in some embodiments, the machines in the distributed system communicate using communication networks not organized as linear communication orbits, and instead communicate using one or more local area networks and wide area networks.
- Query request module 1220 that includes instructions for sending queries to and collecting answers from other machines (e.g., endpoint machines 102) in the distributed system; this module obtains information needed by a respective server system, such as server 110, FIG. 1A, or server system 1300, FIG. 13, to assess security risks in the distributed system.
- Optionally, query result aggregation module 1222 for aggregating information received in response to queries sent by query request module 1220, e.g., to facilitate the operation of the respective server system, such as server 110, FIG. 1A, or server system 1300, FIG. 13, that assesses security risks in the distributed system.
- Update/patch distribution module 1224, which may be implemented as a software module executed by server 1200 or 108, for distributing updates (patches) to machines (e.g., machines 102, FIG. 1A) to which the updates are applicable. In some embodiments, updates or patches (sometimes called software updates or software patches) are dispatched in response to remediation operations performed by or initiated by a respective server system such as server 110, FIG. 1A, or server system 1300, FIG. 13, that assesses security risks in the distributed system and provides tools to a system administrator to perform remediation operations to as to remediate those security risks.
- Optionally, administrative rights information 1230, identifying users and groups of users having administrative rights to respective machines of the distributed system. In some embodiments, administrative rights information 1230 is stored and managed by one or more servers, distinct from servers 108 and 110, in the distributed system.
- Other modules 1232, configured for execution by server 1200.
- Files 1234, which are files locally stored at server 1200, optionally including files having executable programs, image files containing images, and/or data files containing data of various types.

FIG. 13 is a block diagram of a server system 1300 (e.g., serving as a remote investigating server 1300, sometimes herein called remote server 110, shown in FIG. 1A). In some implementations, machine 1300 includes one or more processors 1302, memory 1304 for storing programs and instructions for execution by one or more processors 1302, one or more communications interfaces such as input/output interface 1306 and network interface 1308, and one or more communications buses 1310 for interconnecting these components.

In some embodiments, input/output interface 1306 includes a display and input devices such as a keyboard, a mouse, the touch-sensitive surface of a touch-screen display, or a track-pad. In some embodiments, communication buses 1310 include circuitry (sometimes called a chipset) that interconnects and controls communications between system components. In some embodiments, memory 1304 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 1304 includes one or more storage devices remotely located from the one or more processors 1302. In some embodiments, memory 1304, or alternatively the non-volatile memory device(s) within memory 1304, comprises a non-transitory computer readable storage medium.

In some embodiments, memory 1304 or alternatively the non-transitory computer readable storage medium of memory 1304 stores the following programs, modules and data structures, instructions, or a subset thereof:

- Operating System 1312 that includes procedures for handling various basic system services and for performing hardware dependent tasks.
- I/O module 1314 that includes procedures for handling various basic input and output functions through one or more input and output devices.
- Communication module 1316 that is used for connecting machine 1300 to (or, more generally, communicating with) other machines (e.g., machines 102 in network 100, or an administrator's device 116) or servers (e.g., server 108) via one or more network communication interfaces 1308 (wired or wireless) and one or more communication networks, such as the Internet, other wide area networks, local area networks, metropolitan area networks, and so on.
- Security risk information gathering module 1320 that includes instructions to: obtain system risk information, directly or indirectly (e.g., with the assistance of other modules, in the server system 1300 or other servers, such as one or more network servers 108), from machines in a distributed system. The system risk information obtained by module 1320 optionally includes the following categories of information, or a subset (e.g., at least four) of these categories of information:
  - open session information identifying open sessions between respective users and respective machines in the distributed system;

vulnerability information identifying vulnerabilities, in a set of predefined vulnerabilities, present at respective machines in the distributed system;
vulnerability scores for the identified vulnerabilities in the set of predefined vulnerabilities;
missing patch information identifying missing software patches at respective machines in the distributed system;
administrative rights information identifying users and groups of users having administrative rights to respective machines of the distributed system; and
lateral movement information identifying users, groups and machines reachable from any other user, group or machine in the system, so as to build one or more graphs representing the assets (users, groups and machine) in the system and the relationships between them (optionally, lateral movement information is determined by security risk assessment module 1323).

Security risk and remediation presentation module 1322, which generates one or more user interfaces for presenting prioritized security risk information, such as the prioritized security risk information presented in one or more of the user interfaces discussed herein with reference to FIGS. 2-10. Security risk and remediation presentation module 1322 optionally includes a separate or integrated security risk assessment module 1323 for generating risk assessment values or scores, such as the risk assessment values or scores discussed herein with reference to FIGS. 2-10.

Remediation action modules 1324, which includes one or more modules for initiating remediation measures to remediate security risks, such as any of the remediation measures discussed herein with reference to FIGS. 2-10.

Other modules 1332 that include instructions for handling other functions. Modules 1332 optionally include some or all of the modules described above with respect to machine 1200 that are used to obtain information from machines in the distributed system.

Collected data 1334 which is a local database that is optionally used to security risk information, administrative rights information, and the like, collected from various machines in the distributed system to enable the assessment of security risks in the distributed system, and used by security risk and remediation presentation module 1322, and security risk assessment module 1323, if any.

Files 1336, optionally including files having executable programs, image files containing images, and/or data files containing data of various types.

FIGS. 11-13 are merely illustrative of the structures of machines 1100, servers 1200 and server 1300. A person skilled in the art would recognize that particular embodiments of machines 1100, servers 1200 and server 1300 may include more or fewer components than those shown. One or more modules may be divided into sub-modules, and/or one or more functions may be provided by different modules than those shown. In some embodiments, a respective server 1300 or set of servers implements or performs one or more methods described herein as being performed by a respective computational machine, including the methods described with respect to FIGS. 1A-10.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A server system, comprising:
one or more communications interfaces for coupling the server system to N machines in a collection of machines via one or more communication networks, where N is an integer greater than 10;
one or more processors; and
memory storing one or more programs, wherein the one or more programs include instructions for:
obtaining, at least in part from the N machines, system risk information that includes administrative rights information, identifying users and groups of users having administrative rights to various specific machines of the N machines, and at least two of the following categories of information:
open session information identifying open sessions between respective users and machines in the N machines;
vulnerability information identifying vulnerabilities, in a set of predefined vulnerabilities, currently present at machines in the N machines; and
missing patch information identifying missing software patches at machines in the N machines;
performing an identifying operation for each machine in a first subset of the machines, wherein the identifying operation, performed for a specific machine in the first subset of machines, comprises identifying, for the specific machine in the first subset of the N machines, logically coupled machines, the logically coupled machines comprising machines of the N machines logically coupled to the specific machine via lateral movement that comprises access to the specific machine via one or more other machines using said administrative rights;
performing a determining operation for each machine in a second subset of the N machines, wherein the determining operation, performed for a particular machine in the second subset of the N machines, comprises determining machine risk factors including one or more machine risk factors determined in accordance with the system risk information, and one or more lateral movement values, each lateral movement value corresponding to a number of logically coupled machines that are logically coupled to the particular machine via lateral movement that comprises access to the particular machine in the second subset of the N machines via one or more other machines using said administrative rights;
performing a generating operation for each machine in at least a third subset of the N machines, wherein performing the generating operation for a respective machine in the third subset of the N machines comprises generating a machine risk assessment value, wherein the machine risk assessment value is determined for the respective machine in the third subset based, at least in part, on a combination of the one or more machine risk factors and the one or more lateral movement values;
presenting in a first user interface a sorted list of machines that is sorted in accordance with the machine risk assessment values generated for the machines in the third subset of the N machines, wherein the first user interface includes, for each individual machine in at least a subset of the machines listed in the first user interface, a link for accessing additional information about risk factors and a link for accessing one or more remediation tools for remediating one or more security risks; and performing a respective security risk remediation action in accordance with user selection of a respective remediation tool of the one or more remediation tools.

2. The server system of claim 1, wherein obtaining the system risk information includes obtaining system risk information that includes at least three of the following categories of information:

the open session information identifying open sessions between users and machines in the N machines;

the vulnerability information identifying vulnerabilities, in the set of predefined vulnerabilities, present at machines in the N machines;

vulnerability scores for the identified vulnerabilities in the set of predefined vulnerabilities; and the missing patch information identifying missing software patches at machines in the N machines.

3. The server system of claim 2, wherein determining, for each machine in the second subset of the N machines, the machine risk factors includes determining, for the particular machine in the second subset of the N machines, at least three machine risk factors determined in accordance with the system risk information, and the one or more lateral movement values.

4. The server system of claim 1, wherein the machine risk factors for the particular machine in the second subset of the N machines are selected from the group consisting of:

a number of direct administrators of the particular machine;

a number of indirect administrators of the particular machine;

a first number of vulnerabilities present in the particular machine having vulnerability scores in a first score value range;

a second number of vulnerabilities present in the particular machine having vulnerability scores in a second score value range distinct from the first score value range;

a number of missing software patches; and a number of open sessions between respective users and the particular machine.

5. The server system of claim 1, wherein the one or more lateral movement values for the particular machine in the second subset of the N machines include a first lateral movement count comprising a number of logically coupled machines that are logically coupled to the particular machine via the lateral movement that comprises access to the particular machine in the second subset of the N machines via one or more other machines using said administrative rights and that have a first predefined importance rating, and a second lateral movement count comprising a number of logically coupled machines that are logically coupled to the particular machine via the lateral movement that comprises access to the particular machine in the second subset of the N machines via one or more other machines using said administrative rights and that have a second predefined importance rating different from the first predefined importance rating.

6. The server system of claim 1, wherein the one or more remediation tools for remediating one or more security risks include remediation tools for at least two of (A) initiating installation of a software patch missing from the individual machine, or a set of machines that includes the individual machine; (B) modifying administrative rights of users and groups of users having administrative rights to so as to reduce how many users or groups of users have administrative rights to the individual machine; or (C) terminating one or more open sessions between respective users and either the individual machine or between respective users and machines of the N machines logically coupled to the individual machine via lateral movement that comprises access to the individual machine via one or more other machines using said administrative rights.

7. The server system of claim 1, wherein the one or more programs include instructions for:

determining, for each respective patch in a set of P software patches missing from at least one machine of the N machines, a plurality of patch risk factors selected from the group consisting of:

one or more machine counts, each machine count comprising a number of machines of the N machines missing the respective patch and having a corresponding predefined importance rating; and one or more vulnerability factors, each vulnerability factor corresponding to a count of vulnerabilities, in the set of predefined vulnerabilities, having a corresponding vulnerability rating, and remediated by the respective patch;

generating, for each respective patch in the set of P software patches, a patch risk assessment value, wherein the patch risk assessment value is determined, at least in part, based on a weighted combination of the plurality of patch risk factors;

presenting in a second user interface a second sorted list of a least a first subset of the P software patches, sorted in accordance with the patch risk assessment values generated for the patches in the first subset of the P software patches, wherein the second user interface includes, for each respective patch in at least a subset of the patches listed in the second user interface, a link for accessing additional information associated with the respective patch and a link for accessing a remediation tool for applying the respective patch to a plurality of machines in the N machines missing the respective patch; and in accordance with user selection of the respective remediation tool, applying the respective patch to the plurality of machines missing the respective patch; wherein P is an integer greater than 2.

8. The server system of claim 7, wherein:

the one or more machine counts includes a first machine count comprising a number of machines of the N machines missing the respective patch and having a first predefined machine importance rating, and a second machine count comprising a number of machines of the N machines missing the respective patch and having a second predefined machine importance rating different from the first predefined machine importance rating; and the one or more vulnerability factors include a first vulnerability factor corresponding to a first count of vulnerabilities, in the set of predefined vulnerabilities, mitigated by the respective patch and having vulnerability scores in a first score value range, and a second vulnerability factor corresponding to a second count of vulnerabilities, in the set of predefined vulnerabilities, fixed by the respective patch and having vulnerability scores in a second score value range distinct from the first score value range.

9. The server system of claim 1, wherein the one or more programs include instructions for:
  determining, for each respective vulnerability in a set of V predefined vulnerabilities, a plurality of vulnerability risk factors selected from the group consisting of:
    one or more machine counts, each machine count comprising a number of machines of the N machines affected by the respective vulnerability and having a corresponding predefined importance rating or corresponding vulnerability severity rating;
  generating, for each respective vulnerability in the set of V predefined vulnerabilities, a vulnerability risk assessment value, wherein the vulnerability risk assessment value is determined, at least in part, based on a weighted combination of the plurality of vulnerability risk factors, and a vulnerability score for the respective vulnerability;
  presenting in a third user interface a third sorted list of at least a first subset of the V predefined vulnerabilities, sorted in accordance with the vulnerability risk assessment values generated for the vulnerabilities in the first subset of the V predefined vulnerabilities, wherein the third user interface includes, for each respective vulnerability in at least a subset of the vulnerabilities listed in the third user interface, a link for accessing additional information associated with the respective vulnerability and a link for accessing a remediation tool for remediating, or reducing impact of, the respective vulnerability in at least a subset of the machines affected by the respective vulnerability; and
  in accordance with user selection of the remediation tool for remediating, or reducing impact of, the respective vulnerability, applying the respective remediation tool to a plurality of the machines affected by the respective vulnerability; wherein V is an integer greater than 2.

10. The server system of claim 9, wherein:
  the one or more machine counts includes a first machine count comprising a number of machines of the N machines affected by the respective vulnerability and having a first predefined machine importance rating or first predefined vulnerability severity rating, and a second machine count comprising a number of machines of the N machines affected by the respective vulnerability and having a second predefined machine importance rating different from the first predefined machine importance rating or a second predefined vulnerability severity rating different from the first predefined vulnerability severity rating.

11. The server system of claim 9, wherein the plurality of vulnerability risk factors further includes one or more lateral movement values, each lateral movement value corresponding to a number of logically coupled machines, logically coupled to any of the machines affected by the respective vulnerability via lateral movement that comprises access to any of the machines affected by the respective vulnerability via one or more other machines using said administrative rights, and having a corresponding predefined importance rating or corresponding vulnerability severity rating.

12. The server system of claim 9, wherein the plurality of vulnerability risk factors further includes a combination of two or more lateral movement values, each lateral movement value corresponding to a number of logically coupled machines, logically coupled to any of the machines affected by the respective vulnerability via lateral movement that comprises access to any of the machines affected by the respective vulnerability via one or more other machines using said administrative rights, and having a corresponding predefined importance rating or corresponding vulnerability severity rating.

13. The server system of claim 1, wherein the one or more programs include instructions for:
  determining, for each respective user in a set of U users, a plurality of user risk factors selected from the group consisting of:
    one or more direct access machine counts, each direct access machine count comprising a number of machines of the N machines to which the respective user has direct administrative rights and having a corresponding predefined importance rating;
    one or more indirect access machine counts, each indirect access machine count comprising a number of machines of the N machines to which the respective user has indirect administrative rights and having a corresponding predefined importance rating; and
    one or more user-specific lateral movement counts, each user-specific lateral movement count comprising a number of machines, accessible to the respective user via lateral movement, comprising access via one or more other machines using said administrative rights, from any machine to which the user has direct or indirect administrative rights, and having a corresponding predefined importance rating;
  generating, for each respective user in the set of U users, a user risk assessment value, wherein the user risk assessment value is determined, at least in part, based on a weighted combination of the user risk factors;
  presenting in a fourth user interface a sorted list of at least a first subset of the U users, the at least the first subset of U users sorted in accordance with the user risk assessment values generated for the users in the first subset of the U users, wherein the fourth user interface includes, for each respective user in at least a subset of the users listed in the fourth user interface, a link for accessing additional information associated with the respective user and for accessing one or more remediation tools for remediating, or reducing, security risks associated with the respective user; and
  performing a respective security risk remediation action in accordance with user selection of a respective remediation tool of the one or more remediation tools for remediating, or reducing, security risks associated with a respective user in the set of U users, wherein U is an integer greater than 2.

14. The server system of claim 13, wherein:
  the one or more direct access machine counts includes a first direct access machine count comprising a number of machines of the N machines to which the respective user has direct administrative rights and having a first predefined machine importance rating, and a second direct access machine count comprising a number of machines of the N machines to which the respective user has direct administrative rights and having a second predefined machine importance rating different from the first predefined machine importance rating;
  the one or more indirect access machine counts includes a first indirect access machine count comprising a number of machines of the N machines to which the respective user has indirect administrative rights and having the first predefined machine importance rating, and a second indirect access machine count comprising a number of machines of the N machines to which the respective user has indirect administrative rights and having the second predefined machine importance rating; and the one or more user-specific lateral movement counts includes a first user-specific lateral movement count comprising a number of user accessible machines, accessible to the respective user via lateral movement, comprising access via one or more other machines using said administrative rights, from any machine to which the user has direct or indirect administrative rights, and having the first predefined machine importance rating, and a second user-specific lateral movement count comprising a number of user accessible machines, accessible to the respective user via lateral movement, comprising access via one or more other machines using said administrative rights, from any machine to which the user has direct or indirect administrative rights, and having the second predefined machine importance rating.

15. The server system of claim 1, wherein the one or more programs include instructions for:
determining, for each respective user group of G user groups identified in the administrative rights information, at least four group risk factors from the group consisting of:
one or more direct access group machine counts, each direct access group machine count comprising a number of machines of the N machines to which users in the respective user group have direct administrative rights and having a corresponding predefined importance rating;
one or more indirect access group machine counts, each indirect access group machine count comprising a number of machines of the N machines to which the users in the respective user group have indirect administrative rights and having a corresponding predefined importance rating; and
one or more user group lateral movement counts, each user group lateral movement count comprising a number of user accessible machines, accessible to users in the respective user group via lateral movement, comprising access via one or more machines using said administrative rights, from any machine to which a member of the respective user group has administrative rights, and having a corresponding predefined importance rating;
generating, for each respective user group in a plurality of user groups, a group risk assessment value, wherein the group risk assessment value is determined, at least in part, based on a weighted combination of the at least four of the group risk factors;
presenting in a fifth user interface a sorted list of a least a first subset of the G user groups, sorted in accordance with the group risk assessment values generated for the user groups in the first subset of the G user groups, wherein the fifth user interface includes, for each respective user group in at least a subset of the user groups listed in the fifth user interface, a link for accessing additional information associated with the respective user group and for accessing one or more remediation tools for remediating, or reducing, security risks associated with the respective user group; and
performing a respective security risk remediation action in accordance with user selection of a respective remediation tool of the one or more remediation tools for remediating, or reducing, security risks associated with a respective user group of the G user groups, wherein G is an integer greater than 2.

16. The server system of claim 15, wherein:
the one or more direct access group machine counts includes a first direct access group machine count comprising a number of machines of the N machines to which users in the respective user group have direct administrative rights and having a first predefined machine importance rating, and a second direct access machine count comprising a number of machines of the N machines to which users in the respective user group has direct administrative rights and having a second predefined machine importance rating different from the first predefined machine importance rating;
the one or more indirect access group machine counts includes a first indirect access machine count comprising a number of machines of the N machines to which users in the respective user group have indirect administrative rights and having the first predefined machine importance rating, and a second indirect access machine count comprising a number of machines of the N machines to which users in the respective user group have indirect administrative rights and having the second predefined machine importance rating; and
the one or more user group lateral movement counts includes a first lateral movement count comprising a number of user accessible machines, accessible to users in the respective user group via lateral movement, comprising access via one or more other machines using said administrative rights, from any machine to which a member of the respective user group has administrative rights, and having the first predefined machine importance rating, and a second lateral movement count comprising a number of user accessible machines, accessible to users in the respective user group via lateral movement, comprising access via one or more other machines using said administrative rights, from any machine to which a member of the respective user group has administrative rights, and having the second predefined machine importance rating.

17. A non-transitory computer readable storage medium storing one or more programs for execution by one or more processors of a server system coupled via one or more communication networks to N machines in a collection of machines, where N is an integer greater than 10, the one or more programs including instructions for:
obtaining, at least in part from the N machines, system risk information that includes administrative rights information, identifying users and groups of users having administrative rights to various specific machines of the N machines, and at least two of the following categories of information:
open session information identifying open sessions between respective users and machines in the N machines;
vulnerability information identifying vulnerabilities, in a set of predefined vulnerabilities, currently present at machines in the N machines; and
missing patch information identifying missing software patches at machines in the N machines;
performing an identifying operation for each machine in a first subset of the machines, wherein the identifying operation, performed for a specific machine in the first subset of machines, comprises identifying, for the specific machine in the first subset of the N machines, logically coupled machines, the logically coupled machines comprising machines of the N machines logically coupled to the specific machine via lateral movement that comprises access to the specific machine via one or more other machines using said administrative rights;

performing a determining operation for each machine in a second subset of the N machines, wherein the determining operation, performed for a particular machine in the second subset of the N machines, comprises determining machine risk factors including one or more machine risk factors determined in accordance with the system risk information, and one or more lateral movement values, each lateral movement value corresponding to a number of logically coupled machines that are logically coupled to the particular machine via lateral movement that comprises access to the particular machine in the second subset of the N machines via one or more other machines using said administrative rights;

performing a generating operation for each machine in at least a third subset of the N machines, wherein performing the generating operation for a machine in the third subset of the N machines comprises generating a machine risk assessment value, wherein the machine risk assessment value is determined for the machine in the third subset based, at least in part, on a combination of the one or more machine risk factors and the one or more lateral movement values;

presenting in a first user interface a sorted list of machines that is sorted in accordance with the machine risk assessment values generated for the machines in the third subset of the N machines, wherein the first user interface includes, for each individual machine in at least a subset of the machines listed in the first user interface, a link for accessing additional information about risk factors and a link for accessing one or more remediation tools for remediating one or more security risks; and performing a respective security risk remediation action in accordance with user selection of a respective remediation tool of the one or more remediation tools.

18. The non-transitory computer readable storage medium of claim 17, wherein obtaining the system risk information includes obtaining system risk information that includes at least three of the following categories of information:
the open session information identifying open sessions between users and machines in the N machines;
the vulnerability information identifying vulnerabilities, in the set of predefined vulnerabilities, present at machines in the N machines;
vulnerability scores for the identified vulnerabilities in the set of predefined vulnerabilities; and
the missing patch information identifying missing software patches at machines in the N machines.

19. The non-transitory computer readable storage medium of claim 18, wherein determining, for each machine in the second subset of the N machines, the machine risk factors includes determining, for the particular machine in the second subset of the N machines, at least three machine risk factors determined in accordance with the system risk information, and the one or more lateral movement values.

20. The non-transitory computer readable storage medium of claim 17, wherein the machine risk factors for the particular machine in the second subset of the N machines are selected from the group consisting of:

a number of direct administrators of the particular machine;
a number of indirect administrators of the particular machine;
a first number of vulnerabilities present in the particular machine having vulnerability scores in a first score value range;
a second number of vulnerabilities present in the particular machine having vulnerability scores in a second score value range distinct from the first score value range;
a number of missing software patches; and
a number of open sessions between respective users and the particular machine.

21. The non-transitory computer readable storage medium of claim 17, wherein the one or more lateral movement values for the particular machine in the second subset of the N machines include a first lateral movement count comprising a number of logically coupled machines that are logically coupled to the particular machine via the lateral movement that comprises access to the particular machine in the second subset of the N machines via one or more other machines using said administrative rights and that have a first predefined importance rating, and a second lateral movement count comprising a number of logically coupled machines that are logically coupled to the particular machine via the lateral movement that comprises access to the particular machine in the second subset of the N machines via one or more other machines using said administrative rights and that have a second predefined importance rating different from the first predefined importance rating.

22. The non-transitory computer readable storage medium of claim 17, wherein the one or more remediation tools for remediating one or more security risks include remediation tools for at least two of (A) initiating installation of a software patch missing from the individual machine, or a set of machines that includes the individual machine; (B) modifying administrative rights of users and groups of users having administrative rights so as to reduce how many users or groups of users have administrative rights to the individual machine; or (C) terminating one or more open sessions between respective users and either the individual machine or between respective users and machines of the N machines logically coupled to the individual machine via lateral movement that comprises access to the individual machine via one or more other machines using said administrative rights.

23. The non-transitory computer readable storage medium of claim 17, wherein the one or more programs include instructions for:
determining, for each respective patch in a set of P software patches missing from at least one machine of the N machines, a plurality of patch risk factors selected from the group consisting of:
one or more machine counts, each machine count comprising a number of machines of the N machines missing the respective patch and having a corresponding predefined importance rating; and
one or more vulnerability factors, each vulnerability factor corresponding to a count of vulnerabilities, in the set of predefined vulnerabilities, having a corresponding vulnerability rating, and remediated by the respective patch;
generating, for each respective patch in the set of P software patches, a patch risk assessment value, wherein the patch risk assessment value is determined, at least in part, based on a weighted combination of the plurality of patch risk factors;

presenting in a second user interface a second sorted list of a least a first subset of the P software patches, sorted in accordance with the patch risk assessment values generated for the patches in the first subset of the P software patches, wherein the second user interface includes, for each respective patch in at least a subset of the patches listed in the second user interface, a link for accessing additional information associated with the respective patch and a link for accessing a remediation tool for applying the respective patch to a plurality of machines in the N machines missing the respective patch; and in accordance with user selection of the respective remediation tool, applying the respective patch to the plurality of machines missing the respective patch; wherein P is an integer greater than 2.

24. The non-transitory computer readable storage medium of claim 23, wherein:

the one or more machine counts includes a first machine count comprising a number of machines of the N machines missing the respective patch and having a first predefined machine importance rating, and a second machine count comprising a number of machines of the N machines missing the respective patch and having a second predefined machine importance rating different from the first predefined machine importance rating; and the one or more vulnerability factors include a first vulnerability factor corresponding to a first count of vulnerabilities, in the set of predefined vulnerabilities, mitigated by the respective patch and having vulnerability scores in a first score value range, and a second vulnerability factor corresponding to a second count of vulnerabilities, in the set of predefined vulnerabilities, fixed by the respective patch and having vulnerability scores in a second score value range distinct from the first score value range.

25. The non-transitory computer readable storage medium of claim 17, wherein the one or more programs include instructions for:

determining, for each respective vulnerability in a set of V predefined vulnerabilities, a plurality of vulnerability risk factors selected from the group consisting of:

one or more machine counts, each machine count comprising a number of machines of the N machines affected by the respective vulnerability and having a corresponding predefined importance rating or corresponding vulnerability severity rating;

generating, for each respective vulnerability in the set of V predefined vulnerabilities, a vulnerability risk assessment value, wherein the vulnerability risk assessment value is determined, at least in part, based on a weighted combination of the plurality of vulnerability risk factors, and a vulnerability score for the respective vulnerability;

presenting in a third user interface a third sorted list of a least a first subset of the V predefined vulnerabilities, sorted in accordance with the vulnerability risk assessment values generated for the vulnerabilities in the first subset of the V predefined vulnerabilities, wherein the third user interface includes, for each respective vulnerability in at least a subset of the vulnerabilities listed in the third user interface, a link for accessing additional information associated with the respective vulnerability and a link for accessing a remediation tool for remediating, or reducing impact of, the respective vulnerability in at least a subset of the machines affected by the respective vulnerability; and in accordance with user selection of the remediation tool for remediating, or reducing impact of, the respective vulnerability, applying the respective remediation tool to a plurality of the machines affected by the respective vulnerability; wherein V is an integer greater than 2.

26. The non-transitory computer readable storage medium of claim 25, wherein:

the one or more machine counts includes a first machine count comprising a number of machines of the N machines affected by the respective vulnerability and having a first predefined machine importance rating or first predefined vulnerability severity rating, and a second machine count comprising a number of machines of the N machines affected by the respective vulnerability and having a second predefined machine importance rating different from the first predefined machine importance rating or a second predefined vulnerability severity rating different from the first predefined vulnerability severity rating.

27. The non-transitory computer readable storage medium of claim 25, wherein the plurality of vulnerability risk factors further includes one or more lateral movement values, each lateral movement value corresponding to a number of logically coupled machines, logically coupled to any of the machines affected by the respective vulnerability via lateral movement that comprises access to any of the machines affected by the respective vulnerability via one or more other machines using said administrative rights, and having a corresponding predefined importance rating or corresponding vulnerability severity rating.

28. The non-transitory computer readable storage medium of claim 25, wherein the plurality of vulnerability risk factors further includes a combination of two or more lateral movement values, each lateral movement value corresponding to a number of logically coupled machines, logically coupled to any of the machines affected by the respective vulnerability via lateral movement that comprises access to any of the machines affected by the respective vulnerability via one or more other machines using said administrative rights, and having a corresponding predefined importance rating or corresponding vulnerability severity rating.

29. The non-transitory computer readable storage medium of claim 17, wherein the one or more programs include instructions for:

determining, for each respective user in a set of U users, a plurality of user risk factors selected from the group consisting of:

one or more direct access machine counts, each direct access machine count comprising a number of machines of the N machines to which the respective user has direct administrative rights and having a corresponding predefined importance rating;

one or more indirect access machine counts, each indirect access machine count comprising a number of machines of the N machines to which the respective user has indirect administrative rights and having a corresponding predefined importance rating; and one or more user-specific lateral movement counts, each user-specific lateral movement count comprising a number of machines, accessible to the respective user via lateral movement, comprising access via one or more other machines using said administrative rights, from any machine to which the user has direct or indirect administrative rights, and having a corresponding predefined importance rating;

generating, for each respective user in the set of U users, a user risk assessment value, wherein the user risk assessment value is determined, at least in part, based on a weighted combination of the user risk factors;

presenting in a fourth user interface a sorted list of at least a first subset of the U users, the at least the first subset of U users sorted in accordance with the user risk assessment values generated for the users in the first subset of the U users, wherein the fourth user interface includes, for each respective user in at least a subset of the users listed in the fourth user interface, a link for accessing additional information associated with the respective user and for accessing one or more remediation tools for remediating, or reducing, security risks associated with the respective user; and performing a respective security risk remediation action in accordance with user selection of a respective remediation tool of the one or more remediation tools for remediating, or reducing, security risks associated with a respective user in the set of U users, wherein U is an integer greater than 2.

30. The non-transitory computer readable storage medium of claim 29, wherein:

the one or more direct access machine counts includes a first direct access machine count comprising a number of machines of the N machines to which the respective user has direct administrative rights and having a first predefined machine importance rating, and a second direct access machine count comprising a number of machines of the N machines to which the respective user has direct administrative rights and having a second predefined machine importance rating different from the first predefined machine importance rating;

the one or more indirect access machine counts includes a first indirect access machine count comprising a number of machines of the N machines to which the respective user has indirect administrative rights and having the first predefined machine importance rating, and a second indirect access machine count comprising a number of machines of the N machines to which the respective user has indirect administrative rights and having the second predefined machine importance rating; and the one or more user-specific lateral movement counts includes a first user-specific lateral movement count comprising a number of user accessible machines, accessible to the respective user via lateral movement, comprising access via one or more other machines using said administrative rights, from any machine to which the user has direct or indirect administrative rights, and having the first predefined machine importance rating, and a second user-specific lateral movement count comprising a number of user accessible machines, accessible to the respective user via lateral movement, comprising access via one or more other machines using said administrative rights, from any machine to which the user has direct or indirect administrative rights, and having the second predefined machine importance rating.

31. The non-transitory computer readable storage medium of claim 17, wherein the one or more programs include instructions for:

determining, for each respective user group of G user groups identified in the administrative rights information, at least four group risk factors from the group consisting of:

one or more direct access group machine counts, each direct access group machine count comprising a number of machines of the N machines to which users in the respective user group have direct administrative rights and having a corresponding predefined importance rating;

one or more indirect access group machine counts, each indirect access group machine count comprising a number of machines of the N machines to which the users in the respective user group have indirect administrative rights and having a corresponding predefined importance rating; and one or more user group lateral movement counts, each user group lateral movement count comprising a number of user accessible machines, accessible to users in the respective user group via lateral movement, comprising access via one or more other machines using said administrative rights, from any machine to which a member of the respective user group has administrative rights, and having a corresponding predefined importance rating;

generating, for each respective user group in a plurality of user groups, a group risk assessment value, wherein the group risk assessment value is determined, at least in part, based on a weighted combination of the at least four of the group risk factors;

presenting in a fifth user interface a sorted list of a least a first subset of the G user groups, sorted in accordance with the group risk assessment values generated for the user groups in the first subset of the G user groups, wherein the fifth user interface includes, for each respective user group in at least a subset of the user groups listed in the fifth user interface, a link for accessing additional information associated with the respective user group and for accessing one or more remediation tools for remediating, or reducing, security risks associated with the respective user group; and performing a respective security risk remediation action in accordance with user selection of a respective remediation tool of the one or more remediation tools for remediating, or reducing, security risks associated with a respective user group of the G user groups, wherein G is an integer greater than 2.

32. The non-transitory computer readable storage medium of claim 31, wherein:

the one or more direct access group machine counts includes a first direct access group machine count comprising a number of machines of the N machines to which users in the respective user group have direct administrative rights and having a first predefined machine importance rating, and a second direct access machine count comprising a number of machines of the N machines to which users in the respective user group has direct administrative rights and having a second predefined machine importance rating different from the first predefined machine importance rating;

the one or more indirect access group machine counts includes a first indirect access machine count comprising a number of machines of the N machines to which users in the respective user group have indirect administrative rights and having the first predefined machine importance rating, and a second indirect access machine count comprising a number of machines of the N machines to which users in the respective user group have indirect administrative rights and having the second predefined machine importance rating; and the one or more user group lateral movement counts includes a first lateral movement count comprising a number of user accessible machines, accessible to users in the respective user group via lateral movement, comprising access via one or more other machines using said administrative rights, from any machine to which a member of the respective user group has administrative rights, and having the first predefined machine importance rating, and a second lateral movement count comprising a number of user accessible machines, accessible to users in the respective user group via lateral movement, comprising access via one or more other machines using said administrative rights, from any machine to which a member of the respective user group has administrative rights, and having the second predefined machine importance rating.

33. A method of performing, at a server system, security risk assessment and remediation for machines in a distributed collection of N machines, where N is an integer greater than 10, comprising:

obtaining, at least in part from the N machines, system risk information that includes administrative rights information, identifying users and groups of users having administrative rights to various specific machines of the N machines, and at least two of the following categories of information:

open session information identifying open sessions between respective users and machines in the N machines;

vulnerability information identifying vulnerabilities, in a set of predefined vulnerabilities, currently present at machines in the N machines; and missing patch information identifying missing software patches at machines in the N machines;

performing an identifying operation for each machine in a first subset of the machines, wherein the identifying operation, performed for a specific machine in the first subset of machines, comprises identifying, for the specific machine in the first subset of the N machines, logically coupled machines, the logically coupled machines comprising machines of the N machines logically coupled to the specific machine via lateral movement that comprises access to the specific machine via one or more other machines using said administrative rights;

performing a determining operation for each machine in a second subset of the N machines, wherein the determining operation, performed for a particular machine in the second subset of the N machines, comprises determining machine risk factors including one or more machine risk factors determined in accordance with the system risk information, and one or more lateral movement values, each lateral movement value corresponding to a number of logically coupled machines that are logically coupled to the particular machine via lateral movement that comprises access to the particular machine in the second subset of the N machines via one or more other machines using said administrative rights;

performing a generating operation for each machine in at least a third subset of the N machines, wherein performing the generating operation for a machine in the third subset of the N machines comprises generating a machine risk assessment value, wherein the machine risk assessment value is determined for the machine in the third subset based, at least in part, on a combination of the one or more machine risk factors and the one or more lateral movement values;

presenting in a first user interface a sorted list of machines that is sorted in accordance with the machine risk assessment values generated for the machines in the third subset of the N machines, wherein the first user interface includes, for each individual machine in at least a subset of the machines listed in the first user interface, a link for accessing additional information about risk factors and a link for accessing one or more remediation tools for remediating one or more security risks; and performing a respective security risk remediation action in accordance with user selection of a respective remediation tool of the one or more remediation tools.

34. The method of claim 33, wherein obtaining the system risk information includes obtaining system risk information that includes at least three of the following categories of information:

the open session information identifying open sessions between users and machines in the N machines;

the vulnerability information identifying vulnerabilities, in the set of predefined vulnerabilities, present at machines in the N machines;

vulnerability scores for the identified vulnerabilities in the set of predefined vulnerabilities; and the missing patch information identifying missing software patches at machines in the N machines.

35. The method of claim 34, wherein determining, for each machine in the second subset of the N machines, the machine risk factors includes determining, for the particular machine in the second subset of the N machines, at least three machine risk factors determined in accordance with the system risk information, and the one or more lateral movement values.

36. The method of claim 33, wherein the machine risk factors for the particular machine in the second subset of the N machines are selected from the group consisting of:

a number of direct administrators of the particular machine;

a number of indirect administrators of the particular machine;

a first number of vulnerabilities present in the particular machine having vulnerability scores in a first score value range;

a second number of vulnerabilities present in the particular machine having vulnerability scores in a second score value range distinct from the first score value range;

a number of missing software patches; and a number of open sessions between respective users and the particular machine.

37. The method of claim 33, wherein the one or more lateral movement values for a particular machine in the second subset of the N machines include a first lateral movement count comprising a number of logically coupled machines that are logically coupled to the particular machine via the lateral movement that comprises access to the particular machine in the second subset of the N machines via one or more other machines using said administrative rights and that have a first predefined importance rating, and a second lateral movement count comprising a number of logically coupled machines that are logically coupled to the particular machine via the lateral movement that comprises access to the particular machine in the second subset of the N machines via one or more other machines using said administrative rights and that have a second predefined importance rating different from the first predefined importance rating.

38. The method of claim 33, wherein the one or more remediation tools for remediating one or more security risks include remediation tools for at least two of (A) initiating installation of a software patch missing from the individual machine, or a set of machines that includes the individual machine; (B) modifying administrative rights of users and groups of users having administrative rights so as to reduce how many users or groups of users have administrative rights to the individual machine; or (C) terminating one or more open sessions between respective users and either the individual machine or between respective users and machines of the N machines logically coupled to the individual machine via lateral movement that comprises access to the individual machine via one or more other machines using said administrative rights.

39. The method of claim 33, including:
   determining, for each respective patch in a set of P software patches missing from at least one machine of the N machines, a plurality of patch risk factors selected from the group consisting of:
      one or more machine counts, each machine count comprising a number of machines of the N machines missing the respective patch and having a corresponding predefined importance rating; and
      one or more vulnerability factors, each vulnerability factor corresponding to a count of vulnerabilities, in the set of predefined vulnerabilities, having a corresponding vulnerability rating, and remediated by the respective patch;
   generating, for each respective patch in the set of P software patches, a patch risk assessment value, wherein the patch risk assessment value is determined, at least in part, based on a weighted combination of the plurality of patch risk factors;
   presenting in a second user interface a second sorted list of a least a first subset of the P software patches, sorted in accordance with the patch risk assessment values generated for the patches in the first subset of the P software patches, wherein the second user interface includes, for each respective patch in at least a subset of the patches listed in the second user interface, a link for accessing additional information associated with the respective patch and a link for accessing a remediation tool for applying the respective patch to a plurality of machines in the N machines missing the respective patch; and
   in accordance with user selection of the respective remediation tool, applying the respective patch to the plurality of machines missing the respective patch;
   wherein P is an integer greater than 2.

40. The method of claim 39, wherein:
   the one or more machine counts includes a first machine count comprising a number of machines of the N machines missing the respective patch and having a first predefined machine importance rating, and a second machine count comprising a number of machines of the N machines missing the respective patch and having a second predefined machine importance rating different from the first predefined machine importance rating; and
   the one or more vulnerability factors include a first vulnerability factor corresponding to a first count of vulnerabilities, in the set of predefined vulnerabilities, mitigated by the respective patch and having vulnerability scores in a first score value range, and a second vulnerability factor corresponding to a second count of vulnerabilities, in the set of predefined vulnerabilities, fixed by the respective patch and having vulnerability scores in a second score value range distinct from the first score value range.

41. The method of claim 33, including:
   determining, for each respective vulnerability in a set of V predefined vulnerabilities, a plurality of vulnerability risk factors selected from the group consisting of:
      one or more machine counts, each machine count comprising a number of machines of the N machines affected by the respective vulnerability and having a corresponding predefined importance rating or corresponding vulnerability severity rating;
   generating, for each respective vulnerability in the set of V predefined vulnerabilities, a vulnerability risk assessment value, wherein the vulnerability risk assessment value is determined, at least in part, based on a weighted combination of the plurality of vulnerability risk factors, and a vulnerability score for the respective vulnerability;
   presenting in a third user interface a third sorted list of a least a first subset of the V predefined vulnerabilities, sorted in accordance with the vulnerability risk assessment values generated for the vulnerabilities in the first subset of the V predefined vulnerabilities, wherein the third user interface includes, for each respective vulnerability in at least a subset of the vulnerabilities listed in the third user interface, a link for accessing additional information associated with the respective vulnerability and a link for accessing a remediation tool for remediating, or reducing impact of, the respective vulnerability in at least a subset of the machines affected by the respective vulnerability; and
   in accordance with user selection of the remediation tool for remediating, or reducing impact of, the respective vulnerability, applying the respective remediation tool to a plurality of the machines affected by the respective vulnerability; wherein V is an integer greater than 2.

42. The method of claim 41, wherein:
   the one or more machine counts includes a first machine count comprising a number of machines of the N machines affected by the respective vulnerability and having a first predefined machine importance rating or first predefined vulnerability severity rating, and a second machine count comprising a number of machines of the N machines affected by the respective vulnerability and having a second predefined machine importance rating different from the first predefined machine importance rating or a second predefined vulnerability severity rating different from the first predefined vulnerability severity rating.

43. The method of claim 41, wherein the plurality of vulnerability risk factors further includes one or more lateral movement values, each lateral movement value corresponding to a number of logically coupled machines, logically coupled to any of the machines affected by the respective vulnerability via lateral movement that comprises access to any of the machines affected by the respective vulnerability via one or more other machines using said administrative rights, and having a corresponding predefined importance rating or corresponding vulnerability severity rating.

44. The method of claim 41, wherein the plurality of vulnerability risk factors further includes a combination of two or more lateral movement values, each lateral movement value corresponding to a number of logically coupled machines, logically coupled to any of the machines affected by the respective vulnerability via lateral movement that comprises access to any of the machines affected by the respective vulnerability via one or more other machines using said administrative rights, and having a corresponding predefined importance rating or corresponding vulnerability severity rating.

45. The method of claim 33, including:
determining, for each respective user in a set of U users, a plurality of user risk factors selected from the group consisting of:
one or more direct access machine counts, each direct access machine count comprising a number of machines of the N machines to which the respective user has direct administrative rights and having a corresponding predefined importance rating;
one or more indirect access machine counts, each indirect access machine count comprising a number of machines of the N machines to which the respective user has indirect administrative rights and having a corresponding predefined importance rating; and
one or more user-specific lateral movement counts, each user-specific lateral movement count comprising a number of machines, accessible to the respective user via lateral movement, comprising access via one or more other machines using said administrative rights, from any machine to which the user has direct or indirect administrative rights, and having a corresponding predefined importance rating;
generating, for each respective user in the set of U users, a user risk assessment value, wherein the user risk assessment value is determined, at least in part, based on a weighted combination of the user risk factors;
presenting in a fourth user interface a sorted list of at least a first subset of the U users, the at least the first subset of U users sorted in accordance with the user risk assessment values generated for the users in the first subset of the U users, wherein the fourth user interface includes, for each respective user in at least a subset of the users listed in the fourth user interface, a link for accessing additional information associated with the respective user and for accessing one or more remediation tools for remediating, or reducing, security risks associated with the respective user; and
performing a respective security risk remediation action in accordance with user selection of a respective remediation tool of the one or more remediation tools for remediating, or reducing, security risks associated with a respective user in the set of U users, wherein U is an integer greater than 2.

46. The method of claim 45, wherein:
the one or more direct access machine counts includes a first direct access machine count comprising a number of machines of the N machines to which the respective user has direct administrative rights and having a first predefined machine importance rating, and a second direct access machine count comprising a number of machines of the N machines to which the respective user has direct administrative rights and having a second predefined machine importance rating different from the first predefined machine importance rating;
the one or more indirect access machine counts includes a first indirect access machine count comprising a number of machines of the N machines to which the respective user has indirect administrative rights and having the first predefined machine importance rating, and a second indirect access machine count comprising a number of machines of the N machines to which the respective user has indirect administrative rights and having the second predefined machine importance rating; and
the one or more user-specific lateral movement counts includes a first user-specific lateral movement count comprising a number of user accessible machines, accessible to the respective user via lateral movement, comprising access via one or more other machines using said administrative rights, from any machine to which the user has direct or indirect administrative rights, and having the first predefined machine importance rating, and a second user-specific lateral movement count comprising a number of user accessible machines, accessible to the respective user via lateral movement, comprising access via one or more other machines using said administrative rights, from any machine to which the user has direct or indirect administrative rights, and having the second predefined machine importance rating.

47. The method of claim 33, including:
determining, for each respective user group of G user groups identified in the administrative rights information, at least four group risk factors from the group consisting of:
one or more direct access group machine counts, each direct access group machine count comprising a number of machines of the N machines to which users in the respective user group have direct administrative rights and having a corresponding predefined importance rating;
one or more indirect access group machine counts, each indirect access group machine count comprising a number of machines of the N machines to which the users in the respective user group have indirect administrative rights and having a corresponding predefined importance rating; and
one or more user group lateral movement counts, each user group lateral movement count comprising a number of user accessible machines, accessible to users in the respective user group via lateral movement, comprising access via one or more other machines using said administrative rights, from any machine to which a member of the respective user group has administrative rights, and having a corresponding predefined importance rating;
generating, for each respective user group in a plurality of user groups, a group risk assessment value, wherein the group risk assessment value is determined, at least in part, based on a weighted combination of the at least four of the group risk factors;
presenting in a fifth user interface a sorted list of a least a first subset of the G user groups, sorted in accordance with the group risk assessment values generated for the user groups in the first subset of the G user groups, wherein the fifth user interface includes, for each respective user group in at least a subset of the user groups listed in the fifth user interface, a link for accessing additional information associated with the respective user group and for accessing one or more remediation tools for remediating, or reducing, security risks associated with the respective user group; and
performing a respective security risk remediation action in accordance with user selection of a respective remediation tool of the one or more remediation tools for remediating, or reducing, security risks associated with a respective user group of the G user groups, wherein G is an integer greater than 2.

48. The method of claim 47, wherein:

the one or more direct access group machine counts includes a first direct access group machine count comprising a number of machines of the N machines to which users in the respective user group have direct administrative rights and having a first predefined machine importance rating, and a second direct access machine count comprising a number of machines of the N machines to which users in the respective user group has direct administrative rights and having a second predefined machine importance rating different from the first predefined machine importance rating;

the one or more indirect access group machine counts includes a first indirect access machine count comprising a number of machines of the N machines to which users in the respective user group have indirect administrative rights and having the first predefined machine importance rating, and a second indirect access machine count comprising a number of machines of the N machines to which users in the respective user group have indirect administrative rights and having the second predefined machine importance rating; and the one or more user group lateral movement counts includes a first lateral movement count comprising a number of user accessible machines, accessible to users in the respective user group via lateral movement, comprising access via one or more other machines using said administrative rights, from any machine to which a member of the respective user group has administrative rights, and having the first predefined machine importance rating, and a second lateral movement count comprising a number of user accessible machines, accessible to users in the respective user group via lateral movement, comprising access via one or more other machines using said administrative rights, from any machine to which a member of the respective user group has administrative rights, and having the second predefined machine importance rating.

* * * * *